US006199082B1

(12) United States Patent
Ferrel et al.

(10) Patent No.: US 6,199,082 B1
(45) Date of Patent: *Mar. 6, 2001

(54) METHOD FOR DELIVERING SEPARATE DESIGN AND CONTENT IN A MULTIMEDIA PUBLISHING SYSTEM

(75) Inventors: Patrick J. Ferrel, Seattle; Robert F. Meyer, Redmond; Stephen J. Millet, Seattle; John P. Shewchuk, Seattle; Walter W. Smith, Seattle, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/503,343

(22) Filed: Jul. 17, 1995

(51) Int. Cl.[7] .................................................. G06F 17/21
(52) U.S. Cl. ............................................ 707/522; 707/515
(58) Field of Search ........................... 395/774, 776–779, 395/784, 788; 707/500, 522; 767/513, 501, 514–515; 709/203–219; 345/302

(56) References Cited

U.S. PATENT DOCUMENTS

| 4,723,211 | | 2/1988 | Barker et al. ........................ 395/776 |
| 4,949,287 | | 8/1990 | Yamaguchi et al. ................. 395/782 |
| 4,962,475 | | 10/1990 | Hernandez et al. ................. 395/777 |
| 4,969,093 | * | 11/1990 | Barker et al. ........................ 395/800 |
| 5,051,930 | | 9/1991 | Kuwabara et al. .................. 395/778 |
| 5,181,162 | * | 1/1993 | Smith et al. ......................... 395/792 |
| 5,339,392 | * | 8/1994 | Risberg et al. ...................... 395/333 |
| 5,347,632 | | 9/1994 | Filepp et al. .................... 395/200.09 |
| 5,491,785 | * | 2/1996 | Robson et al. ...................... 395/507 |
| 5,491,820 | * | 2/1996 | Belove et al. ....................... 395/603 |
| 5,557,722 | * | 9/1996 | DeRose et al. ...................... 395/774 |
| 5,630,103 | * | 5/1997 | Smith et al. ......................... 395/500 |
| 5,666,542 | * | 9/1997 | Katai et al. .......................... 707/522 |

OTHER PUBLICATIONS

Simpson, Mastering Wordperfect for Windows, pp. 838–839, 1993.*
Bormann et al., "Standards for open document processing: current state and future developments", *Computer Networks/ and ISDN Systems*, v. 21, pp. 149–163, Jan. 1991.*
Gifford, "Polychannel systems for mass digital communication", *Comm of ACM*, v. 33, n. 2, p. 141 (11), Feb. 1990.*
Schlichter et al., "FolioPub: A Publication Management System", *IEEE Computer*, v. 21, n. 1, pp. 61–69, Jan. 1988.*
Nakano et al., An Interface/application Builder with Transmission Control Facility for SGML document Databases, Proceedings of the Intl. Conf. on Database and Expert Systems Applications (DEXA '91), pp. 41–46, Jan. 1991.*
*Journalist User's Guide: Your Personalized Newspaper for CompuServe ®*, PED Software Corp., pp. 1–111, Jan. 1994.*
Huser et al., "The Individualized Electronic Newpaper", GMD Report No. GMD–664, Jul. 1992.*

(List continued on next page.)

Primary Examiner—Joseph H. Feild
(74) Attorney, Agent, or Firm—Banner & Witcoff, Ltd.

(57) ABSTRACT

A multimedia publishing system where the format and content can be separated and uploaded to a server by a publisher. Usually, the format used by publishers remains reasonably constant over time, contrasted with the content which changes on a regular basis. As content changes on a regular basis, the publisher uploads only the new content to the server. When clients or customers access the server's content, the server downloads the format and content to the user's computer. Subsequent downloads of content transmits only the content since the format is cached on the customer's computer after the first download. If the publisher desires to change the format at a subsequent time, the next download of content by the customer downloads both the new layout format and the new content. This publication scheme minimizes the transmission of data in bandwidth limited environments.

29 Claims, 23 Drawing Sheets

OTHER PUBLICATIONS

Mendelson, Edward, "Share and Share Alike," Computer Shopper, Ziff Davis Publishing, Feb. 1995, pp. 518–521, 524, 526–527, 529.

Chao, Julie, "Adobe Systems Sees Cyberspace as a Brave New Market: Software Maker's New Program Will Help Users Navigate the Internet," The Wall Street Journal (Corporate Focus), May 15, 1995, p. B4.

Rupley, Sebastian, "Folio's On–Line Business Library," PC Magazine (Trends), May 16, 1995, p. 32.

"The Wall Street Journal Introduces the First Newspaper Published for a Circulation of One. Personal Journal," The Wall Street Journal, May 16, 1995.

Patrizio, Andy, "Internet: Sun ramps up hardware, software offerings," PC Week, May, 22, 1995, p. 3.

Barney, Doug, "On–line publishing: Publishers wary of Notes service," INFOWORLD, May 29, 1995, p. 8.

Leach, Norvin, "It's only in alpha, but testers say Java is hot," PC Week, May 29, 1995, p. 92.

* cited by examiner

SYSTEM OVERVIEW

FIG.10  API AND DLL VIEW OF SYSTEM
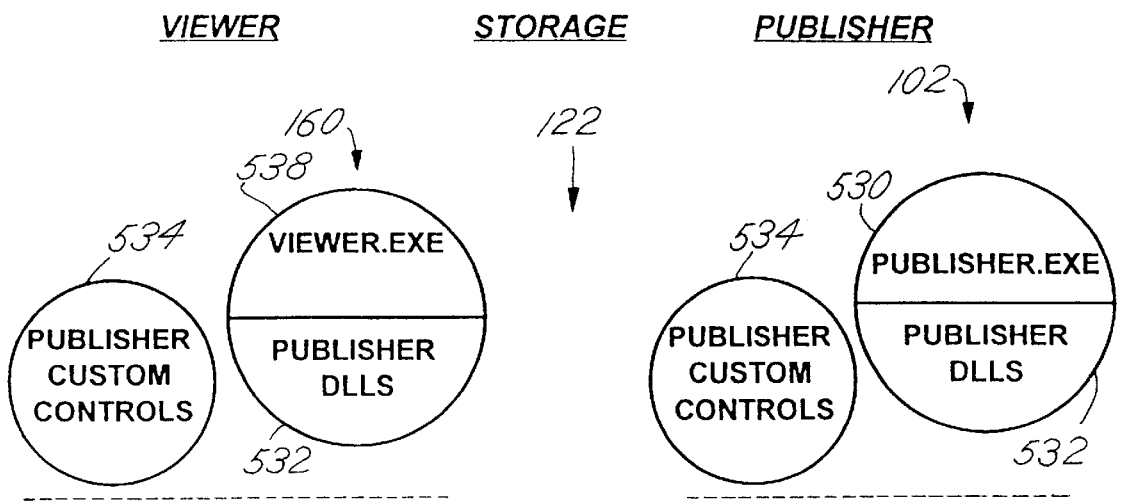
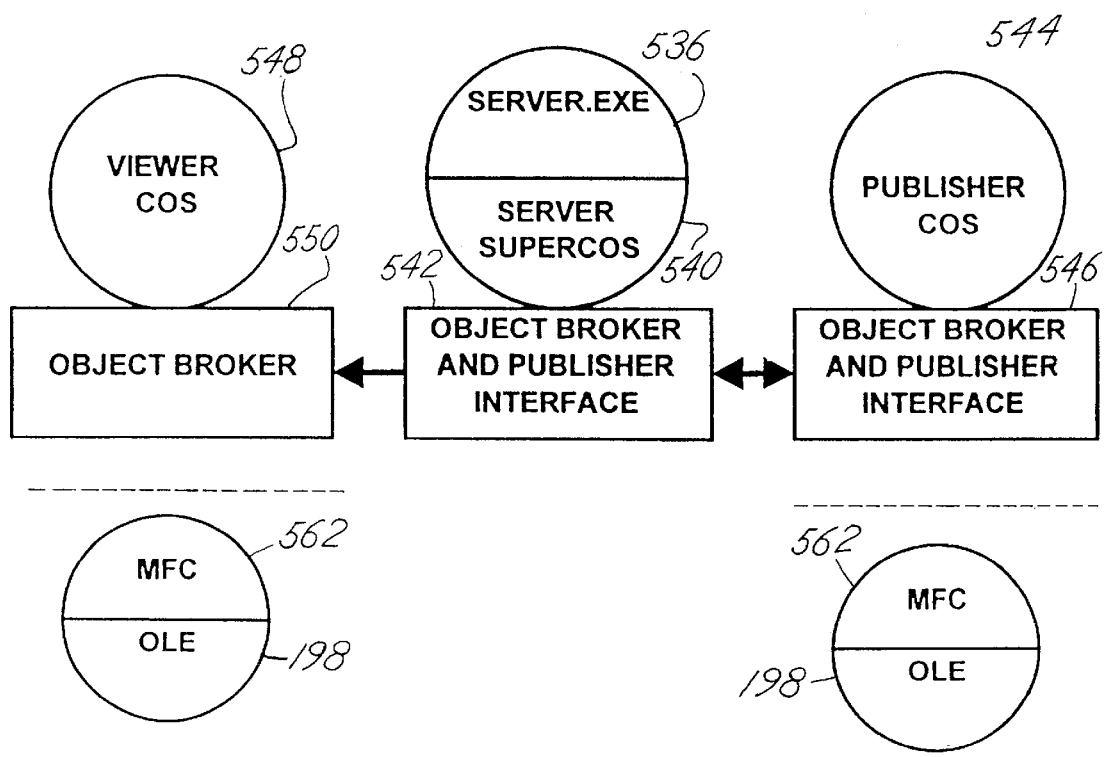

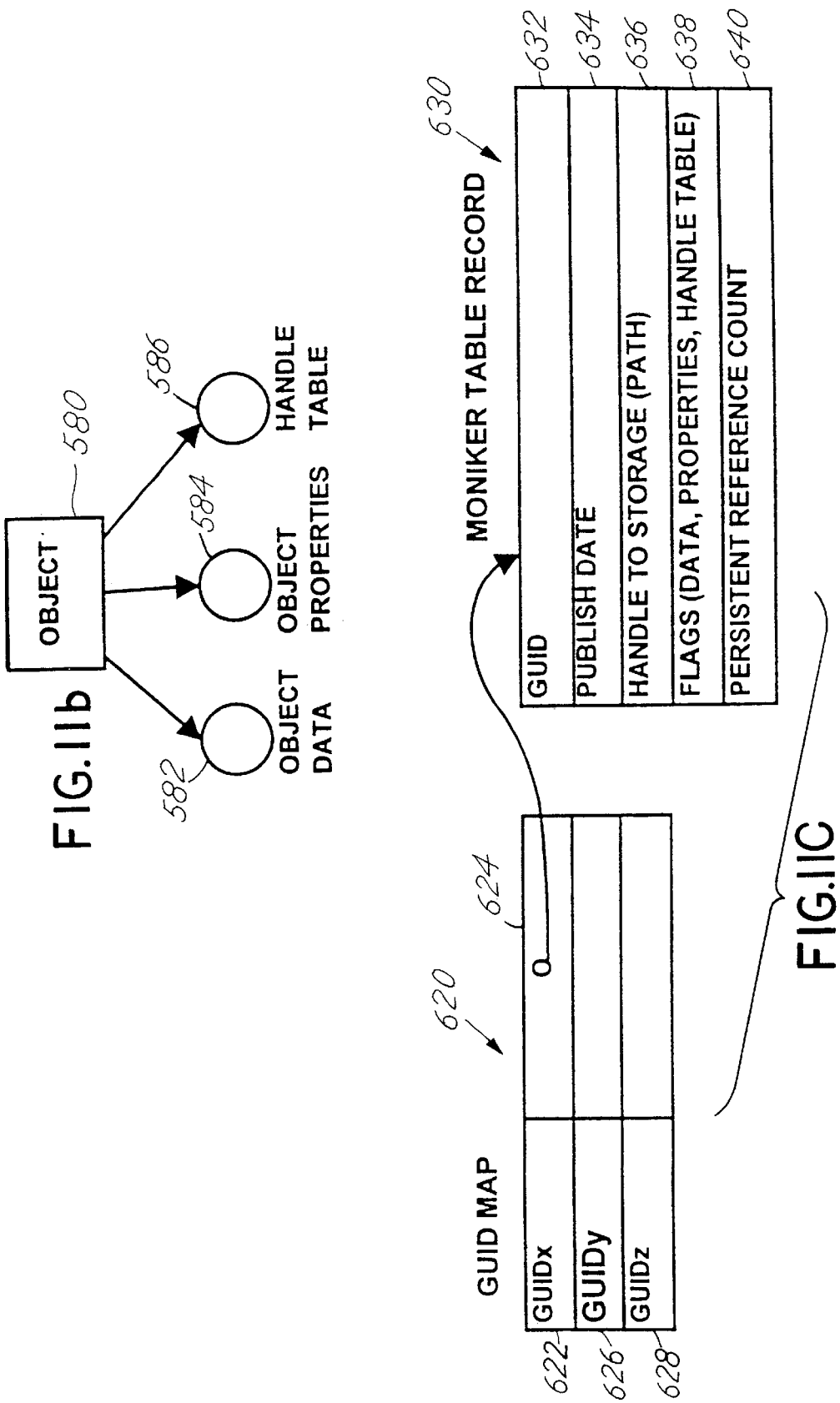

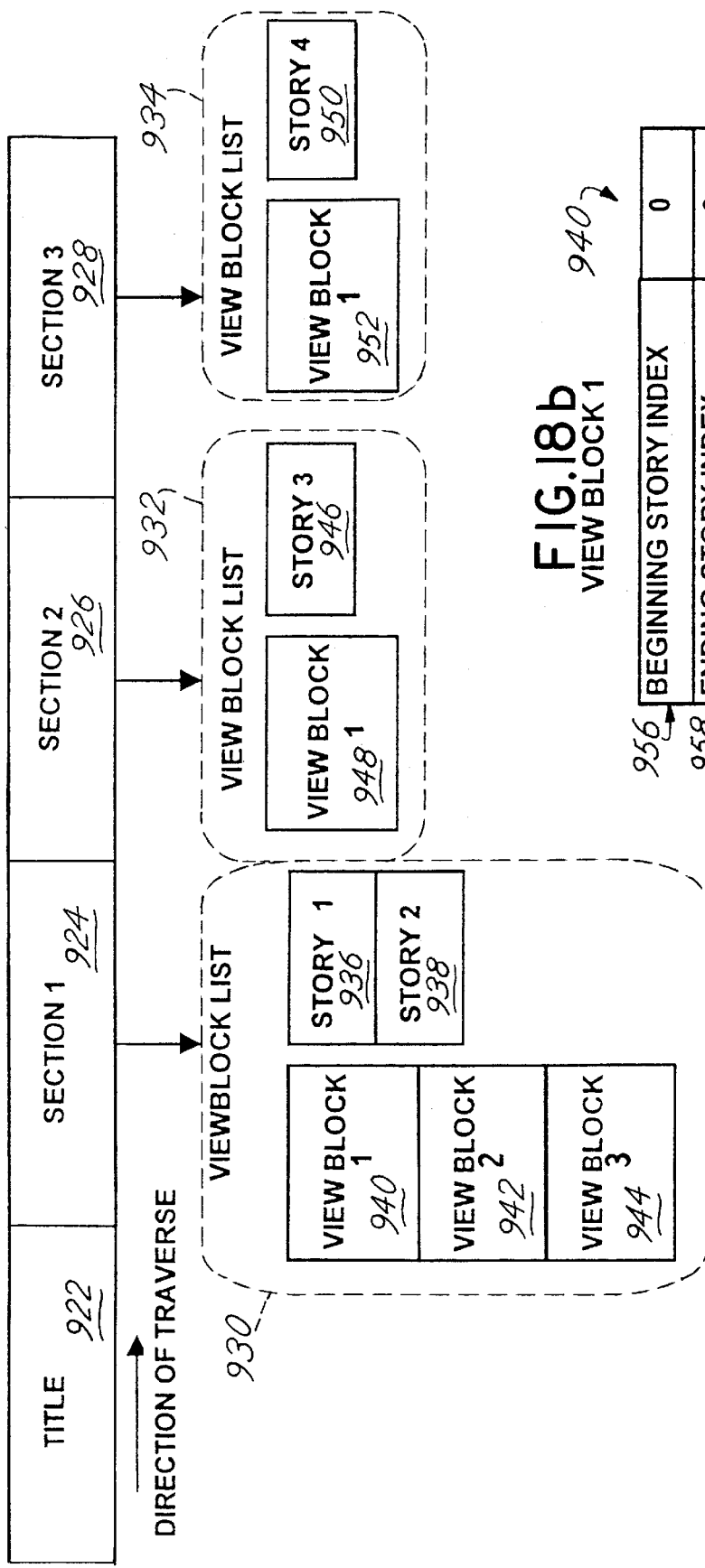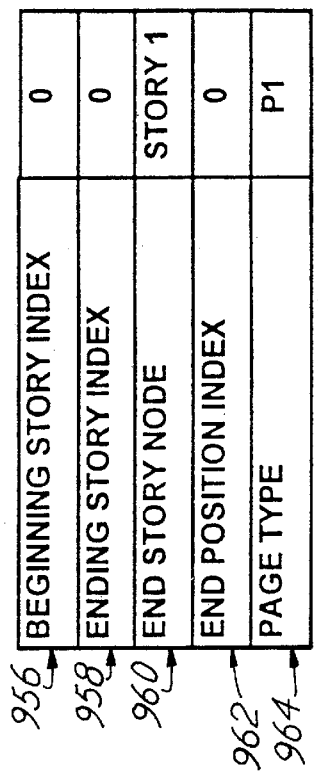

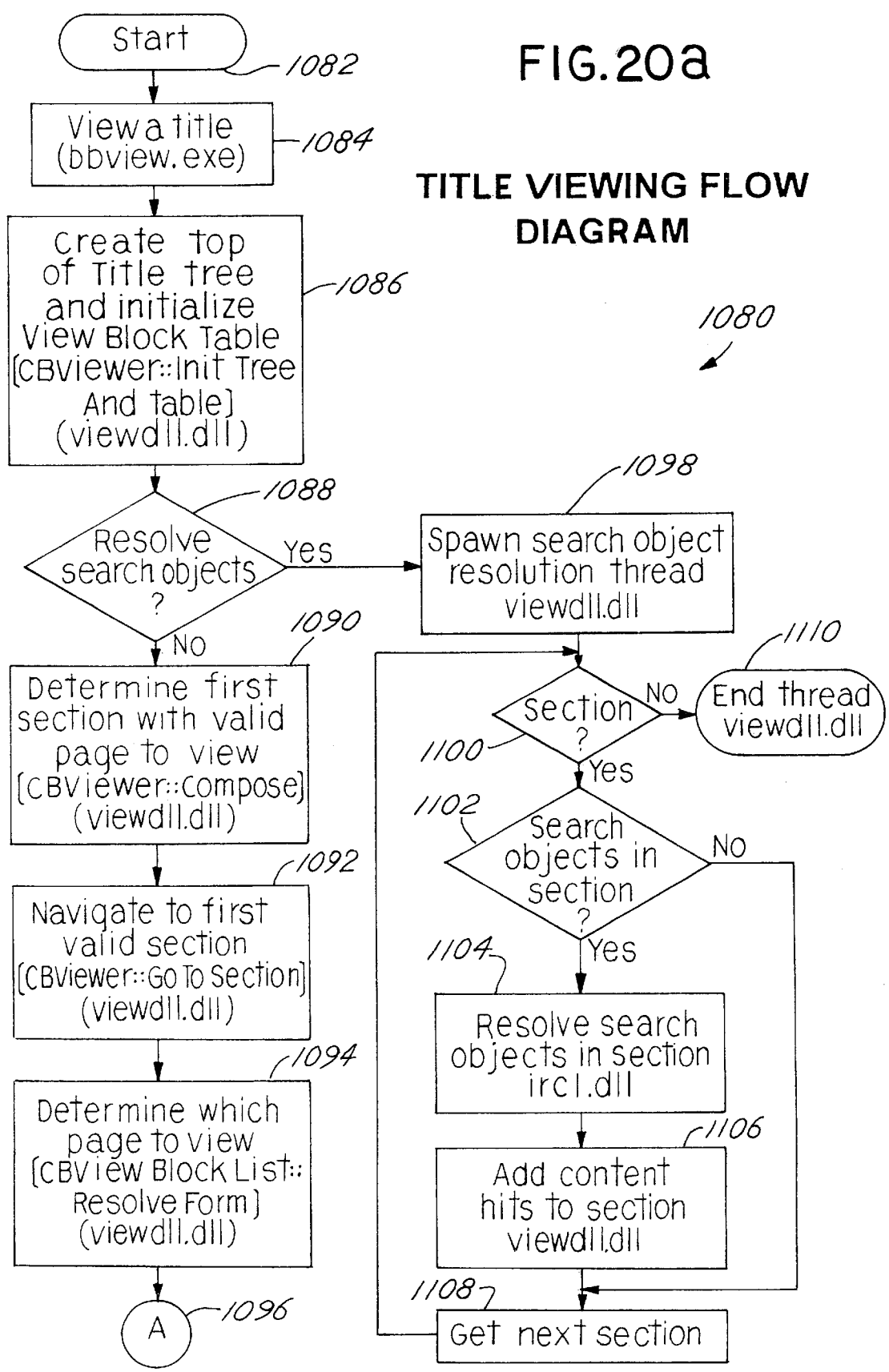

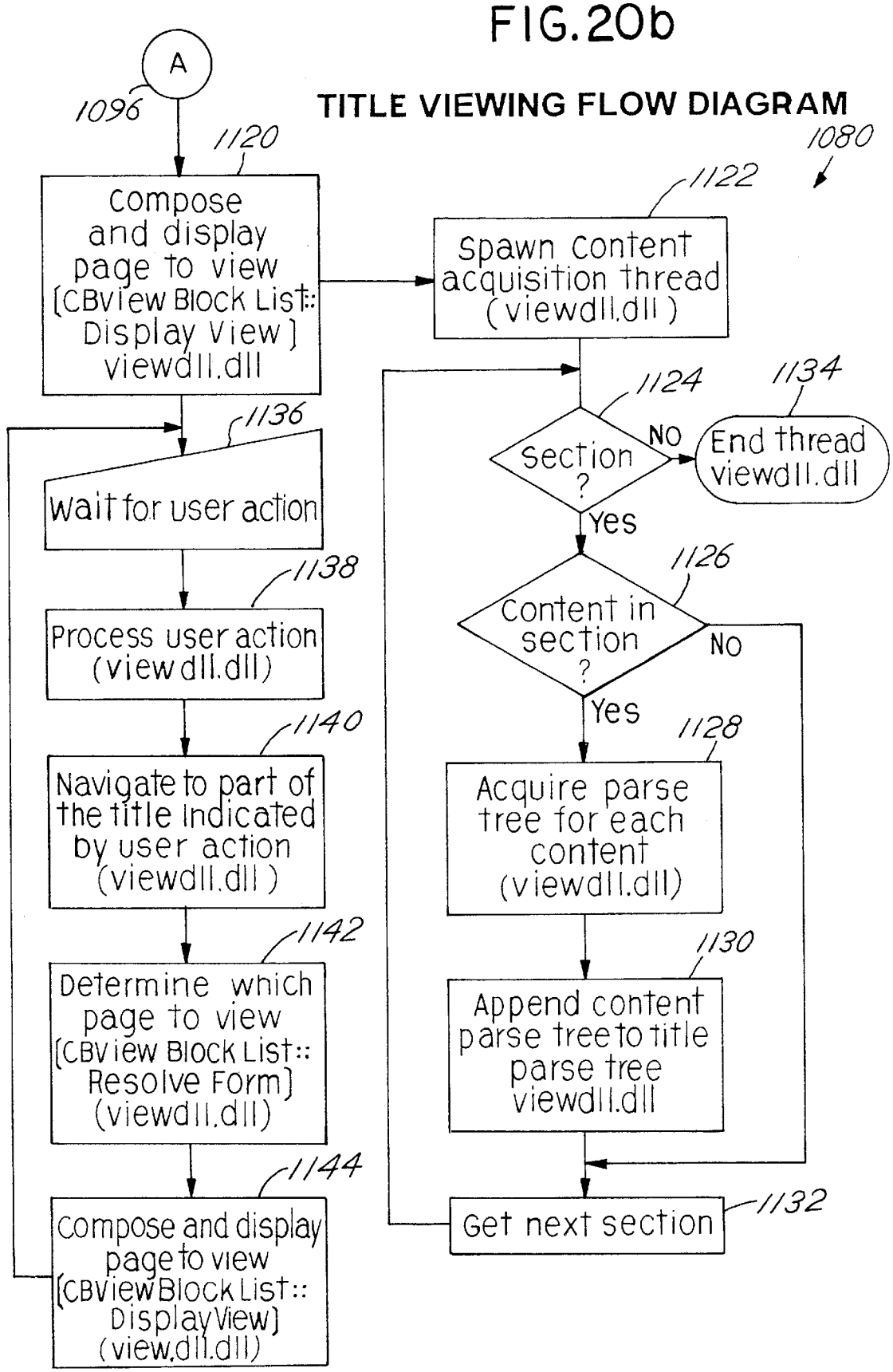

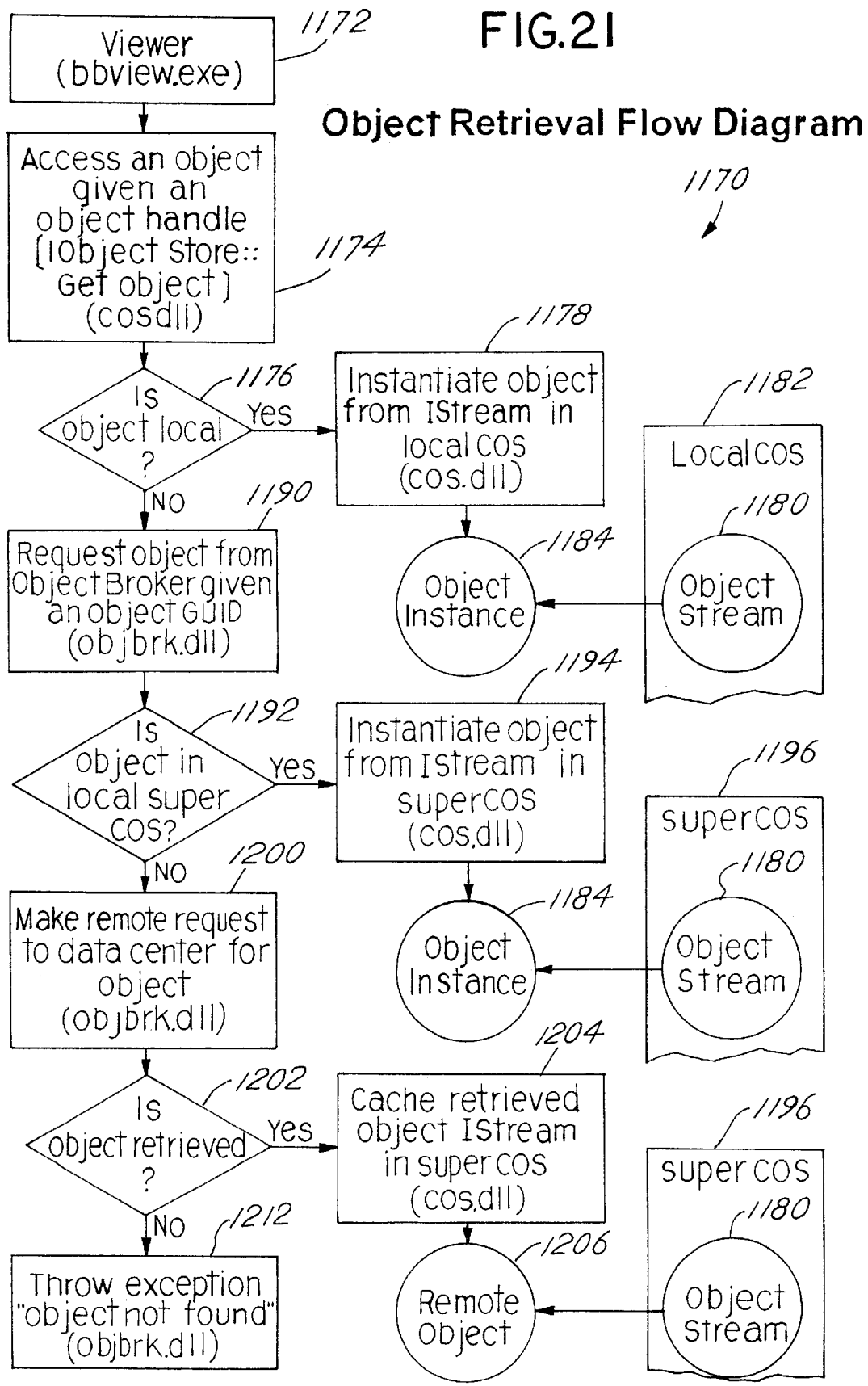

METHOD FOR DELIVERING SEPARATE DESIGN AND CONTENT IN A MULTIMEDIA PUBLISHING SYSTEM

BACKGROUND OF THE INVENTION

1. Field of the Invention

The present invention relates to multimedia publishing systems and more particularly, to a system and method for publishing and viewing titles which include separate content and layouts.

2. Description of the Related Technology

Microsoft Network, Internet, Compuserve, Prodigy, and America On-line are examples of on-line networks. End users typically access these networks using a microcomputer equipped with a modem. During an on-line session, a user can use a variety of information-related services and communications services, including news services, weather services, bulletin board services, E-mail, and the like.

While on-line services are becoming increasingly popular, today's on-line applications are still in their infancy. In fact, significant problems continue to block independent content providers or publishers from deploying the type of sophisticated and compelling services that are necessary to provide a sustainable on-line business. At the same time, providers of existing on-line services are working to find the right technical business model and usability solutions that will promote acceptance beyond just an early-adopter audience.

In any large city, it is impossible for a single individual to keep up with the activities and events unfolding in the community. Consequently, people turn to writers, reporters, editors, critics, and others, for help in understanding and structuring the information available. In a related trend, broadcast media are increasingly unable to satisfy the needs of a diverse populace. Consequently, in most markets, narrowcast media (media that have tailored and distributed their content to smaller, well defined audiences) have become increasingly popular and profitable. In the on-line community this trend will be correspondingly more important.

One problem content providers encounter when creating applications for the mass market is the diverse audience. For example, some customers will be interested in games, some in, business, some in computer technology, and some in movies. What information should content providers deliver to keep their customers satisfied? What is needed is a system that enables a content provider to create applications that blend the content provider's editorial voice with individual customization. For example, from within a particular application, a customer could indicate an interest in the is computer business and/or classical music, and be able to acquire additional information focused on these areas. Similarly, an on-line publication might automatically synthesize and prioritize content based on different consumer preferences.

There are several significant hurdles facing the on-line industry. These problems include:

Quality. Today's on-line offerings lack the sophistication required to attract and maintain a loyal customer following. Today, the technology simply does not exist to create truly compelling applications and services with rich, interactive multimedia features, while at the same time delivering these applications and services over low-bandwidth connections. What is needed is a system that overcomes these limitations, removing existing design constraints and allowing content providers to easily deploy and maintain a new generation of on-line multimedia applications.

Control. Existing on-line services do not provide content providers complete control over the creation of their on-line applications and services. For example, application creation, distribution, customer relationships, advertising and pricing are most often controlled not by the content provider, but rather by the on-line service itself. In addition, no existing on-line service or the Internet's World-Wide-Web allow content providers to create unique, compelling and highly branded applications. What is needed is a system that enables content providers to create and develop their own unique brands, customer and advertiser relations, and business models. Content providers could then make their branded products the focus of customer interactions to the point that customers often may not be aware they are using an on-line service.

Cost. Providers of on-line services are finding that the tools to effectively manage the process of creating, deploying, and maintaining on-line applications and services are limited. Because existing tools do not fully meet the new demands of the on-line world, the ongoing cost of maintaining on-line applications can be prohibitive. What is needed is a system that is specifically designed to support existing business processes and industry standard information interchange formats. Content providers could then create on-line multimedia titles rapidly and with little production overhead.

Additional concerns for an on-line service include flexibility, automatic delivery of applications to the customer, integrating on-line information browsing with agent-based information gathering, customized content, customer receiving-device independence, support for standards, inclusion of advertising, and a familiar production process.

As more content providers move from the realm of print publishing into the on-line world, they are increasingly alarmed by the real constraints placed upon their ability to create an on-line title that is as visually rich and polished as they were able to create on paper. Further, they would like to take advantage of the multimedia capabilities of today's personal computers to enhance their titles well beyond their paper versions. Specific roadblocks they encounter are:

- ■ In the real world, content authors are rarely skilled graphic designers (and vice versa), yet existing multimedia authoring tools require the same person to do both jobs. At the very least, the same tool is generally used for both jobs, creating an opportunity for errors to be introduced.
- ■ Each authored piece of content must go through the layout process before it is published, a time and human-labor-intensive process that constrains a publisher's ability to provide "real-time" information that is also visually compelling. Also, depending on exactly where a new piece of content is to appear in a publication, other parts of the publication that were previously downloaded may no longer be valid and may need to be re-composed and the new version downloaded.
- ■ Graphics and multimedia objects are huge, and take long periods of time to download to the average customer's or consumer's personal computer across a typical modem. Traditional approaches to visually rich on-line publishing require rendering the screen images on the publisher's machine or on the on-line service's mainframe, which then results in the download of fully-rendered graphics, the worst-case scenario for download time. In this context, rendering refers to the creation of a bitmap of a display screen in memory prior to displaying the screen. In addition, while many titles contain repeated text and/or pictures, traditional on-line publishing methods require downloading the text or image again each time it appears in a new screen.

■ The personal computers that consumers are buying today contain sophisticated processors which can do a remarkably good job of rendering rich, visually compelling titles. However, the current approaches to building, delivering and viewing rich, multimedia titles do not utilize the rendering capability of the consumer's machine.

Content providers would like to support different form factors for displaying the same content—for example, a personal digital assistant (PDA) or a 1024×768 pixel screen. Rich, visually compelling titles would have completely different layouts for display on these two different systems.

Content providers might also wish to create both "full" and "lite" versions of their titles, where the "lite" version contains less content for a smaller price.

Additionally, accessibility concerns might require that a content provider create a "large print" title with a completely different layout, or a title with larger controls for persons with less fine motor control of their hands.

Traditionally, supporting different form factors, "lite" versions, and "large print" titles has required creating a separate copy of the content for each title. Doing so adds additional storage overhead to the system, as well as requiring more work to keep the copies identical when updates occur.

Many different systems exist for publishing documents on a computer system. These systems are used to, for example, create newsletters or brochures to promote a particular company. In addition, publications can be used to disseminate information to a variety of customers. A number of programs exist for allowing a user to design complicated layouts for a particular application. Well-known programs such as Microsoft Publisher®, Ventura Publisher®, PageMaker®, and PrintShop® help a user to produce attractive newsletters and brochures.

These publication systems let the user define particular regions of every page for a specific purpose. For example, the user can place a graphic frame that runs along the top of the page to hold a particular image. Such an image may include the title of the newsletter or another related aspect of the newsletter. In a similar way, the user may define other areas of the first page to include one or more text frames for holding text-based information such as the words from particular story. The user designs the text frame to have certain properties, such as height, width, background color, foreground color and other such properties so that the text becomes attractively formatted for the customer. In addition, the user can format the text information within the text frame to have desired font and paragraph characteristics. For example, the user can highlight the characters within the text frame and define that font to be, for example, bold-faced. The user can also choose to only apply a character format to specific words or paragraphs within a text frame.

After defining an initial text frame in these publishing systems, the user can define additional text frames on the same page. For example, one text frame may hold the title of a story whereas the next text frame holds the name of the author and the text of the story. Although this layout is straightforward to prepare, it is also very difficult to modify once it has been produced.

Another category of publication systems include software for electronically publishing stories across on-line networks such as CompuServe, America On-Line, or the Internet. Most of these systems create and display stories that are formatted in a Standard Generalized Markup Language (SGML) or Hypertext Markup Language (HTML). Both the HTML and SGML are standards for tagging text in documents to be displayed in an on-line network. Documents that are formatted in HTML or SGML can be viewed by several widely distributed browsers such as Mosaic and NetScape for the Internet. These browser programs read SGML and HTML tagged documents and display them with proper formatting. However, the formatting information is stored with the browser and is not distributed by the publisher.

Several programs exist for producing documents that are tagged in either the SGML and HTML format. Programs such as Interleaf's WorldView 2 allow a user to create an SGML document with, for instance, bold-face text and hyperlinks to other documents. Once a document has been saved in an SGML format, it can be read by either the Mosaic or NetScape browser. Unfortunately, all of the formatting commands for text or graphics in an SGML or HTML document are embedded, within the document. The Mosaic or NetScape browsers do not reformat these tagged documents, but rather only display the commands embedded in the SGML or HTML documents to a user. For this reason, the designers that produce the SGML and HTML documents must add formatting commands to every new document. In addition, there is little flexibility to change the document's formatting once the tagged document has been produced. Therefore, the process of creating documents for display using SGML or HTML is very inefficient for the document designer.

Other commercially available software programs for producing on-line publications are available in the marketplace. One type of electronic publisher that generates its own specific format of text while retaining the specific layout of the document is the Adobe Acrobat™ software package. Acrobat™ reads and stores documents in a specialized format known as the Portable Document Format, (PDF) for use on the Internet. Other electronic publishing programs are produced by Interleaf, Inc. (Waltham, Mass.), Farallon Computing (Alameda, Calif.) and Common Ground Software (Belmont, Calif.).

Another on-line information system is described in U.S. Pat. No. 5,347,632 by Filepp et al. This patent discusses an interactive computer system network which enables a user to display news information and perform transactional services through a personal computer. However, in the Filepp system, the news information is integrated into display regions.

The invention described in U.S. Pat. No. 5,347,632 includes procedures for formulating objects that have been specially structured to include display data, control data and program instructions. Unfortunately, this system does not provide a separation of the content being displayed from the design. Therefore, the same design layout cannot be shared among disparate pieces of content.

The content displayed in this system is therefore difficult to modify because new design layouts must be transmitted to the users across slow communications lines for every piece of information viewed on the computer monitor. If the content of the information was separated from the design layout at publication time, then design layout objects could reside locally on the user's computer and be available whenever required by a specific piece of content. These disadvantages are overcome by the present invention.

SUMMARY OF THE INVENTION

This invention is a multimedia publishing system designed for creating publications that include components for design, authoring, distribution, viewing, search, personalization, and billing of on-line services. The major benefit of such a system is efficient distribution, content published separately from the layout, separation of responsibilities, hardware independence, automatically placed content and personalized titles.

Efficient distribution is achieved by separating the content and design which enables transmission of high-quality titles over low-speed communications links subject to loss of connectivity. Since the design of many titles remains reasonably static while the content changes on a regular basis, caching the layout designs minimizes the transmission of redundant data and optimized the bandwidth use. Typically, content is transmitted quickly since it consists of tagged components, not the actual pages and controls themselves. This significantly reduces transmission times for downloading a title. Also, when the same content is used more than once in a title, reuse of content is possible, further reducing the amount of information that must be downloaded. Once the content object is downloaded, it can appear instantaneously on as many pages as the publisher desires.

Since the content is published separately, this eliminates the requirement that the content to be laid out by a designer before it can be published. Content can be uploaded to the distribution point and downloaded to consumers' machines as soon as the object is completed. Since the rendering is automatically performed on the viewers' computer based upon the designs in the title's page layouts.

For many content providers, especially those creating on-line publications, the separation of design and content fits the existing production process. Many editors have found the amount of production effort required to put content on-line is inhibiting. With this invention, a design can be created only as needed and the changing content is dynamically flowed into the design cached and located in the viewer's computer.

The separation of responsibilities for layout designers and content authors is enhanced during the publication process because the graphic designers can work on the title and page layouts, while separately, the authors can create the content objects.

The tagged content can be displayed with high quality on a variety of different devices. For example, a content provider can create a title just once, but the title can be viewed on a VGA screen with one column, a printer with many columns, a small screen PDA, an interactive television (ITV) system, a fax machine, or a notebook computer. Device independence can represent a significant cost savings for content providers, and can help to ensure that a content provider's applications are able to effectively reach a large audience.

The tagged components of a structured story (the abstracts, headliner, etc.) can be automatically placed in different parts of a title, making it easier for viewers to read and navigate the information. For example, the headline and abstract of a story might be displayed on the front page, and the headline and body of the story might be displayed on an inside page. This dynamic layout reduces the effort required to publish up-to-date, round-the-clock titles.

BRIEF DESCRIPTION OF THE DRAWINGS

FIG. 10 is a block diagram of the major software components of the system shown in FIGS. 1 and 2.

FIG. 11b is a diagram of an IStorage structure used in the implementation of the superCOS of FIG. 11a.

FIG. 11c is a diagram of a moniker table record and a GUID map used in the implementation of the superCOS of FIG. 11a.

FIG. 12 is a diagram of a title COS used in the implementation of the superCOS of FIG. 11a.

FIG. 18a is a diagram of an exemplary view block table and viewblock lists used by the viewer component shown in FIG. 2.

FIG. 18b is a diagram of an exemplary view block of one viewblock list shown in FIG. 18a.

FIGS. 20a and 20b are a flow diagram of a title viewing process performed by the system of FIGS. 1 and 2.

FIG. 21 is a flow diagram of an object retrieval process performed by the title viewing process defined in FIGS. 20a and 20b.

DETAILED DESCRIPTION OF THE PREFERRED EMBODIMENTS

Figure 1:
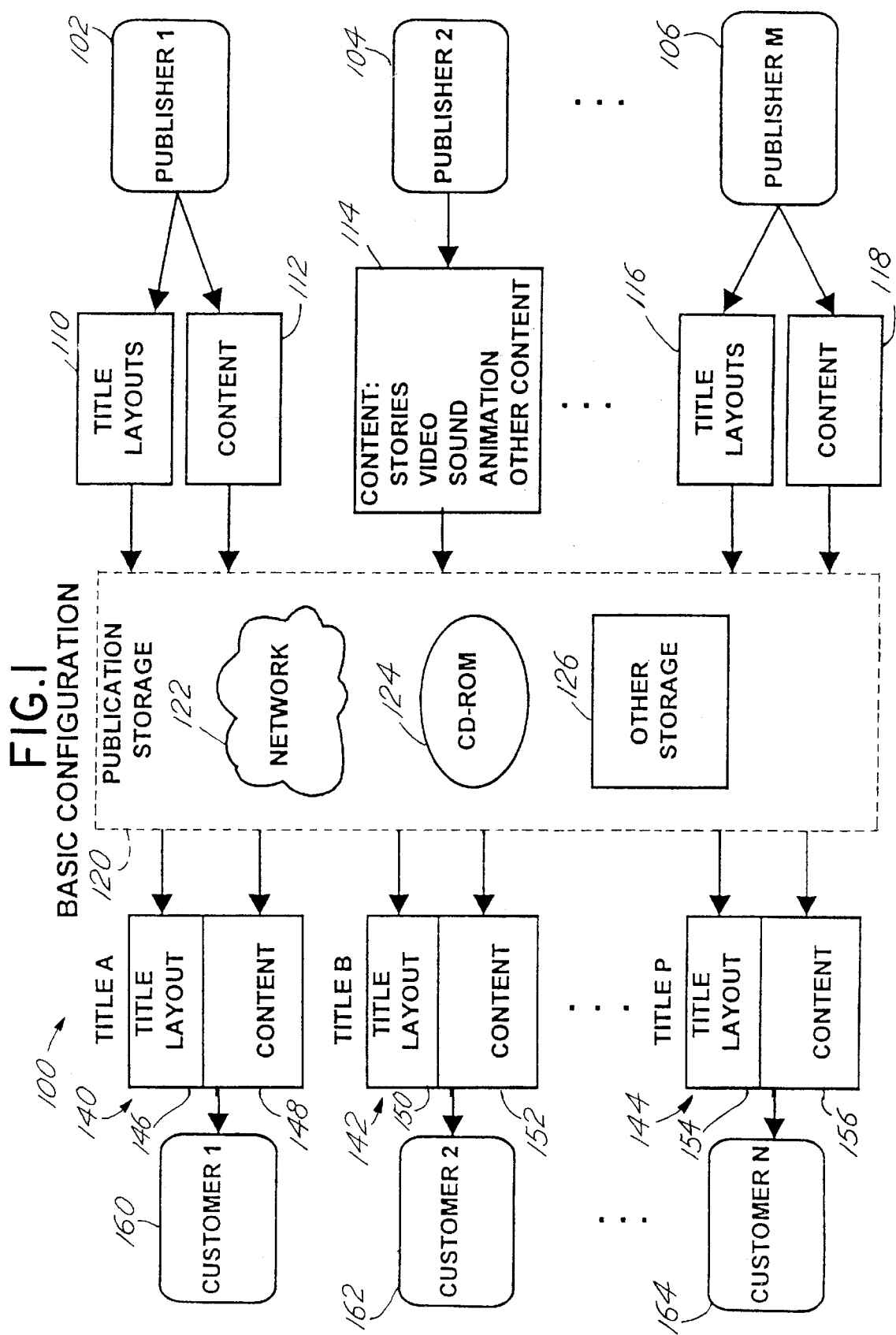
FIG. 1 is block diagram of the basic system configuration of the multimedia publishing system (MPS), which is presently preferred underlying architecture for the present invention.

Reference is now made to the drawings wherein like numerals refer to like parts throughout. For convenience, the following description will be organized into the following six principle sections: Acronyms, Advantages of the Multimedia Publication System, Multimedia Publishing System Overview, Designer Environment at the Publisher, Viewer at the Customer, and Conclusion.

I. ACRONYMS

The following list of acronyms is provided as a reference in reading the remaining sections.

| | |
|---|---|
| AVI - | Advanced Video Imaging. |
| BBS - | Bulletin Board System. |
| MPML - | Multimedia Publishing Markup Language |
| CF - | Component Forms |
| COS - | Caching Object Store |
| DBM - | Database Management System |
| DLL - | Dynamic-link Library |
| GUID - | Globally Unique Identifier |
| HTML - | HyperText Markup Language |
| ICP - | Independent Content Provider |
| IM - | Information Magnet |
| IP - | Information Provider |
| LAN - | Local Area Network |
| MP - | Multimedia Publishing |
| MPC - | Microsoft Network Procedure Call |
| MPS - | Multimedia Publishing System |
| MFC - | Microsoft Foundation Class |
| MSN - | Microsoft Network |
| OCX - | OLE Control |
| OFS - | Object File System |
| OLE - | Object Linking and Embedding |
| PDA - | Personal Digital Assistant |
| RPC - | Remote Procedure Call |
| RTF - | Rich Text Format |
| SGML - | Standard Generalized Markup Language |
| VBA - | Visual Basic for Applications |
| WAN - | Wide Area Network |
| WWW - | World-Wide Web |

II. ADVANTAGES OF THE MULTIMEDIA PUBLICATION SYSTEM

The present invention can perhaps provide the most benefit by using an on-line network. Therefore, this and the following sections present background information on a preferred on-line publication system which is a foundation upon which the present invention can reside.

To enable a new generation of on-line, multimedia applications, an end-to-end system has been invented for developing and using applications and services. The system, called the Multimedia Publishing System (MPS or MP system), preferably uses the Microsoft Network. As an open, turnkey system, the MPS includes components for design, authoring, distribution, viewing, search, personalization, and billing of on-line services and multimedia applications. The MP system allows content providers to offer rich, interactive multimedia applications and services, providing users a compelling and exciting on-line experience. The MP system provides the key to overcoming the previously described hurdles facing the on-line industry.

The Microsoft Network removes the primary barriers to on-line service use. These barriers include cost, difficult user interfaces and lack of inertia. Access to The Microsoft Network is provided by Windows 95, the most recent version of the Microsoft Windows operating system thereby making it accessible to millions of customers. The Microsoft Network is designed to make accessing electronic information easy and inexpensive for any user of Windows 95.

In the MP system, Independent Content Providers (ICPs), also known as publishers, supply the system with stories, publications, newspapers, sounds, graphics movies and much more. The MP system is designed to take projects (e.g. stories, publications, and so forth) produced by the publishers and make them accessible to millions of users on the Microsoft Network. Thus, the basic components of the MP system are a project designer component, a public distribution site, and a viewer component. These components of the MP system are described in detail below.

One unique concept that permeates the MP system is the clean separation of content and design. In this context, content is defined as the actual data that is to be displayed to the user. The design of a project is how that information gets displayed to the user (e.g., its format on the computer screen). An illustrative example would be an electronic newspaper, wherein the content is the text and graphics of the stories, while the design is the layout and style of that data. The design of the electronic newspaper is what makes it look like a newspaper on a computer monitor, whereas the content is the data that makes up the designed screens.

In the MP system, the content and the design are stored as separate objects in the public distribution site so that many different pieces of content can be viewed with the same appearance. An object can be defined as a discrete data item or data structure which can be stored in persistent storage or in memory. The object may include computer instructions for manipulating the data. Once a designer using the project designer component at the publisher site has created a particular page layout that is attractive, many pieces of content can be viewed from within that layout because of the separation of content from design in the MP system. The system keeps track of links between a piece of content and its associated page layout, but does not actually format the data in the content with a particular style.

As will be discussed in more detail below, the designer creates projects with design and content information for a particular publisher. Continuing the example from above, a project could correspond to an entity that owned a series of newspapers and other media businesses. Within each project, one or more titles would correspond to the actual newspaper. Each title has one or more sections, and can be thought of as similar to the sections in a standard, printed daily newspaper or other periodical such as a magazine.

Within each section are pages that define the information that is displayed to a single screen on the customer's computer visual display. When viewing a particular title, the customer will normally look at only one page of information at a time. On each page are controls which contain instructions for gathering, formatting and displaying the linked content onto the page. When a customer looks at information on a page that is provided by a publisher, the customer is really looking at content that has been formatted within pre-defined control regions on the page.

One important facet of this invention is the concept of viewing the same content objects in many different ways. As discussed above, content objects are viewed after being formatted by a particular linked control. The control knows how to format a particular piece of content by looking at the style that has been defined for that content by the designer and then comparing that style to a linked style sheet. Because each control on a page can have a different associated style sheet, different controls on the same page can each display the same linked content in varying formats. In one control, the title might be displayed using a 14 point font and bold emphasis, whereas the same piece of content in a different control on the page can be displayed in a 12 point font and italic emphasis. The ability of each control on a page to have its own associated style sheet is a powerful tool for the designer to use to format attractive content on a page.

Unlike prior publishing systems, content (such as text or graphics) in the MP system is never reformatted into the marked style. The content is only displayed to the user in the chosen style. Therefore, should the designer choose to change a particular style, only the style sheet property of that style needs to be altered. The next time that the content is displayed using the altered style sheet, the content will be displayed with the properties of the new style. Other advantages and benefits of the MP system are discussed in detail below.

To provide more detail on the advantages of the MP system, the following section presents an overview of the Multimedia Publishing system.

III. MULTIMEDIA PUBLISHING SYSTEM OVERVIEW

This section presents an overview of the configuration and major components of the preferred Multimedia Publication System. Beginning with a description of the important concept of separating design (or title layout) and content, this section continues by discussing the major components and configuration of the MP system. In addition, a description of the container hierarchy is discussed in conjunction with FIGS. 1–4.

The objects utilized by the MP System include a project; title; content folder and, optionally, subfolder; section and, optionally, subsection; window; page; control; style sheet; and various content objects (such as stories, images, audio, so forth). These objects will be explained in more detail below in reference to FIGS. 1–7. It is important to realize that these objects need to be stored in a non-volatile computer memory such as a hard disk drive.

Figure 2:
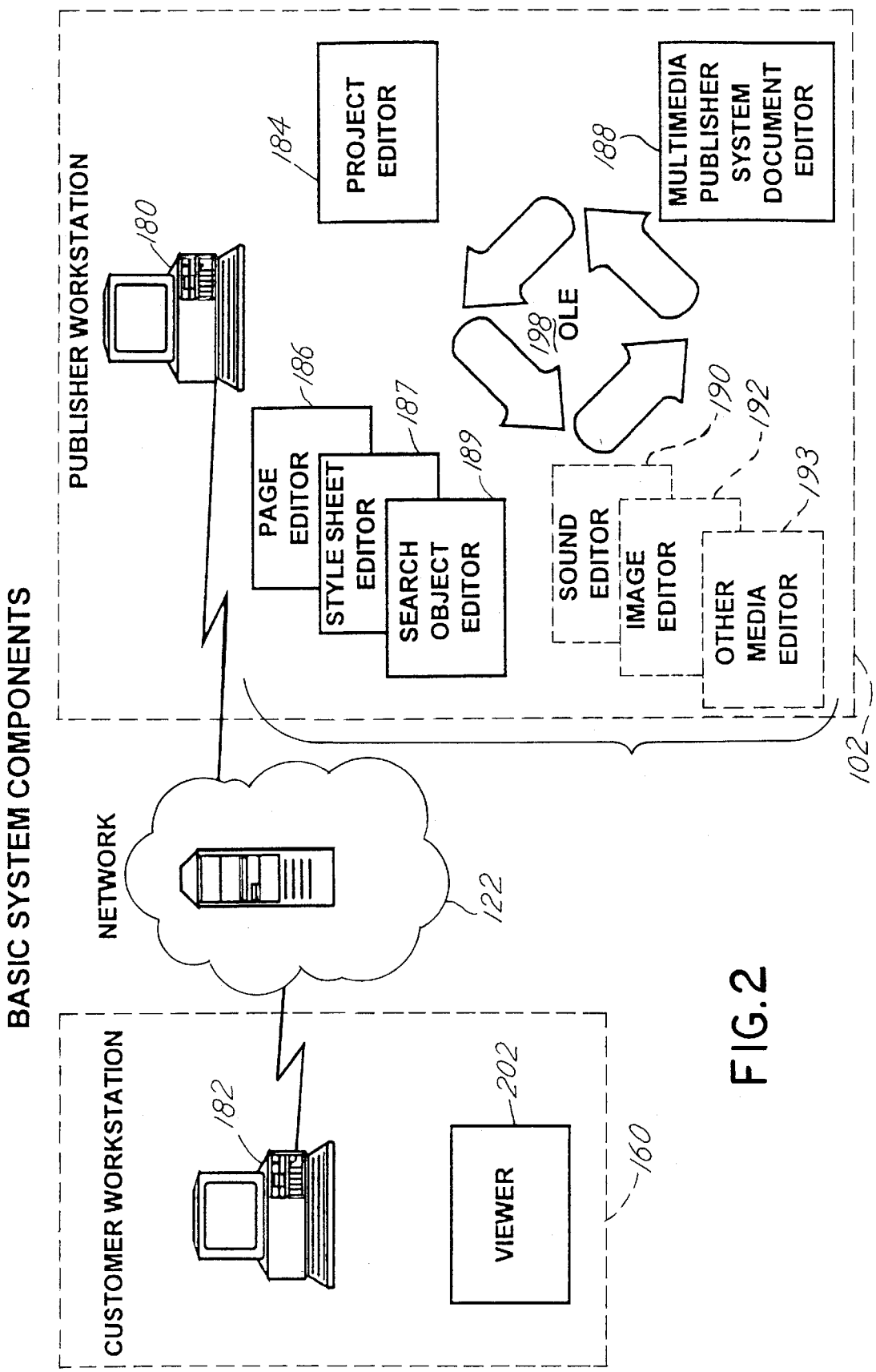
FIG. 2 is a diagram of the major system components of the MPS shown in FIG. 1.

The natural way of storing related and ordered objects is in a data structure, such as an acyclic graph. The presently preferred way of storing the MP system objects is called a caching object store (COS). In the presently preferred MPS, each title corresponds to a COS. There is least one COS at the publisher workstation and in each MPS server at the publication storage and distribution center (FIG. 2). Each customer workstation also has a COS so that the customer can store and retrieve MP system objects when assembling content into controls on pages.

A title may be broadly defined to encompass a publication (e.g., newspaper), service (e.g., stock quotations) or application (e.g., multimedia encyclopedia). When a title is viewed, the viewer opens a title file which represents the title. This title file is a COS file. Typically in the on-line scenario, this would be a skeleton title. A skeleton title is a COS file which contains only a root moniker and no actual objects. A moniker is an object used in the implementation of the COS and contains identification and status information about COS objects.

A superCOS is a COS file which contains more than one subordinate COS, known as a subCOS. For example, a superCOS at the customer workstation is used to cache objects which have been remotely retrieved from the host data center. As long as these cached objects are not out of date or flushed, the viewer will be able to quickly provide that object the next time it is requested rather than retrieving it from the data center again. This gives the MP system a tremendous speed advantage over other on-line systems.

Figure 5:
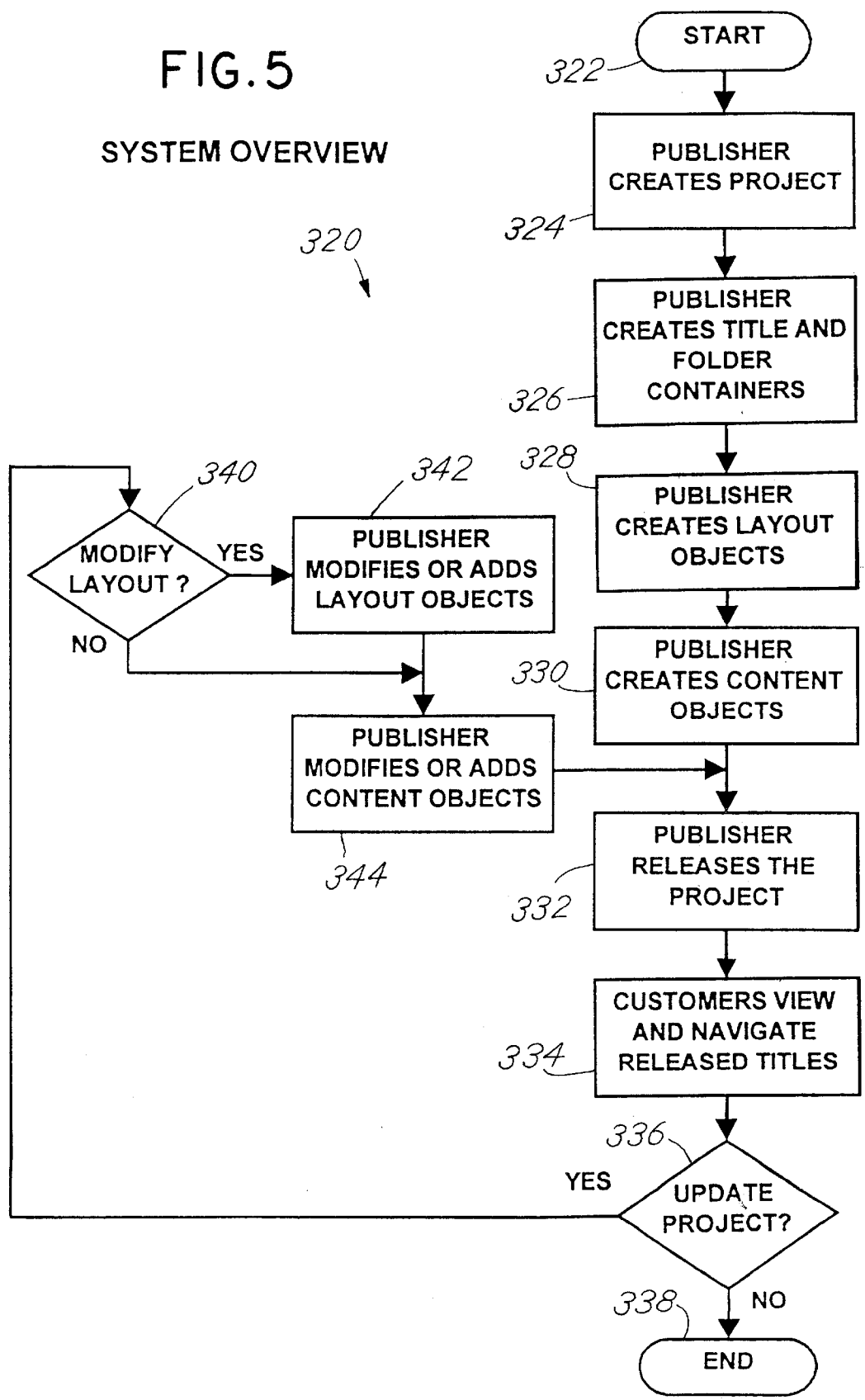
FIG. 5 is a overview flow diagram of the MPS processes performed using the system of FIGS. 1 and 2.
Figure 6:
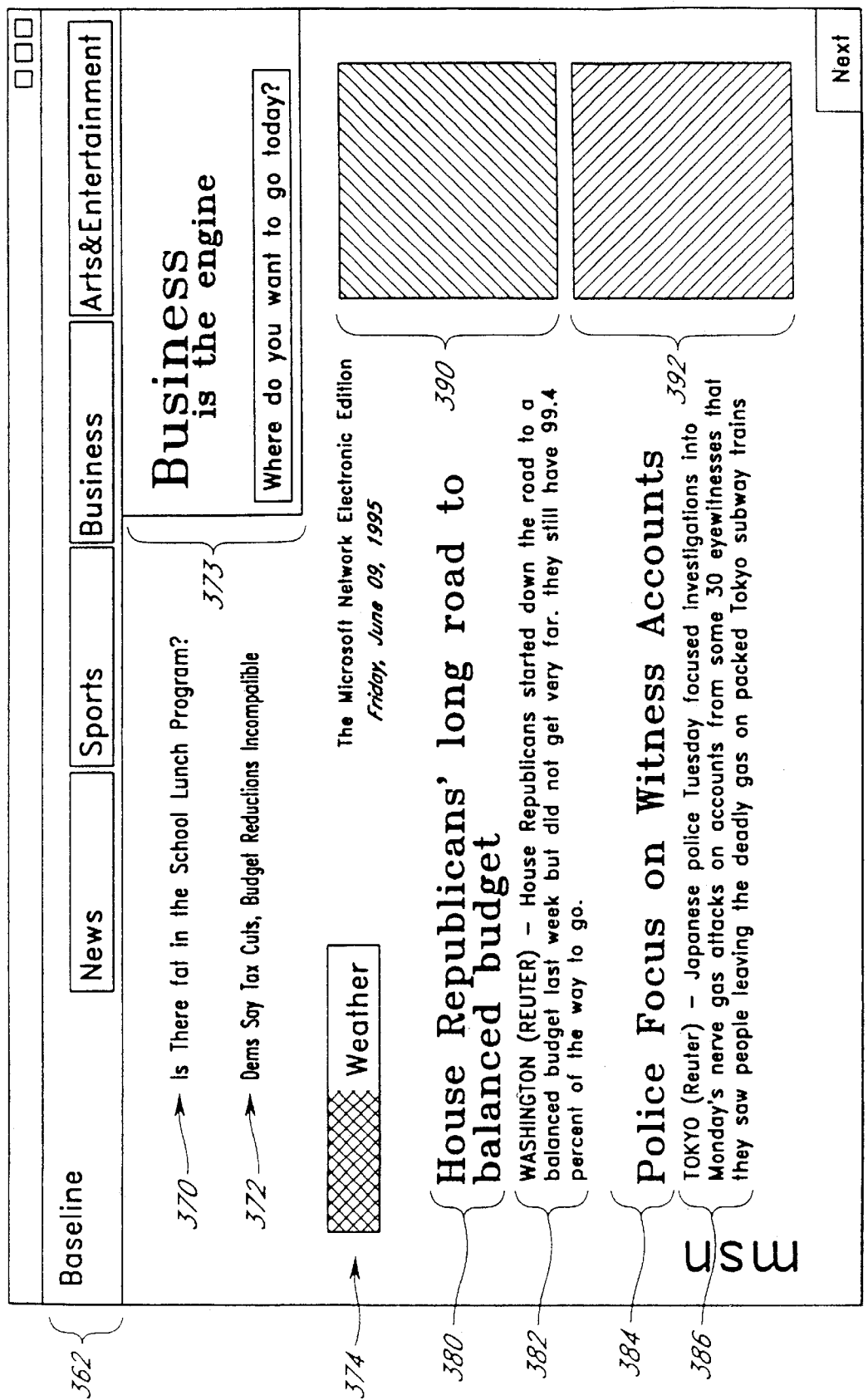
FIG. 6 is an exemplary screen display of one page of a title as displayed by the viewer of FIG. 2.
Figure 7:
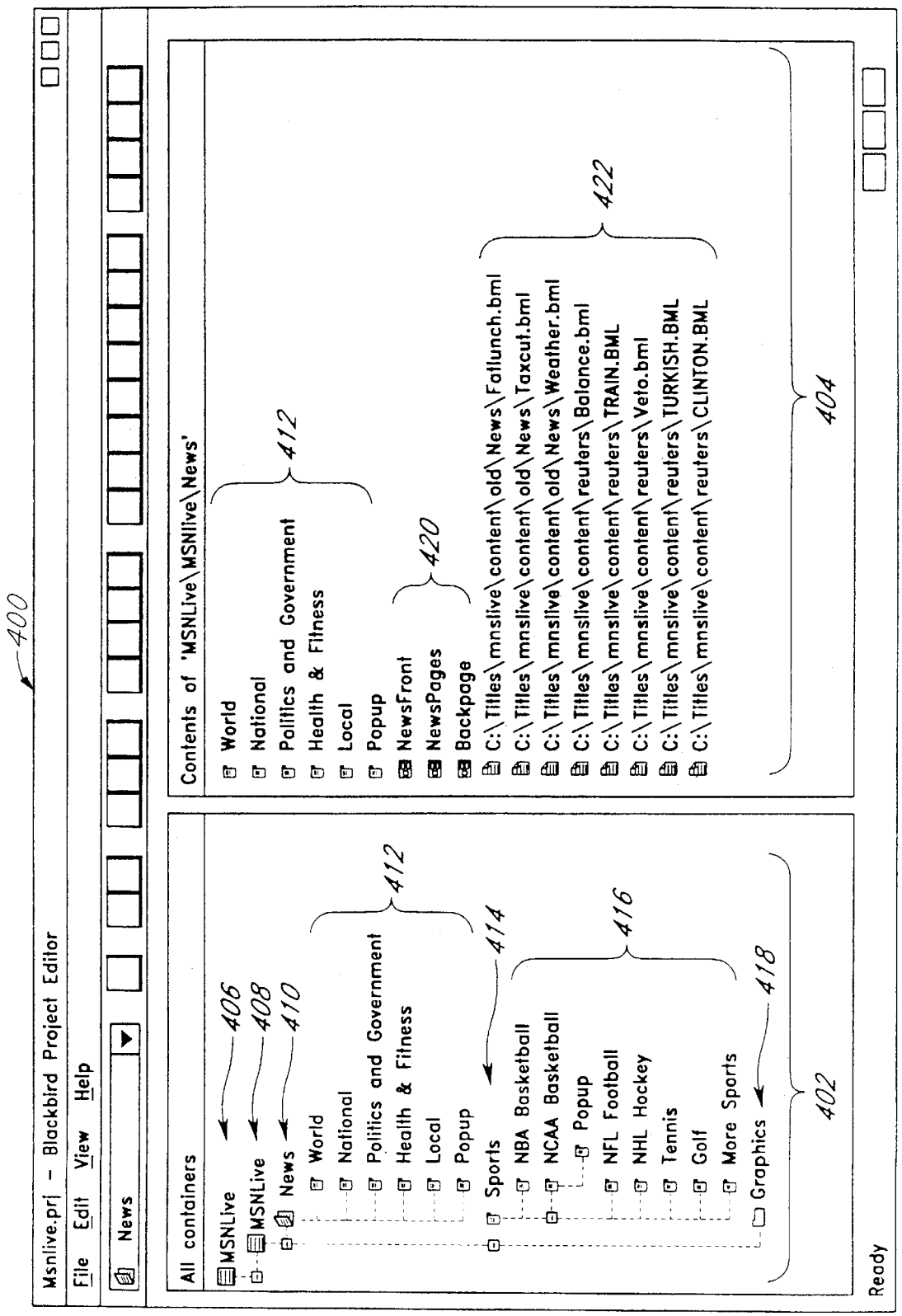
FIG. 7 is an exemplary screen display of the parts of the content and layout for the title displayed in FIG. 6.

A top level system flow diagram is presented in conjunction with FIG. 5 and exemplary Viewer screen displays that could be seen during the processes of the system flow diagram are described in conjunction with FIGS. 6 and 7. An example of the rendering process and a query that are used to display the title to a customer are presented in conjunction with FIGS. 8 and 9. Finally, a top level software executable and API/DLL view of the system is presented in conjunction with FIG. 10.

A. Separation of Design and Content in the Multimedia Publishing System

As discussed above, the MPS architecture maintains a clean separation between design information and the content to which that design will be applied. A publisher's collection of page layouts is in the form of one or more titles. A title is a collection of page layouts, in a particular sequence which relates to the order in which pages will be viewed. The page layouts describe how the client area of a window will appear when a page is rendered. Rendering refers to the creation of a bitmap of a display screen in memory prior to displaying the screen. A complete page layout is created by placing controls on a blank page layout, where each control delineates an area where some piece of content should be displayed. Settings on each control determine the proper place to look for the content to be displayed in that control.

The content takes the form of discrete objects, each of which compose one unit of information, e.g., a story or a picture. These content objects are of well-known and public data formats, and may be created using any tool that supports these data formats. Content objects generally do not have formatting information encoded within them.

When the publisher has created the title (with its page layouts) and the content objects, the title and content are published together to the public distribution point. Consumers download the title and content objects to their personal computer, where the MPS viewer software uses the page layouts in the title to compose the content in the visually rich form designed by the publisher.

B. System Configuration

Referring now to FIG. 1, the basic system configuration of the multimedia publishing system (MPS) 100, which is a preferred embodiment of the system 100, will now be described. By convention, the term title is used to describe the overall plan or instructions for assembling the complete on-line MPS application on a customer's computer.

Much of the power of the MP system 100 resides in its ability to fully separate design and content, unlike existing on-line and multimedia publishing tools which require a publisher or content provider, such as a first publisher 102, a second publisher 104, or a publisher M 106 to integrate design and content. In the MP system, titles, such as a title A 140, title B 142, or title P 144 can be divided into two parts: the content (148, 152, 156)—the information such as bitmaps, video clips, audio, animation, or stories that make up a title—and the title layout, also termed the design (146, 150, 154)—the overall look and feel of a title. To separate content and design using the MPS rather than placing content directly on a page, a publisher can place the content, such as a set of content objects 112, 114, or 118, in one or more containers of a title and then create sections or subsections having pages with special controls, such as a set of title layout objects 110 or 116, that dynamically find and display the content at runtime.

Using this technique a publisher can change a title on an ongoing basis by merely updating the content 112, 114, 116 which has been placed into various folders or containers within the master title. When a page is displayed, it shows the updated content. This is called dynamic title synthesis or dynamic synthesis, and allows content to be continually updated without any need to modify and update the title design consisting of the individual pages, controls and hand-placed content used to display the content.

When publishers use dynamic synthesis they are creating titles which contain placeholders that will be filled-in by the changing content. When dynamic synthesis is utilized, a title is used as a template and a pressing is the displayed, filled-in title. Each time the publisher updates the content in a title and makes it available for customers (also known as end-users or client end-users), such as a first customer 160, a second customer 162 or a customer N 164, the publisher is creating a new release of that title. When the customer starts to view that release, a "pressing" is made which contains part or all of the content in the release.

A major advantage of this approach is flexibility. Some parts of a title may be created by hand-placing content directly on a page, and other parts may be created using dynamic synthesis. Notice, however, that content hand-placed directly on pages is static—it changes only when the people involved in creating the title update the pages.

Returning to the creation of title layouts and content by the publisher, after creation, the title layouts 110, 116 and content 112, 114, 118 are released and stored in a publication storage 120. The storage 120 can be implemented in many forms, such as a network 122, CD-ROM 124, and other means of storage, such as bulletin boards, magnetic media, cable television and so forth.

The presently preferred network 122 is the Microsoft Network (MSN), which can be accessed, for example, by Microsoft Windows 95. Of course, the MPS is designed to be portable so that it can be used on any on-line network including but not limited to, Internet, America On-Line, Compuserve and Prodigy.

In the presently preferred embodiment of the storage 122 as the MSN, many customers will use a MSN Explorer tool to acquire and activate MPS applications.

The MSN Explorer is the integrated navigation tool within Windows 95 that is also used to browse the MSN hierarchy. Sophisticated customers may use other more advanced MPS features, such as search, scheduling, and automatic delivery, assuming these features have been activated by the publisher. Besides browsing via the Explorer or scheduling automatic home delivery, there are several additional ways customers can obtain MPS applications. For example, an individual application may be distributed via floppy disk or CD-ROM 124, it may be distributed through E-mail or bulletin boards, or the application may be directly accessible via a link in other applications (such as the Microsoft Network yellow pages system). In each of these situations, the MP system 100 acquires an application for the customer.

C. System Components

Referring now to FIG. 2, the preferred basic components of the MP system 100 will now be described. The system 100 includes a set of tools for designing, developing and viewing multimedia on-line applications. A publisher, such as the publisher 102, utilizes a publisher workstation (also known as a computer or machine) 182 and a Designer software environment 194 to create and publish the title layouts 110 and content 112. In the system 100, a publisher could possibly just create content and use the title layouts of another publisher. The title layouts and/or content are preferably stored in a network 122 that includes a high-performance server for hosting on-line applications. The preferred network 122 will be further described in conjunction with FIG. 3. A customer, such as customer 162, utilizes a customer workstation 182 and a runtime Viewer software component 202 to find and activate MPS titles, stored on the network 122, on a visual display at a workstation 182.

The Designer 194 is an extensible design and development environment that includes several preferred software components. These include a project editor 184 to manage tiles, containers, and objects; a page editor 186 to create and layout pages; a style sheet editor 187 to edit style sheets; a search object editor 189 to create search objects; a word processor, such as a MPS Document Editor 188, for creating content optimized for the MP system 100; and optional third-party tools, such as a sound editor 190, an image editor 192, and another media object editor 193 to create and modify sound, image, video, animation and other content objects. For authoring textual content, the preferred document editor is an enhanced version of the Microsoft Words®6.0 word processing program for creating tagged, hypertext documents. Together, these programs form the Designer Component 194.

The project editor 184 is used to invoke a style sheet editor 187 that is used to create and edit style sheets. The style sheet editor 187, and portions of the project editor 184 and page editor 186 will be described in detail in subsequent sections of this discussion.

The MPS Designer 194 is a page or forms-based development system similar to Visual Basic. The development environment is graphical and easy to use. Controls, which represent the components of a MPS application that will appear on-screen, are laid out within MPS pages. MPS pages and controls are preferably based on Object Linking and Embedding 198 (in FIG. 2) (OLE), Microsoft's component software technology. OLE, which presently is at version 2, is further described in Inside OLE 2 and OLE 2, Programmer's Reference, Volumes 1 and 2, all of which are published by Microsoft Press. In addition, the System Overview chapter of Class Library User's Guide for the MFC Class Library, Microsoft corp., 1993, provides further relevant information. However, other compound document architectures such as OpenDoc could be used as well.

A major feature of OLE is interoperability, the basis for integration between applications. This integration brings with it the need to have multiple applications write information to the same file on the underlying file system. OLE defines a model called OLE Structured Storage for treating a single file system entity as a structured collection of two types of objects; storages and streams. These objects act like directories and files, respectively.

The OLE Structured Storage model generally implements these objects; applications rarely, if ever, need to implement them. These objects, like all others in OLE, implement interfaces: IStream for stream objects, IStorage for storage objects.

A stream object is the conceptual equivalent of a single disk file. Streams are the basic file system component in which data lives; each stream has access rights and a single seek pointer. Through its IStream interface, a stream can be told to read, write, seek, and perform a few other operations on its underlying data. Streams are named by using a text string; they can contain any internal structure because they are simply a flat stream of bytes. In addition, the functions in the IStream interface map nearly one-to-one with standard file-handle-based functions such as those in the ANSI C/C++ run-time library.

A storage object is the conceptual equivalent of a directory. Each storage, like a directory, can contain any number of substorages (subdirectories) and any number of streams (files). Furthermore, each storage has its own access rights. The IStorage interface describes the capabilities of a storage object, such as enumerate elements (dir), move, copy, rename, create, and destroy. A storage object itself cannot store application-defined data except that it implicitly stores the names of the elements (storages and streams) contained within it.

The OLE Structured Storage technology solves problems associated with previous flat file systems through the extra level of indirection of a file system within a file. With OLE, a particular application can create a structured hierarchy where the root file itself has many substorages. Each substorage can have substorages within it, and so on.

This structure solves the problem of expanding information in one of the objects: The object itself expands the streams in its control, and the implementation of storage determines where to store all the information in the stream.

The MP system 100 includes a number of pre-packaged controls such as navigation controls, rich-text controls, multimedia controls, and other special controls specifically designed to support the creation of MPS applications. Because the MPS is based on OLE, third parties can also design their own controls for use within the MPS (using the Microsoft OLE Control Development Kit that is bundled with Microsoft Visual C++ 2.0). In this way, the MPS development environment is fully extensible so that customers can add new capabilities to their MPS applications by purchasing additional controls from third parties or by creating their own controls. The MPS development environment also includes a Visual Basic for Applications (VBA) scripting and debugging system.

While content is displayed within controls that have been laid out on MPS pages in the MPS Designer 194, content can be authored in any number of existing Microsoft and third-party tools. One such tool for authoring hypertext is the MPS Document Editor 188 that supports special MPS features for creating and tagging MPS text. Other existing tools for creating bitmaps, complex drawings, and other multimedia content can be used to create the content displayed within any particular OLE Control. In addition, most existing OLE Controls (.ocx executable programs) will work in the MPS environment although they may not be optimized for on-line applications. For example, a standard AVI OLE Control could be placed in an MPS application.

The controls that are part of the MP system 100 are optimized for low bandwidth on-line delivery of data. However, the use of high bandwidth data delivery is within the scope of the present invention. The MPS 100 is designed to operate with information that can change from minute to minute, daily, or monthly. So while the MPS can be used for creating static titles that are hand-crafted and cannot be easily updated on an ongoing basis, the main focus of the MP system 100 is to provide an efficient, cost-effective mechanism to manage the creation and management of dynamic, continually changing on-line applications. At the same time, as an open development environment, many of the tools commonly used for creating static multimedia content can easily be incorporated into the MP system 100.

When activated by the customer, the Viewer 202 examines the components of a selected title to see if any of the information required to display the pressed title needs to be acquired. It then acquires this information from publication storage 120 or local storage at customer workstation 182 and organizes it so that it can be displayed to the customer 162. Thus a pressed title captures the set of information that is displayed to the customer at a given point in time. In other words, some titles might produce a new pressing every day, or more frequently, as the content changes. On the other hand, other titles may be static; when a static title is activated there is no need to do another pressing, since the content has not changed.

While pressing a static title may seem unnecessary, the process of organizing and displaying the pressing can take into account customer preferences and display device characteristics. For example, suppose a customer activates a static title on a laptop when using the laptop screen and then later activates the same title when the computer is attached to a larger display. The second activation will result in another pressing to take into account the much larger screen area, if the publisher has enabled such an option. When the title is activated, the MPS Viewer 202 determines if the title is out of date; acquires any needed information; and then, if necessary, creates and possibly personalizes the pressing.

The MPS Viewer 202 enables customers to perform the following actions within the limits defined by content providers: select and personalize the information a title acquires, modify the overall structural properties of titles, personalize the look and feel of titles, manage and archive the content customers acquire, and view billing and pricing information.

The requirement for the preferred publisher workstation 180 is a Windows 95 workstation with the minimum hardware configuration necessary to run the MSN sysop tools and to store and display the titles under development. The preferred Windows 95 workstation has, at a minimum, an Intel 486 processor running at 33 MHz or better with eight Megabytes of memory. A 9600 baud or faster modem is required to run the MSN sysop tools. For multimedia titles, this includes a MPC2 compliant (multimedia configured) workstation.

The MPS Viewer 202 should be installed on the customer workstation 182 before an MPS title is activated. The presently preferred customer workstation is capable of running Windows 95. To make this installation easy, the Viewer 202 is automatically installed onto the customer workstation 182 the first time the customer connects to MSN and the MP system 100 is enabled. MPS titles may include resources such as fonts, Dynamic Link Libraries (DLLs), and OLE controls that are placed into the resource container or folder of MPS titles. Before customers can view such titles, these resources are installed on their workstation 182.

D. Network Storage

Figure 3:
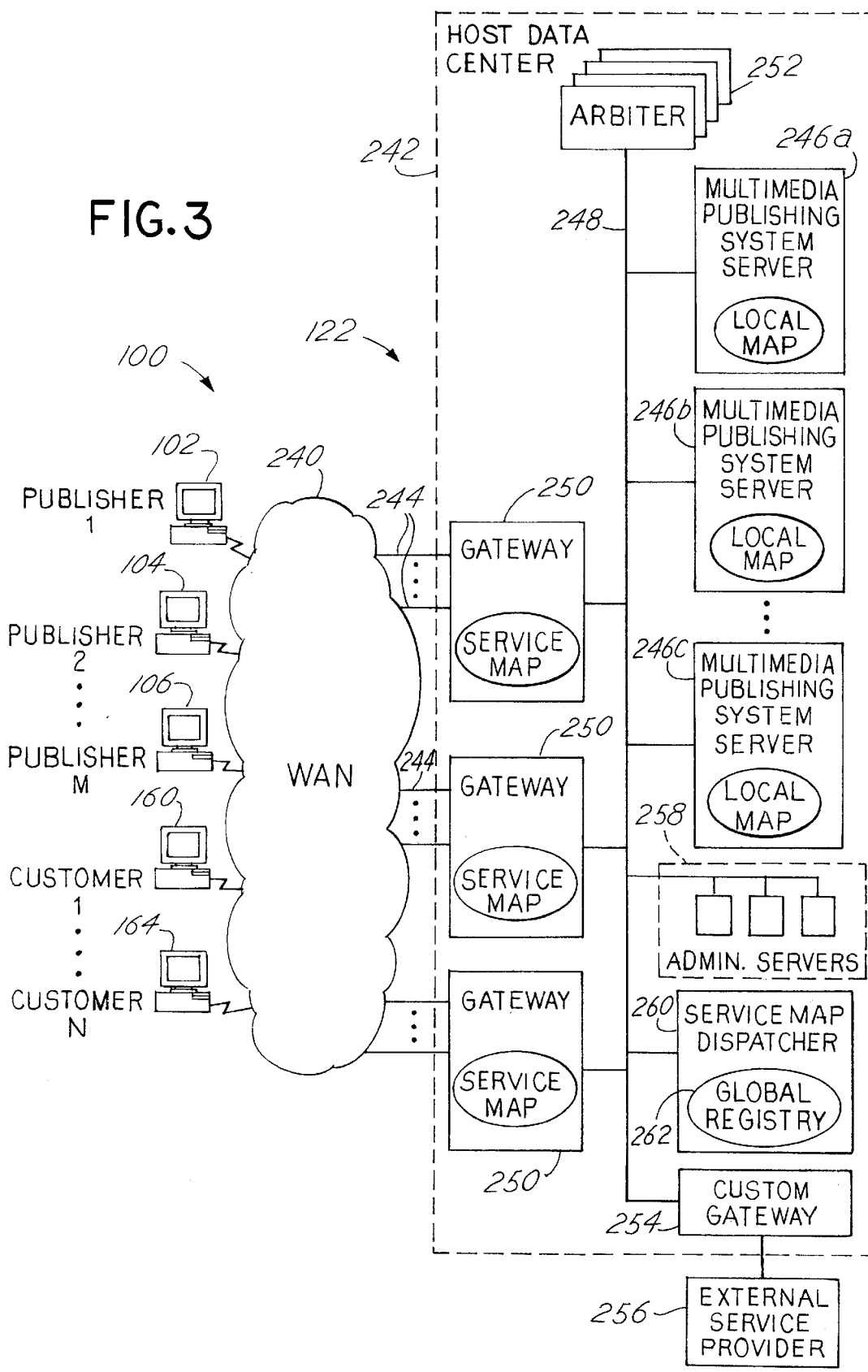
FIG. 3 is a diagram of an exemplary on-line system for publication storage and distribution.

Referring to FIG. 3, an exemplary network storage subsystem 122 will be described. FIG. 3 is a high level diagram illustrating the basic components of an on-line network 122 in accordance with one embodiment of the invention. Multiple publisher workstations 102, 104, 106 and customer workstations 160, 164 are connected to a host data center 242 by a wide area network (WAN) 240. The publisher workstations preferably have high speed connections to the WAN 240. The wide area network 240 includes WAN lines 244 which are provided by one or more telecommunications providers, and which allow end users (i.e., publishers and customers) over a wide geographic area to access the host data center 242 via modem. The WAN lines 244 preferably include both X.25 lines and ISDN (Integrated Service Digital Network) lines.

The host data center 242 comprises a plurality of application servers 246 connected to a high speed local area network (LAN) 248 (which may include multiple LANs). Each application server 246 has a unique server ID. As shown in FIG. 3, three of the servers 246 are MP System servers (246a, 246b and 246c). Also connected to the LAN 248 are multiple Gateway computers 250 also referred to as Gateways, which link incoming calls from end users to the application servers 246.

It is envisioned that the host data center 242 may advantageously have on the order of one hundred Gateways 250, and between several hundred to several thousand application servers 246. A host data center of this type will be able to handle tens of thousands of simultaneous user logon sessions.

As described below, the server side of each on-line service is preferably implemented using one of the following: (1) a single application server 246, (2) a set of "replicated" application servers (i.e., application servers which run the same service application or applications) that provide access to replicated (and locally-stored) copies of service "content" data (i.e., data provided to end user's of the service), or (3) a set of replicated application servers that provide access to server-specific (non-replicated) service content data.

The host data center 104 also includes multiple Arbiter computers 252 that monitor, record and process certain types of transactions to ensure consistency among replicated application servers. The host data center 104 also includes one or more custom Gateway computers 254 which link the host data center 104 to one or more external service providers 256, such as a credit card service that validates and executes credit card transactions.

The host data center 104 also includes a number of administrative servers 258. The administrative servers 258 perform administrative functions such as accounting, billing, network management, backup, system security, performance analysis, and server-to-service allocation.

To route user service requests to the appropriate servers 246, the Gateways 250 must have some way of determining the unique IDs of the servers that are currently handling the requested services. This is accomplished by means of a service map (not shown), which contains information about every service and server 246 in the host data center 242.

The service map is preferably generated by a service map dispatcher 260, which may be implemented on a single computer.

In addition to generating a service map, the service map dispatcher 260 maintains a central repository of information referred to as the "global registry" 262. The global registry 262 contains various information about the present configuration of the host data center 242. For example, for each service group, the global registry 262 indicates the IDs of the servers 246 of a service group, and the identity of the Arbiter computer 252 (if any) which is assigned to the service group.

Further disclosure of the preferred network 122 is provided in a copending application also assigned to the assignee of the present application, Microsoft Corporation, entitled "Architecture for LAN-Based On-Line Services Network", U.S. Ser. No. 08/503,307, filed on Jun. 7, 1995.

E. Container Hierarchy

Figure 4:
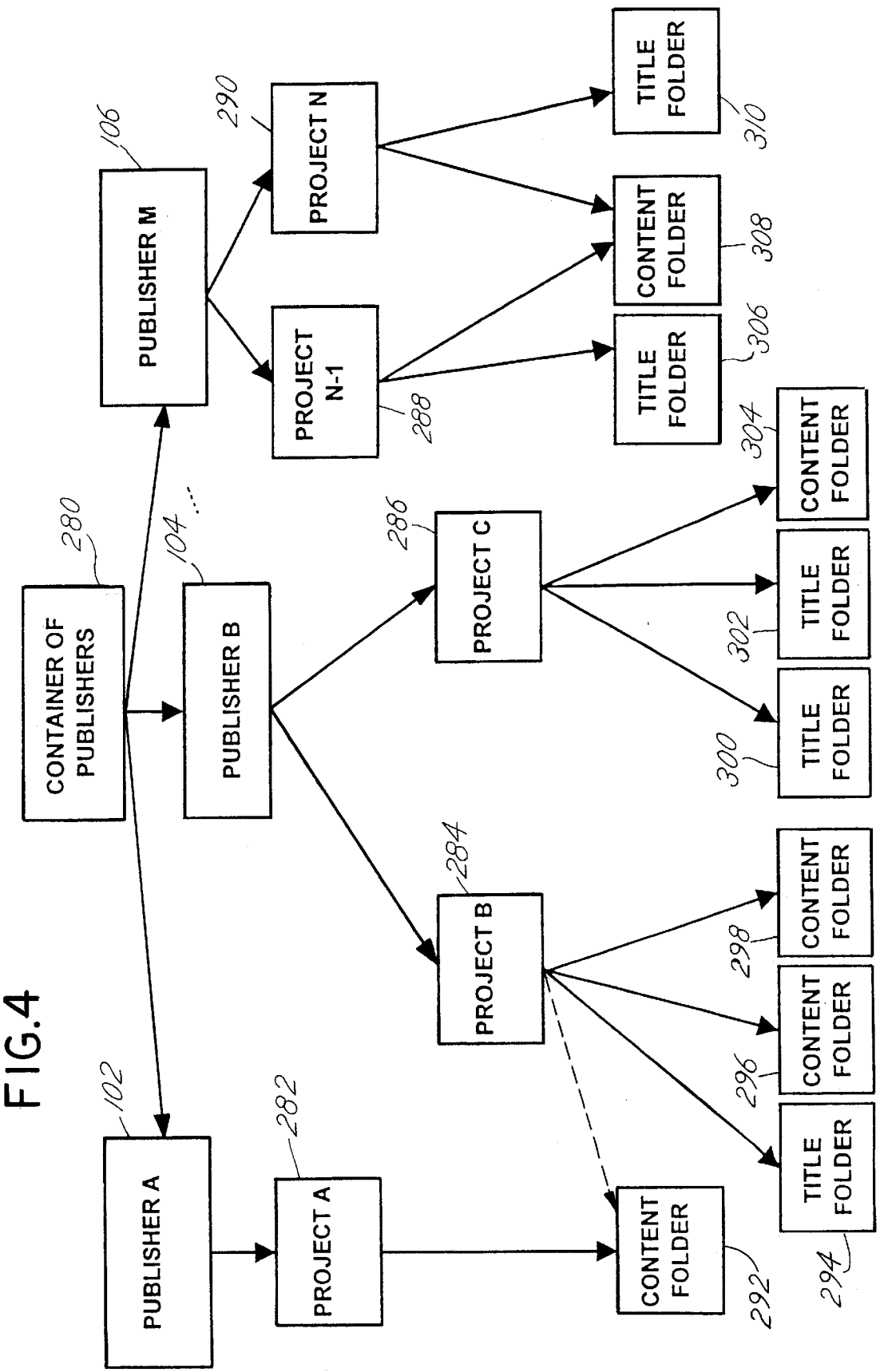
FIG. 4 is block diagram of a hierarchy of containers or folder for a plurality of publishers using the system of FIGS. 1 and 2.

Referring now to FIG. 4, the high level hierarchy of containers for a plurality of publishers using the MP system 100 will be described. In the presently preferred embodiment, the MP system 100 utilizes a specific directory structure with the MSN directory tree. This structure is rooted at a specific folder (specified via the MSN global registry 262) known as a container of publishers 280. Every publisher 102, 104, 106 will have at least one container or folder called a project. For example, the publisher 102 has a folder called Project A 282, the publisher 104 has two folders called Project B 284 and Project C 286, and the publisher 106 has two folders called Project N–1 288 and Project N 290. Content folders and/or titles are dropped into the folder of the publisher.

Allowing for multiple projects satisfies the needs of a large publisher. For instance, a project could be assigned to one magazine (e.g., gardening) and another project could be assigned to another magazine (e.g., motorcycling). Thus, each month's issue could be archived as a title according to volume and number in its respective project.

As an example of how projects could be configured, Project A 282 only has a content folder 292; Project B has a title folder 294, and two content folders 296 and 298, along with a link to the content folder 292 of publisher A 102; Project C has two title folders 300 and 302 that could share a content folder 304; Project N–1 has a title folder 306 and a content folder 308; and Project N has a title folder 310 and shares content folder 308 with Project N–1. Publisher 102, for example, could be a provider of raw statistics in content folder 292 but does not want to generate title layouts. The publisher 102 may have an agreement with the publisher 104 for the publisher 104 to allow access and use of the content in the content folder 292. The publisher 106 has two projects 288 and 290 that share the content folder 308, for example, due to the common subject matter of titles in title folders 306 and 310. As illustrated in FIG. 4, a project, such as the project 286, may contain multiple titles folders.

F. Operational Description Including Top Level Flow Diagram

Referring now to FIG. 5, a top level flow diagram of the processes performed using the MP system 100 will now be described. The flow diagram and this description introduce the process 320 a publisher 102 or information content provider (ICP) would use to design and distribute MPS titles.

As previously stated, a title is a publication, application, or service created using the MP system 100. For example, the publication may be a monthly magazine, wherein each issue of the magazine is a new title. A title consolidates the set of instructions for assembling the information that is displayed to the customer 160. Customers see titles as icons on the Microsoft Network, on CD-ROMs, or in a file system. By double-clicking (activating) on the title, name or icon, the customer can interact with the title.

1. People and Tasks involved in Title Creation

The MP system 100 is designed to support large teams creating complex on-line applications, as well as small teams creating individual works (and anywhere in between). This section, however, discusses only the more complex, high-end operations. In simpler scenarios, one person could perform more than one of the roles described below, and the amount of materials (stories, artwork, advertisements, and so on) would be more limited than the materials described here.

The process of creating and publishing a MPS title can be broken into a title-design phase and a release-creation phase. The process is set up so that all of the content and layout that is common across releases can be performed once in the preparatory design phase, and then left alone. This allows for a smaller team and faster turnaround in producing each release.

a. Title Design

The process of creating a new title begins with the editor. Assisted by business development staff, the editor decides on a target customer base, and on a concept for the title that will appeal to that base. This design team then develops that concept into a proposed organization for the contents of the title.

Before content can be put in place, a framework for the title must be created. This involves:

● Creating a section hierarchy within the title.
● Creating content folders to store stories, advertisements, and other pieces of content.
● Creating search objects in each section of the title that draw content from the appropriate content folders using specified criteria.

In some organizations, this work will be done by the editorial staff. In others, it may be done by the production staff.

Once the basic framework is in place, the art department can create artwork to fill in the title's common elements. This includes:

- A style sheet describing font usage and text layout.
- Page layouts for sections that dynamically gather their content.
- Page layouts for sections that are always the same (cover, title pages, mastheads, and so on)
- Logos.

Optionally, organizations may want to include developers in the title design process. For example, the particular application being designed may benefit from the use of custom designed OLE Controls. These controls could be purchased, or developed in-house using the Microsoft Visual C++ development system. Additionally, the advanced features of the Blackbird system, including accessing the API or scripting controls to respond to events or automatically perform actions at runtime would require some development work, either in the high level scripting language (VBA), or in a lower-level language such as C++.

b. Authoring and Title Release

Once the framework is created, the staff can now turn their attention to creating individual releases. All of the work done in the conceptual phase above is potentially re-usable for every release. In fact, for a title with little need for detailed artwork, the rest of this process could merely be a matter of dropping edited content (including advertisements) into content folders.

For dynamic titles, most (and potentially all) of the work is done within the Content Authoring environment. For static titles, it could all be done within the Title Design environment. In practice, most releases will involve some work in both of these environments.

i) Writers Provide Tagged Content

Content authors—including editors, writers, reporters, and forum managers—generate content, including structured stories, using the content authoring environment. Writers compose the textual content that appears in a title (or a release of a title). They hand their materials off to the editorial staff. The editorial staff is in charge of the overall content of the title. For multimedia titles, this role is very similar to the director of a motion picture or television program.

The content authoring environment supports a variety of tools, such as, for example, a MPS document editor. The MP system 100 also supplies tools to specify and manage links and to specify story properties. Third-party tools may also be added to the content authoring environment.

From a content author's perspective, creating structured stories can be as simple as typing them in the MPS document editor and applying certain styles. More sophisticated content can be created though a variety of means, such as including links to graphics or placing special properties on a story.

For content providers that do not want to expend much effort creating tagged content, the MP system 100 includes MPS document editor templates that handle most of the tagging for the author.

ii) Editorial Staff Chooses Content

Once the editorial staff has chosen the stories they wish to include in a release and are satisfied with the content of those stories, they pass them on to the art department to select and insert appropriate artwork, and to the production staff to place in content folders.

iii) Art Department Supplies Specific Art

The artistic staff is responsible for designing the more graphical aspects of the title. In the early conceptual phase, graphic artists work with the editor to design a distinctive look and layout. This includes font styles, colors, titles, logos, and page layout templates. The term "art department" is used in the broadest sense here. In the multimedia world, the role of an art department goes beyond traditional print-based artwork.

The art department in many cases inserts the artwork into the stories and tags that artwork so that it will presented appropriately (placed inline in the story text, as a wrap, or as a pop-up). They then pass the stories on to the production staff to be placed in content folders. In the case of static titles, the art department designs new pages and gives them to the production staff to be placed in the title framework.

iv) Advertising Department Supplies Copy

The advertising sales staff sells advertising space in each release. The advertising sales department collects copy from advertisers who have bought space in the release, and delivers the copy to the production staff to be placed in content folders.

v) Production Department Does "Paste-up", Proofing and Release

The production staff does the fundamental tasks, such as paste-up, necessary to put a title or release together. Once the production staff has everything that goes into the release, they "paste up" the release by placing everything in its appropriate place and performing a "test-pressing" to make sure that nothing is missing. The editors, art staff, production staff, and advertising staff review the test-pressing to make sure that everything looks and works correctly. Once everyone is satisfied, the production staff places everything on the publisher's server and releases it to be copied to additional servers at the Microsoft Network data center.

2. Top Level Flow

The process 320 begins at a start state 322 and continues at a state 324 wherein the publisher 102 uses the MPS project editor 184 (FIG. 2) to create a project on their workstation 180. A project, such as project C 286 (FIG. 4) contains all the information needed to build and distribute one or more titles and any associated content.

Moving to state 326, within the project, the publisher 102 creates titles and content folders, such as title 300 and content folder 302 (FIG. 4). A title consists of nested sections that contain MPS objects such as pages or search objects. Folders typically contain MPS content objects such as stories or pictures. To make the process of managing titles, folders, and MPS objects easy to understand and use, the preferred MPS project editor 184 (FIG. 2) looks and works like the Windows 95 Explorer.

Proceeding to state 328, the publisher 102 uses the MPS project editor 184, page editor 186, style sheet editor 187, and search object editor 189 (FIG. 2) to create the MPS layout objects such as pages, styles, and search objects. The page editor 186 is also used to place controls (each control is a program responsible for handling a displayable region) on a page.

Moving to state 330, the publisher 102 creates content objects using the MPS Document Editor 188, or the publisher can use third-party tools, such as the sound editor 190 or the image editor 192, that produce formats that the MP system 100 can interpret. The authoring and processing of content objects is further disclosed in a copending application also assigned to Microsoft Corporation, entitled "Structured Documents in a Publishing System", U.S. Ser. No. 08/503,307, filed concurrently herewith.

The creation of content objects could also be done prior to any of states 324, 326, or 328. After the content objects are created at state 330, the publisher invokes the page editor 186. If not previously done at state 328, the publisher lays out each page with at least one control. Selecting a control on a page lets the publisher bring up a context menu, of which one item is a Properties selection. Choosing the Properties selection brings up a control's property sheet. Among the property sheet pages are a story page and a picture page. The story page allows the publisher to choose a story content object that is to be displayed in a story control. The publisher could enter a path name to the desired content object. Alternatively, pressing a "..." button brings up a Content Browser dialog which allows for browsing within the project to find a desired story content object. The picture page is used for choosing a picture object to display in a control. The publisher could enter a path name to the desired content object. Alternatively, a Content Browser dialog allows the publisher to choose a picture content object from within the project. Other types of content objects are associated with a layout object in a similar way. Further descriptions of the property sheet pages are provided below in conjunction with a discussion of controls.

Proceeding to state 332, the publisher 102 releases the project. In the presently preferred embodiment, releasing a project makes the titles, stories, and other MPS objects available on the Microsoft Network 122. The MP system 100 automatically connects to the network 122 and makes the titles in the project available to the customers 160, 162, and 164 (FIG. 1). Alternatively, the MP system 100 can release the title to CD-ROM 124 or other storage/communications media.

Continuing at state 334, the customer 160 uses the MPS Viewer 202 (FIG. 2) to read and page through (also termed navigation in an electronic publication) the released titles. As parts of the title are accessed, they are cached on the customer's computer 182 for fast access. The viewer 202 organizes and composes the objects it has collected and displays them to the customer 160.

Over time, the publisher 102 can update the project and the MP System automatically tracks the changes. Decision state 336 determines if the publisher desires to update the project. If the publisher does not wish to update the project, process 320 completes at end state 338. However, if decision state 336 is true, that is, the publisher desires to update the project, the process 320 moves to a decision state 340 to determine if the publisher 102 desires to modify the layout in the project. If so, the process 320 moves to state 342 wherein the publisher modifies one or more existing layout objects or adds one or more new layout objects. If the decision state 340 evaluates to be false, or at the completion of state 342, the process 320 moves to state 344 wherein the publisher modifies or adds one or more content objects. At the completion of state 344, process 320 proceeds to state 332 wherein the project is released again. Releasing the updated project ensures that the proper set of layout and content objects are made available to the customer 160 (FIGS. 1 and 2).

G. Exemplary Screen Display of Title

Referring now to FIG. 6, an exemplary screen display 360 of a page of a title as displayed by the Viewer 202 on the visual display at the customer workstation 182 (FIG. 2) will now be described. The screen display 360 corresponds to a World News section of a MSNLive title using a page layout which has been named NewsFront by the designer. A tabbed horizontal bar 362 near the top of the screen 360 is handled by a caption button control and shows the major sections of the title. By selecting a section name (by use of a pointer device like a mouse, not shown, but which is a part of or connected to the workstation 182), the customer 102 can navigate directly, through a link, to the selected section.

Below the bar 362 of screen 360 are two headlines 370 and 372 which are the result of an outline control that can be used as links to corresponding stories on another screen of the title. Block 373 in this example contains an advertisement resulting from a picture control. Block 374 contains a graphic and text resulting from a picture button control that provides a link to a weather screen. Areas 380 and 384 display headlines for corresponding abstracts 382 and 386, respectively, and are the result of an outline control. By selecting the headline 380 or 384, the customer can navigate to the body of the corresponding story on another page of the title. Areas 390 and 392 display picture objects corresponding to the headlines 380 and 384, respectively, and are the result of picture controls.

The objects and placement of the objects on the displayed page 360 are determined by the publisher 102. Of course, other objects or placements of objects could be utilized by the publisher 102.

H. Exemplary Screen Display of Project Editor Window

Referring now to FIG. 7, an exemplary screen display 400 of the parts of the content and layout for the example title displayed in FIG. 6 will be described. The Project Editor window 400 is the main interface for the Designer 194 (FIG. 2). The window 400 is intended to closely mimic the Microsoft Windows 95 Explorer. Using this window 400, the publisher can open, edit and save a project, as well as release the contents of that project to the MSN Data Center 242 (FIG. 3). An approximately left one-third of screen 400 is a display area 402, also known as a left pane, that shows the hierarchy of containers of one project for a publisher and allows the user to navigate through it. The left pane shows only containers (folders, titles, and sections). An approximately right two-thirds of the window 400 is a right pane 404 that shows the contents of a container selected in the area 402 by the user of the project editor 184 (FIG. 2).

Referring to the left pane 402 of the window 400, the top level of the hierarchy of containers is the project "MSN-Live" 406. Just below the project is the title "MSNLive" 408, which in this example has the same name as the project 406. In another example, the project could have a plurality of titles, such as a January issue of a magazine "X", a February issue of magazine "X", and so forth. Below the title in the example hierarchy are two sections: "News" 410 and "Sports" 414. Also at this level in the hierarchy is a content folder 418 labelled "Graphics", which holds the picture objects used by the project 406. Below the sections 410 and 414 is a set of subsections 412 for the "News" section 410 and a set of subsections 416 for the "Sports" section 414. The "News" section container 410 has been selected by the user, which is evidenced by the highlighting of the section label "News" and the opened section icon to the immediate left of the "News" label.

Referring to the right pane 404, the layout objects and content objects directly contained within the selected container in the left pane 402 are shown, e.g., the objects of the "News" section container are displayed in this example. The left pane 404 uses standard Explorer views, as well as a special view built for the window 400, which sorts according to a user-defined order and allows the user to change the order by dragging and dropping each objects' icon. The objects are preferably grouped by type of object, such as, for example, subsection objects 412, page layouts 420 and content objects 422. The order of the pages and content objects is significant. The title maintains a sequence ordering of the sections, pages, and search objects, as this is important in determining how the title is displayed. Within a section, the pages have a sequence that determines the order in which they are used to press content and the order in which they are displayed when the user browses sequentially. In a static section, pages are displayed in the order shown in the project editor window 400.

A dynamic section uses the dynamic story control (FIG. 8) to display stories within a section. The stories are sorted according to rules specified on the section's property sheet and then are concatenated or linked together. The stories are then filled into the dynamic story controls on each page in the section, in the order in which the pages are arranged in the section. If there are more stories than there are pages, the last page is re-used repeatedly until all content has been pressed. For instance, in FIG. 7, the Backpage in pages 420 would be reused.

Toolbar buttons and corresponding menu commands allow the publisher to quickly add new objects to the titles and folders within the project 406. Clicking a button will add a corresponding object to the container selected in the left pane 402. Only those objects that are allowed to be in the selected container have their corresponding toolbar buttons and menu items enabled.

I. Example of Rendering Process

Figure 8:
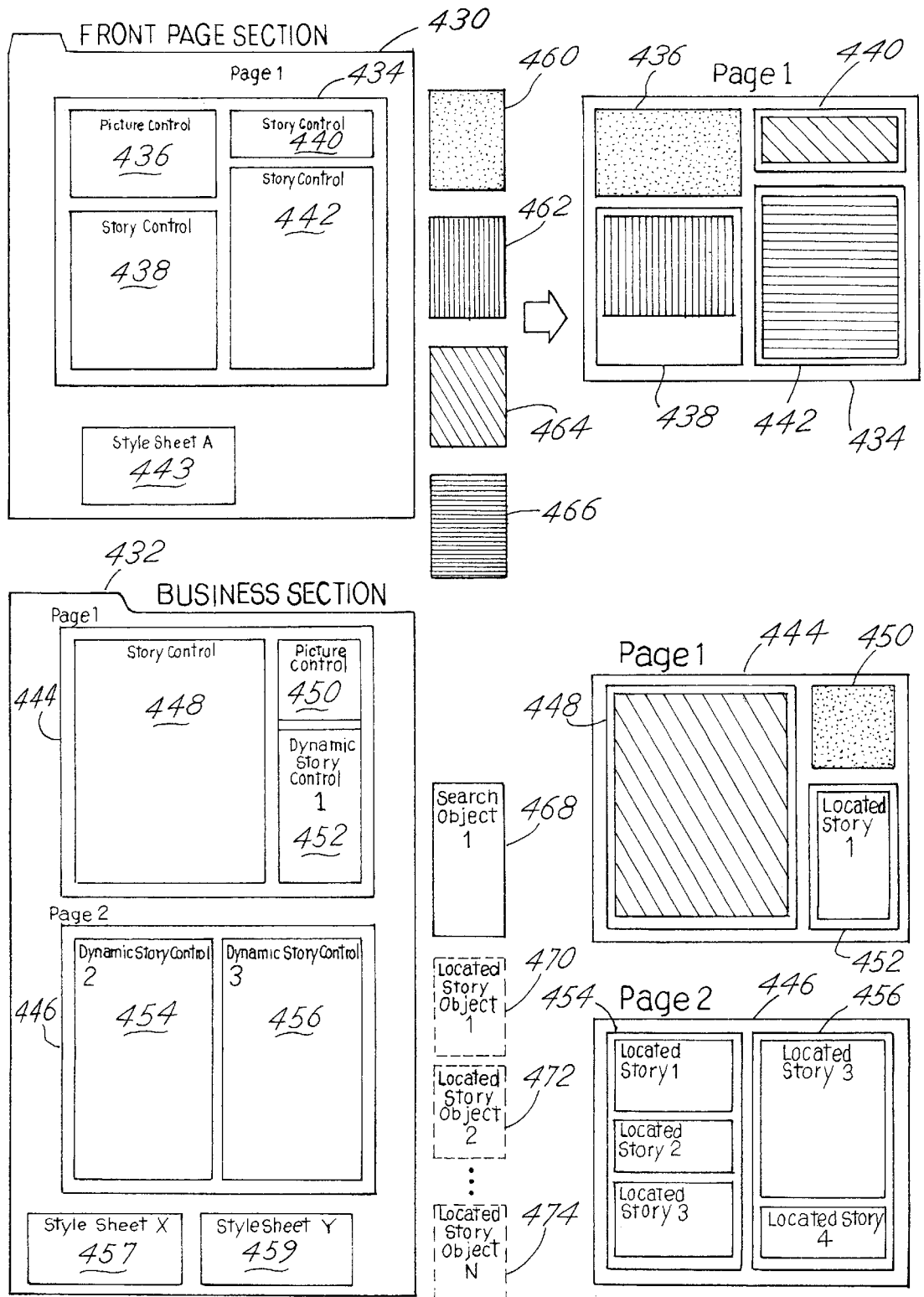
FIG. 8 is a block diagram of the interaction of page layouts, controls, style sheet and content objects at the viewer of FIG. 2.

Referring now to FIG. 8, the interaction of page layouts, having controls, and objects at the Viewer 202 (FIG. 2) of the customer's workstation 182 to render pages will now be described. The Viewer 202 supports the display of information through windows. The placement, organization, and number of windows is under the control of the publisher 102. Viewer windows are Windows 95 frame windows. These windows are completely under the control of the designer. The designer controls the Viewer 202 by creating a title. The title sets the size and standard elements (title bar, Min/Max buttons, caption, border, menu bar) of the various windows displayed by the Viewer 202.

The entire client area of a viewer window is used to display a series of pages. Each page contains a set of controls that are used to display content, to navigate through the title, and to gather information from the customer. In response to customers actions or other events, the page that is displayed may change during the course of running the title. This behavior is determined by the publisher 102. A title may have more than one window visible at any given time, and popup windows may be modal or modeless. Only one title may be displayed within a Viewer window at any given time.

FIG. 8 presents a diagram of a front page section 430 and a business section 432 for a title, such as a newspaper.

1. The Front Page Section

The front page section 430 contains a page 434 which has a picture control 436, and a set of static story controls: a first story control 438, a second story control 440, and a third story control 442. Each static story control or picture control is linked at publication time to just one object. Each of the controls on the page 434 references a style sheet 443 to provide formatting instructions on how the content is to be displayed.

As shown in FIG. 8, a picture object 460 is linked to the picture control 436, so that upon rendering, the picture object 460 is displayed on the page 434 at a position determined by the control 436. Similarly, a story object 462 is linked to the static story control 438 and rendered into the position of the control 438 on the page 434.

Note that since the control 438 is a static story control, any area not used by the story object 462 in the area identified by the control will be blank. As shown, a story object 464 is linked to the story control 440 80 that it is rendered in the area identified by the static story is control 440 on the page 434. In this example, for instance, only the first paragraph of the story object 464 will be rendered on the page 434 due to the size of the control 440 (as selected by the designer). In this manner, the designer can choose to only display a portion of a linked story within a static story control by adjusting or sizing the control to only hold one paragraph, or other desired portion, of the story content. Normally, a static story control will allow scrolling of a story so that ultimately the entire story will be displayed.

Finally, a story object 466 is linked to the story control 442 so that it is rendered in the area identified by the static story control 442 on page 434. In this example, the entire story object 466 is rendered onto page 434.

It is important to note that each of these story objects makes reference to the style sheet 443 before being rendered on the page 434. When story objects are authored, they are given formatting tags that represent specific styles. As the story objects are rendered, they reference the style sheet that is linked to the appropriate control to retrieve formatting information. This formatting information includes properties of the paragraphs, fonts and embedded objects in the story that format the content as it was originally designed. Due to the separation of design and content in the MP system, the story objects themselves only have formatting tags, but do not contain a description of the particular format that corresponds to each tag. The descriptions of those tags is found in the style sheet that is linked to the control into which the story object becomes rendered. This process will be explained in more detail below with respect to FIGS. 9–15.

2. The Business Section

As also shown in FIG. 8, the business section 432 contains a first page 444 and a second page 446. The page 444 has a single static story control 448, a single picture control 450, and a first dynamic story control 452. The second page 446 has two dynamic story controls, 454 and 456. In addition, a style sheet X 457 and a style sheet Y 459 are referenced by the different controls on pages 444 and 446. The pages in the business section 432 differ from the page 434 in the front page section 430 because they rely on a search object 468 to retrieve particular stories. On the page 434, the static controls were each linked to a particular story which was then displayed upon rendering. The search object 468 is affiliated with the dynamic story controls in the section 432.

As shown in this example, the static story control 448 and the picture control 450 on the page 444 reference or link to the story object 464 and the picture object 460, respectively, and display these objects as shown on the rendered page 444. The story object 464 is thereby shared between different sections, pages and controls in the title. The entire story object 464 is displayed on the page 444, whereas only the first paragraph was displayed on the page 434. By using a similar process, a designer can choose to display just the first paragraph of a story on the first page of a title, but include the entire story on another page within the same title. As shown in FIG. 8, the picture object 460 is also shared between the control 436 and the control 450. This sharing of content between separate sections and pages is an important feature of the MP system 100.

3. Dynamic Story Controls

The dynamic story control 452 uses the results of a query performed by the title to retrieve stories matching search criteria set by the publisher (as defined by the search object 468). The search object 468 locates story objects having specific properties. In the example of FIG. 8, the search object 468 returned many story objects 470, 472 and 474 corresponding to story objects 1 through N, respectively (where N×4 in this example). All of the retrieved story objects are concatenated together by the dynamic story controls and poured into the appropriate regions on the pages. The order that the stories become rendered into the control regions starts with the first dynamic story control on the page in the section and continues to other dynamic story controls contained within the section.

If enough pages to display all the located stories are not defined in the section, the last page used is repeated until all stories are rendered. Thus, the first located story 470 is poured into the area defined by the dynamic story control 452. Since it does not completely fit in that area, the located story 470 continues across the page boundary onto page 446 into the area defined by the dynamic story control 454. The located story object 472 then begins after the located story object 1 470 ends. The next located story object (located story object 3) begins after the story object. 472 ends, continuing into the next control 456 on page 446, as shown in this example. The last located story object 474 retrieved by the search object 468 in this example is then rendered into the dynamic story control 456 within page 446.

As explained above, the dynamic story controls in the section 432 use the search object 468 to display the results of queries made for specific information. For example, the search object 468 may return content that contains the word "Microsoft". Each of the stories found by the search object 468 will be displayed in the areas defined by the dynamic story controls in the format designated by the style sheet 457 or the style sheet 459.

For example, if the dynamic story control 454 is linked to the style sheet 457, then all of the stories displayed by the dynamic story control 454 will appear in the format designated by the style sheet 457. However, the stories rendered by the dynamic story control 456, when this story control is linked to a different style sheet (for example, the style sheet 459), would appear differently than the formatted display corresponding to the dynamic story control 454. In this example, if the controls 454 and 456 use different style sheets, the located story 3 would be displayed using two formats when the transition from the area defined by the control 454 to the control 456 was made.

J. Style Sheet Overview

Style sheets and the style objects they collect are created by the designer (i.e., the person at the publisher workstation 180 shown in FIG. 2) using the Project Editor and the Style Sheet Editor. Once the style sheet has been created, it is stored in the cached object store (COS) along with the other objects in the project as described above in reference to FIG. 2. The style sheet objects support OLE serialization and are therefore based on the Microsoft Foundation Class (MFC) Cobject class. These class definitions are publicly available from the assignee.

As described at the beginning of the detailed description section, a different style sheet may be linked to each control region on a page. However, in all likelihood, style sheets will be shared among more than one control. As is known in the present software technology, a globally unique identifier (GUID) can be used in OLE object-oriented environments to identify an object with a unique string of characters. Normally, unique GUIDs are produced by concatenating the time, date and network card serial number of the computer at the time that the object is created. By using this method, it is virtually impossible for two objects to receive the same GUID. In the MP system 100, each control keeps a record of a GUID associated with its linked style sheet. This is how a particular control can reference its linked style sheet. More than one control can refer to the same GUID, and therefore share style sheets. When a control needs access to its associated style sheet, the control requests the style sheet from the title. If the style sheet has not already been loaded into volatile memory, the title object handles loading it from the COS.

K. Customer Query

Figure 9:
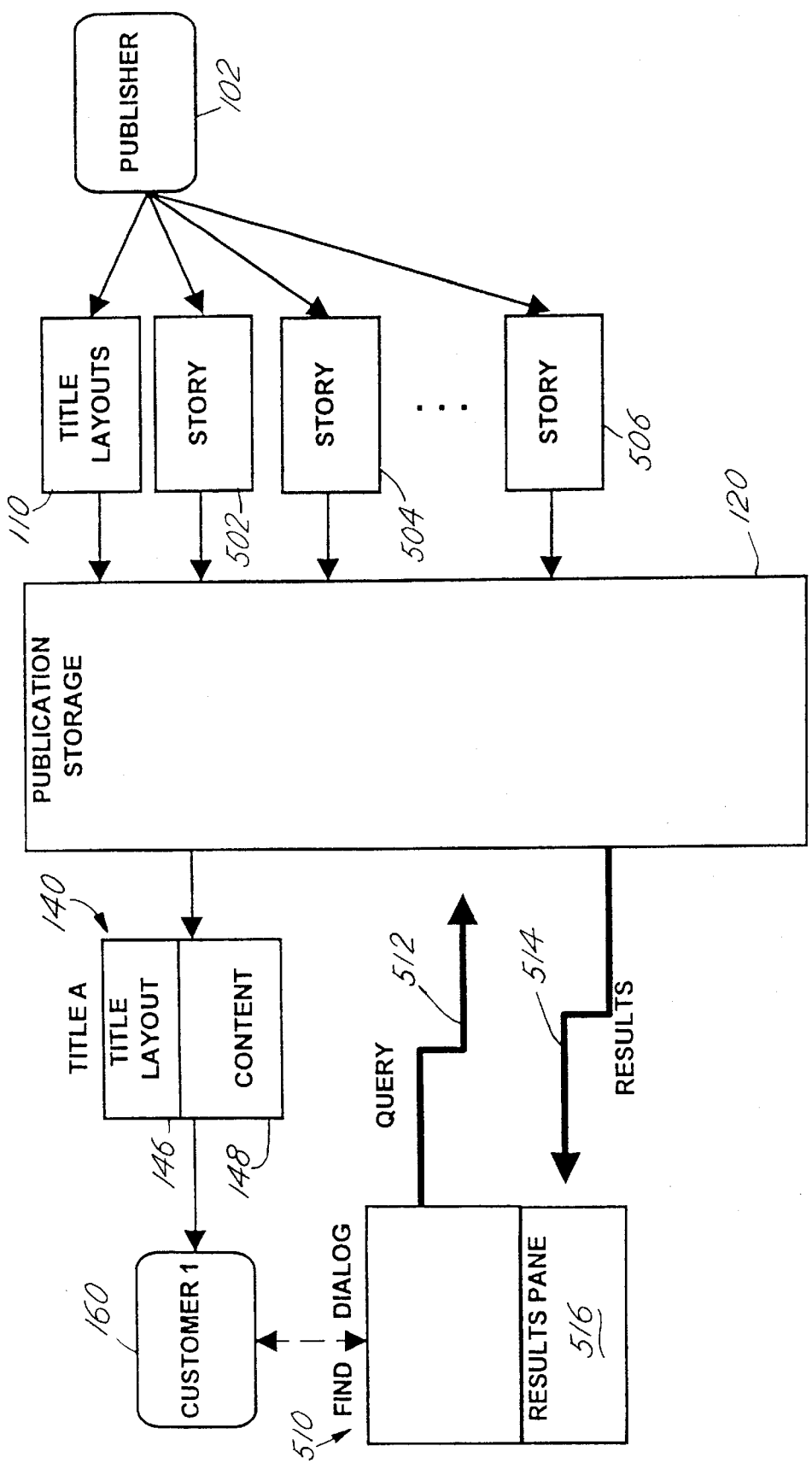
FIG. 9 is a diagram illustrating a query performed by the customer using a "find" dialog on the system shown in FIGS. 1 and 2.

Referring now to FIG. 9, a query path from a "Find" dialog through title searches to the content database at the publication storage 120 will be described. The query components for both publishers 102 and end-user customers 160 are defined as follows: a MPS Document Editor Summary Information dialog—for tagging content with keywords to aid in retrieval; a Search Object Editor—for title designers to create and modify search objects (also known as information magnets); and a Find dialog 510—a customer interface for ad-hoc and saved searches.

Content, such as stories 502, 504 and 506, is tagged using the MPS Document Editor's Summary Information dialog and is placed in the MPS content database in the publication storage 120. Search objects gather stories which match a particular criteria (as defined in the Search Object Editor) and "flow" them into the appointed sections of a title in the Viewer 202 (FIG. 2). The Search Object Editor is the query tool which designers use to retrieve and locate relevant stories within the title. The customer 160 uses the Find Dialog 510 within the MPS Viewer 202 to issue one or more queries 512 against all the stories in a particular title (i.e., those stories the title has retrieved using one or more search objects).

The queries 512 issued by the customer 160 in the Find dialog 510 are joined with the criteria of the title's searches due to the search object(s) and then the aggregate is queried against the content database in the publication storage 120. Result GUIDs 514 (representative of stories matching the queries and search objects) are transmitted back to the customer and appear in a results pane 516 of the Find dialog 510. By combining the query 512 with the search object queries restricts the results to be within the title structure rather than from any arbitrary source in the content database.

L. API/DLL View of System

Referring now to FIG. 10, the major software components or modules used by the presently preferred implementation of the MP system 100 will be described. The modules are located at the publisher location 102 (also shown in FIGS. 1 and 2), at the network storage location 122 and at the customer location 160.

The modules at the publisher location 102 include a publisher executable 530, a set of publisher DLLs 532, a set of publisher OLE custom controls 534, a publisher COS 544 with a client object broker service and client publisher interface 546, OLE 198 and MFC 562.

The modules at the customer location 160 include a viewer executable 538, the set of common publisher DLLs 532, the set of common publisher OLE custom controls 534, a viewer COS 548 with a client object broker service 550, OLE 198 and MFC 562.

The modules at the storage location 122 include a server executable 536, and a server superCOS 540 with a server object broker service and server publisher interface 542. The publisher executable 530 (also known as BBDESIGN.EXE) is an application which provides a mechanism for generating a design-time view of a project. It is utilized in the creation of objects within a project, and for establishing the relationships between the objects of a project.

The set of publisher DLLs 532 includes a forms DLL (FORMS3.DLL) that provides the implementation of the OLE Control Container class and supplies the data for the page object in a project. Also included is a view DLL (VIEWDLL.DLL) that provides a set of MPS Object definitions and the viewer engine for synthesizing the run-time view of a title. The MPS Objects include: CProject, CTitle, CSection, CFolder, CContentFolder, CRootContentFolder, CProxyTable, CContent, CFrame, CBForm, CVForm, CStyleSheet, and CMagnet.

The set of publisher OLE custom controls 534 (also known as BBCTL.OCX) is a DLL which provides the code for implementing instances of the OLE custom controls which are standard for the MP system 100.

The viewer executable 538 (also known as BBVIEW.EXE) is an application which provides a mechanism for initiating the run-time view of a title. It uses the publisher OLE custom controls 534 and the publisher DLLs 532, especially the viewer engine for synthesizing the run-time view of a title.

Each of the publisher 102, customer 160 and network storage 122 locations has a COS implemented by using a DLL (COS.DLL). The COS DLL provides a persistent storage mechanism for objects used by the MP system 100. The COS DLL uses OLE Storage technology to store sets of objects in a compound document file. Each object placed into a COS is given a unique identity, referred to as a GUID. Each object identified by a GUID can be located independent of a path name in a file system. The server executable 536 (also known as MSNSERVER.EXE) is an application which provides a mechanism for managing the network server, which includes the COS. In addition to the COS DLL, the server has a DLL for COS access and object binding (OBSV.DLL), a MPS server service (BBOBSVC.DLL) and a memory management service (DFARBSV.DLL).

Each of the publisher 102, customer 160 and network storage 122 locations has an object broker service DLL (OBJBRK.DLL). The object broker service attempts to locate an object given its unique identity (GUID). By default, the object broker first looks in its local object store (referred to as a superCOS), which is either the publisher COS 544, the server COS 540 or the viewer COS 548. If the object is not located at the COS wherein the request was made, and if the object broker resides on a client machine (either the publisher or customer workstation), it will attempt to remotely retrieve the object from the server COS 540 at the MSN Data Center 242 (FIG. 3). In another embodiment, other object stores may register with a given object broker as a source of objects, which the object broker will search in between the local and remote retrieval cases. Associated with the object broker 546 at the publisher is the client side of the publisher interface, and associated with the object broker 542 at the network server is the server side of the publisher interface. The publisher interface is used to manage the publication of new, deleted, and modified objects.

The capabilities of the object broker allow a publisher to test layouts or content that are shared with a different publisher. As an example, publisher A has a title layout A and publisher B has content that publisher B has agreed to share with publisher A. To test title layout A together with the content, publisher A could retrieve content provided by publisher B that is stored in the COS 540 by use of the object broker service.

A MPC Wrapper DLL (MWRAP.DLL) uses the Microsoft Network Procedure Call (MPC) protocol to communicate with the network storage 122, i.e., the MSN Data Center 242 in the presently preferred embodiment, and the MPS services, such as the object broker and COS. This wrapper specifically isolates the COS/Object Broker subsystem from the specific MPC protocol so that the MP system 100 can be easily ported to use other protocols in other embodiments.

IV. DESIGNER ENVIRONMENT

This section of the detailed description will describe the designer environment at the publisher site. The concepts of sharing content among titles and of separation of design and content will be more fully described. This section begins with a discussion of the presently preferred authoring subsystem used by the MP system 100. Then, a title designer subsystem will be described, which includes the objects available to the title designer; the project, page, style sheet and search object editors used to create and revise the layouts; and the controls used to define the layout of a page. Next, the architectural structures used by the system to enable the creation, revision, and storage of design layouts and content will be described. Finally, the operation of the designer process and release process will be discussed.

A. Authoring Subsystem

Content is separated from design in the MP system 100. In the Viewer 202 (FIG. 2), content and design are brought together by controls to display a title as specified by the designer. As a result, these controls need to identify different elements in the structure of the content so they may format it correctly. This is done by creating structured content. The MPS authoring environment provides a way for authors to create structured documents.

The MPS authoring environment includes the MPS Document Editor 188, which supports the creation of structured documents, insertion of links and the application of properties to these documents for content retrieval. The MP system 100 uses SGML (Standard Generalized Markup Language) to define the scheme for creating structured documents. SGML is a standard for defining a markup language—a set of tags and attributes used to identify the structure of a document called a DTD (Document Type Descriptor). The MPS Document Editor 188 will support saving documents in a format which conforms to the MPS DTD (MPML—Multimedia Publishing Markup Language). This DTD will be published for use with other SGML authoring systems. As part of this environment, the MPS provides a pair of Document Editor converters for reading/writing MPML files, a template defining styles and macros used to create MPML files along with some OLE controls used to insert links and apply properties to these files.

To create content for the MP system 100 in the MPS Document Editor 188, an author creates a document based on the MPS template. This template provides a set of predefined styles along with supporting macros. The author applies these styles to the text to identify the different elements of the document (headline, abstract, body text, and so forth). Only the predefined styles should be used. When the document is saved in MPML format, these styles are mapped to SGML tags by the MPML output converter. The result is a tagged document which can later be parsed by the Viewer 202.

The MPML converters for the Document Editor 188 support mapping styles applied to the text to MPML tags. In addition, it will support graphics inserted with the "Insert Picture" command of the Document Editor 188. This will support both linked and embedded graphics and tag them appropriately. The converters also provide support for the MPS OLE controls provided to insert links and apply properties to the documents.

An important aspect of the authoring environment is that it is only to be used to generate tagged content. The author should not expect that the style definitions made or formatting applied in the Document Editor 188 will carry over to the Viewer 202 when the document is displayed.

As part of the authoring environment, several OLE controls are provided which interact with the MPS environment to help the author insert links and apply properties to documents. These controls are normal OLE objects which are extended to support rendering their data in MPML format. The MPML converters will be able to recognize OLE controls embedded in the Document Editor document and ask them for their MPML representation using a well-defined interface. When the converters encounter an OLE object, they will attempt to retrieve a MPML representation from them using this interface and insert it into the output MPML stream. OLE controls which do not support this interface will be ignored. The use of the interface allows extending the authoring environment with new OLE controls as needed.

1. Story Editor

A MPS story editor, which is part of the MPS Document Editor 188, is the main tool designers and authors use to create MPS story objects. A MPS story object consist of a stream of text with embedded objects such as links or pictures. MPS stories can also be tagged with Find properties so that the MPS Find system can easily and accurate locate stories.

The main tasks involved in the creation and delivery of a story are: author the story; set structural properties for the story; optionally, place pictures into the story; optionally, create links to other stories, and set summary properties (including Find matching criteria) for the story.

In addition to using the MPS Document Editor 188 to create stories, publishers can create MPS stories with other tools or with an automated process. For example, stock ticker stories probably will be created automatically.

MPS stories are structured, which means that the elements that make up the story are logically identified. This is useful because the MP system 100 can take advantage of this logical description to help present the information to users. The Document Editor 188 makes this easy, wherein authors merely apply the Document Editor styles. This process may also be performed automatically using filtering software that is supplied by Microsoft or by third parties.

The MP system 100 supports three main file formats. These are: (1) the MPS data file format, (2) MPML, and (3) the HyperText Markup Language or HTML. The MPS data file format is the native MPS story format. It is a standard OLE doc file with separate streams for text and the various objects contained within the text stream. The MPML format is available to make it easy to import and export MPS stories. A MPML file is an ordinary text file that conforms to SGML. Because this file format is a simple text file, it is easy for publishers to automate the process of creating MPML files. Most publishers will not need to use MPML because the MPS tools automate the process. The MPML file format is only important because it can be easily converted to other formats, which ensures an easy migration path for publishers.

The MP system 100 can also import and export HTML text files. However, because HTML is fairly limited many advanced MPS features can not be represented in HTML. The HTML and the MPML converters are constructed as a separate program that enables publishers to make batch translations of files.

Stories are usually linked to other appropriate content, and MPS Find properties are added to the story so the story can be found by the query subsystem. These steps can be performed using MPS or third-party authoring tools. If a publisher uses third-party tools to produce content, the results must conform to the MPS file formats to ensure that the Viewer 202 can interpret the content.

2. Links

MPS stories typically have links to other stories or other information. The MP system 100 supports these hyperlinks through a link editor. The link editor is integrated into the Document Editor 188 and is accessible from the toolbar buttons or from an Insert\Hyperlink menu. A content selector is used to select the target of links and to select pictures to embed in MPS stories.

3. Find Properties

To help customers find stories that might be interesting, the MPS supports the specification of keyword or keyphrase matching criteria through the file summary information option. A standard File\Summary Info dialog of the MPS Document Editor 188 is used to tag a story with retrieval attributes for search to find. Each field may be individually searched by the search editor. The Find dialog may search the title field uniquely, but the rest of the fields (subject, author, keywords, comments) are searched as a whole when the 'Summary' box in the dialog is selected.

B. Title Designer Subsystem

1. Overview

This section describes the MPS title design environment, with emphasis on the Project Editor tool 184 (FIG. 2). The Project Editor 184 is the tool that provides a view into a project, and allows the designer to edit the contents of that project.

A Source is a collection of MPS story objects stored on the MSN 122. In the presently preferred embodiment, each content folder is a separate source. In another embodiment, a single source may contain multiple content folders.

2. Objects

The Title Designer may interact with an open and extensible set of objects that are placed within a project (either in a folder or in a title). Objects appear in the Title Designer just as documents appear in the Windows 95 Explorer: as icons in the right pane. Objects respond to clicks, double-clicks, right-clicks (which display a context menu), and drag-drop operations as means to manipulate them.

Nearly all objects in the system have a property sheet. This is a standard-format dialog which allows for setting values associated with that object. It is accessed by selecting Properties . . . from the File menu, or from the context-menu of the object. A property sheet consists of one or more tabbed pages, which the user may flip through by clicking on the tabs. At the bottom of the page are three buttons: OK, Cancel, and Apply. OK saves any edits that were made and dismisses the dialog; Cancel discards any changes and dismisses the dialog. Apply saves any edits that were made, but does not dismiss the dialog. Switching between tabs does NOT save changes that were made to the previous page.

a. Project

A project is a collection of titles and content folders. Titles and content folders are collected so they can be edited simultaneously and then released in the preferred embodiment to a MPS server 246 (FIG. 3) together.

A project object represents the entire contents of the project, and is the container of things that get released together. As such, it has properties representing where the project's contents are released to, and statistics about the release process.

b. Title

A title is a collection of pages and supporting objects organized into a hierarchy of sections. The title itself, as well as each section, acts like a folder in that it can be expanded to show its contents within the Title Designer. It is important to note, however, that the items within a title have a hierarchical structure that is defined by the designer and is essential to how the title is displayed.

A title also has a Resources folder that contains any additional objects that need to be distributed with the title;

for example, fonts and OLE controls. A title may have a price associated with it, which is set using the MSN sysop tools.

A title object is a container for sections and pages. A title may also contain supporting objects, including style sheets, content objects, window objects, and resources that need to be installed. A title object has a context menu with common commands, and a property sheet for setting all of its detailed settings.

When a new title is first created, it is populated with the following objects: a resources folder having a default style sheet and a default window, and a blank page (directly under the title object), named "Front Page".

A title object contains pages and search objects organized into sections and subsections, as well as a collection of supporting objects (style sheets, fonts, OLE controls, and so forth). Pages and search objects may be contained directly underneath the title, or they may be organized into a sequence of sections. Windows and style sheets are placement-independent; they may also be stored within sections, or they may be kept in generic folders within the title. Fonts and OLE controls must be kept in the resources folder. The title maintains a sequence ordering of the sections, pages, and search objects, as this is important in determining how the title is displayed. The views supported by the project designer window allow the publisher to re-order these objects.

The title object is the section which represents the entire title. From this root section the hierarchy of sections, search objects, pages and style sheets are added. The title object inherits from the section object and as such, it contains all the properties and attributes of sections.

From a COS perspective, the title object is the root object in an object store. The title has a reference to all first level sections, that is, it is the root section.

Like all COS objects, a smart pointer (CTitleSPtr) object is defined to access the methods of a CTitle object. The CTitle object (like other COS objects) does not have knowledge of the COS which contains it. This information is kept in the smart pointer and all access should be through a CTitleSPtr object.

C. Section

Like the title object, a section object behaves much like a folder. It, along with its contents, can be dragged and dropped. The only visible difference is that its contents has a sequence that can be user-defined.

Sections having Dynamic story controls may set whether the Viewer 202 begins each story on a new page, or runs the stories together. For sections having static story controls, this setting is disabled.

The content gathered into a section is sorted at pressing time before it is displayed. The designer may specify the sort order that will be used at that time. Available sort orders include: Priority, wherein the author or editor may tag each piece of content with a priority, (a number from 1 to 5, where priority 1 is the highest priority), and Date/Time.

The designer may choose a specific page to use when the viewer jumps to a story out of sequence. This allows the system 100 to quickly compose the story without needing to compose all pages in between the current position and the desired story. Without the ability to do this, navigating to specific stories within a section would be painfully slow.

The sequence of pages and search objects in a section help to determine how the section will be pressed. However, the rules are different for static and dynamic sections, as described below.

A static section has all of its content hand-placed on pages. It does not use dynamic story controls to display content. In a static section, the pages are presented to the end-user in the order in which they appear in the section.

A dynamic section uses the Dynamic Story control to display stories within a section. The stories are sorted according to rules specified on the section's property sheet and then are concatenated or linked together. The stories are then filled into the dynamic story controls on each page in the section, in the order in which the pages are arranged in the section. If there are more stories than there are pages, the last page is re-used repeatedly until all content has been pressed.

When in "home delivery" mode, all of the stories are pressed at once; otherwise the system presses pages on demand. In the "on demand" mode, if the user chooses to jump to a story out-of-sequence, the MP system 100 must choose a particular page in the sequence to start displaying that story. Because the MP system 100 has not had an opportunity to press all of the stories before the one that is jumped to, it does not know which page would be used if the user read the stories in sequence. The designer may mark a particular page to be the "out-of-sequence" page, which is then used for these cases. Search objects are activated in the sequence in which they appear in a section. Because of this, the ordering of search objects in a section has a subtle influence on the final ordering of contents. The sorting specified by the section is done as a "stable sort". For example, if two stories, gathered by different search objects, sort to the same place, the one whose search object was listed first in the section will be listed first.

The sequence of pages and the sequence of search objects have no relationship to each other. They may appear interleaved in the section container with no unusual effects.

The section object provides the hierarchical structure of a title. It can be thought of as a folder which can contain other sections (sub-sections), search objects, style sheets, pages, and content. The different objects are managed in separate lists and because of this there are similar but distinct API's to access each of the object types. There is no single homogeneous list containing all the objects that are part of a section.

Sections provide logical breaks in a publication. For example, the different parts of a newspaper can be represented by sections: Front page, Sports, Lifestyles, and so forth. Sections also play an important role in the composing and navigation features of the MPS as follows:

i) Dynamic navigation to sections via information maps
ii) Direct navigation to sections via action controls
iii) The first story of the section is always composed on the first page of a section.
iv) Pages from previous sections do not propagate to subsequent sections. Each section contains the pages which are to be used to compose it's stories.
v) The search objects contained in the section define the content that will be displayed there.

Ordering of objects in a section is important. The title is composed top to bottom, with sections at the top being composed before sections further down. Similarly, pages are used in the order they appear in the section, and dynamic stories appear in the order of the search objects in a section.

A smart pointer (CSectionSPtr) object is defined to access the methods of a CSection object. The CSectionSPtr will instantiate the CSection object from the COS and through it's overloaded arrow operator, allow access to the section methods.

d. Window

A window is a place a page can be displayed. A window may have a fixed size, or the height and width may be changed at runtime to match the page being displayed in the window. A window object may reside within a section in a title, or it may be contained within the generic resource folder in the title. The designer makes the decision about where the window object is to be contained.

The window object acts as an OLE frame object and client site for an embedded page. The page object (or any compound document server) and the window object interact solely through the OLE Compound Document interfaces. The window object and page object together provide a full in-place capable OLE container. The window object implements the IOleInPlaceUIWindow for its document and the IOleInPlaceFrame interfaces for its frame. It provides the object window (in the Windows sense of the word "window") and it also provides menu bar handling.

By breaking up an OLE in-place container into two parts (window object and page object) using IOleInPlaceUIWindow::SetActiveObject, the page object can be attached and detached from a given window object at run-time. This approach saves time by not having to destroy and re-create a Windows window every time a new page is needed to display data. This is useful within the MP system 100 because it is very common to use two pages (e.g., SectionFront and SectionDetail) to display a particular portion of content.

e. Page

A page is the representation of the layout of the client area of a window. The layout within that page is represented by control objects. A page is a container for controls. In the presently preferred embodiment, a Component Forms development environment for pages operates like Microsoft Visual Basic or Microsoft Publisher in that designers place objects (controls) on a page by selecting and placing them. When opened, a page presents itself in "design mode" in which the user can lay out the page with controls. Properties of the objects are available through property browsers or a context menu.

Pages are contained within sections. Within a section, the pages have a sequence that determines the order in which they are used to press content and the order in which they are displayed when the user browses sequentially.

A page may be used in more than one section; this is accomplished by making a shortcut to the page in another section. A shortcut to a page has a place in the sequence of pages just as the real page does.

A page object is an implementation of an OLE compound document server. The page object can contain any arbitrary OLE control to create any type of Windows application. The page object supports OLE controls fully and is a full compound document server that also supports in-place activation with the IOleClientSite, IOleInPlaceSite, and IAdviseSink interfaces on its site objects. Unlike most OLE implementations, the page object requires a window object to become an OLE container. The window object wraps a page object and displays it in a top-level window or child window. To work properly with controls, the page object also implements an IDispatch interface for ambient properties and an IDispatch interface for control events on its sites, along with a new IControlSite interface that serves as a notification sink for changes in a control's mnemonics.

f. Search

Search objects describe how to collect stories to be pressed into a dynamic story control. Only sections with pages having dynamic story controls take advantage of search objects. A section with one or more dynamic story controls may have zero or more search objects collecting stories. If two search objects collect the same story into a section, then only one instance of that story is actually collected and displayed in outline controls and in the dynamic story controls.

g. Style Sheet

The style sheet object encapsulates a mapping of stylenames to formatting instructions. The style names are a fixed set that authors can apply to their stories. In this way, authors do not need to concern themselves with formatting their content; they simply use a standard set of styles, and the formatting is automatically applied at pressing (using the style sheet that was designed into the title). Since outline, static story, and dynamic story controls rely on separate content, they use style sheets as the basis for their formatting.

Opening a Style Sheet shows a list of the styles available. The publisher may select a style and edit its properties by pressing the Modify . . . button. This displays a tabbed property sheet that lists all of the formatting settings.

There are three types of styles: character, paragraph and wrap. Character styles may be applied to a selected set of characters. They include only those settings that can be applied to an arbitrary set. Paragraph styles (displayed in bold in the list) are applied to the entire paragraph. They include extra settings that affect how the entire paragraph is laid out. Wrap styles (displayed in italics) classify wraps as to their functional use, so that they can be fitted to a particular area of the outline, static story, or dynamic story control.

h. Extensibility

The designer may extend the design environment by adding new OLE controls. These controls may support a wide range of functionality. They may provide generic display capabilities (e.g. video, audio, sprites), or they may utilize the MPS Information Map interfaces to provide new means of navigation. OLE controls may also add additional actions to a list of available actions.

i. Content Folder

A content folder is a container of story objects. It may contain story objects, and other folders. When a project is released, the contents of each content folder in that project are copied to their respective source on MSN 122. Search objects are set to look for content within a specific source. Through the Project window, the publisher may place stories within these content folders so the search objects can find them when the stories are released to the source on MSN 122.

Content folders are containers for titles and for story objects. They appear as top-level items underneath the Project, and may have further sub-folders. Search objects use Content Folders to identify the scope of their query.

Content objects are represented by a generic document object within the designer. There are two kinds of content objects: Stories and Pictures. Stories represent MPS stories while pictures represent wavelet or metafile pictures. When the New Content command is used to load in a new picture, the picture is automatically converted to a wavelet, unless it is a Windows metafile (in which case it is left unconverted). Pictures which are saved as wavelets also have a property page which allows for controlling the amount of compression that is done on the image prior to sending it to the viewer for display.

Objects may be drag-dropped from the desktop or the file system into a content folder. These objects will then be released to the Data Center 242 when the Release command is selected. When objects are brought into the system 100, the project stores a path to the original file that was copied in.

J. Resource Folder

Titles may need additional resources, such as fonts and OLE controls. The designer adds these items into a project by drag-dropping (or copy-and-pasting) them into a title. Each title has a Resources folder directly underneath the title object, with subfolders named Fonts and Controls. The designer adds new items to the title by dropping them into those subfolders.

The designer may also place window and style sheet objects within those folders, which are not necessarily associated with any particular section. This allows for managing the supporting resources separately, or for keeping them with the sections that use them.

The MP system 100 assumes that all of the OLE controls and fonts in the Resources folder need to be installed on the customer workstation 182 to run the title.

k. Shortcuts

Just as in the Windows 95 Explorer interface, shortcut objects may be created and used through the project in place of the objects to which they refer. For instance, if the designer wished to use the same page in five different sections, then the designer can create the page in one location and place shortcuts to that page in the other four locations. Since none of the object's properties are duplicated, changing the original will change its use in all the places where shortcuts to it exist. Shortcuts are sequenced exactly as their referenced objects would be sequenced. For example, a section can contain a mixture of pages and shortcuts to pages, and the two could have a single, potentially intermixed, sequence. The "Go to specific page" action takes as a parameter any page or shortcut to a page. Shortcuts must point within a title or content folder. Shortcuts may not point between titles or content folders.

3. Project Editor

The Project Editor 184 provides the user environment and editing facilities for creating and editing MPS projects and titles. The Project Editor 184 limits itself to defining the structure and organization of the title, leaving the page layout and content definition to other parts of the MP system 100.

The publisher interacts with objects in the title through the Explorer-like UI provided by the project editor. The left pane of the editor contains the title structure elements (e.g., sections) and the right pane contains the objects contained in that section (e.g., search objects, pages, and so forth). Through the project editor, the publisher adds the sections, search objects, style sheets and pages which define the structure of a title. The project editor uses a drag-drop metaphor for moving and copying objects within, and between, titles.

The project editor is the central editing point in design mode, and as such it interacts with the search object, stylesheet, and page editors to configure and set properties on the title objects. In most instances these editors are invoked by double clicking on an object in the project window. The project editor also supports the idea of styles where the properties of an object, say of a search object or section, are based on an existing search object or section.

i) Interfaces

The project editor provides two types of interfaces: 1) standard MFC C++ interfaces to integrate into the framework, and 2) an ITitleEditor interface to support the command architecture. Specifically, this interface is used to add, remove and modify objects in the project editor. Typically, these are invoked through menus or other UI components, but they could also be called via automation.

The following services are required from other subsystems:

Search Object Editor—the ability to invoke the search object editor to edit the properties of a search object;

Designer/Forms 3—the ability to launch the designer to modify a page;

COS—all services are required; directly adds or queries the COS for objects through smart pointers; a smart pointer is a class wrapper which uses an IObjectStore COM interface to make programmatic use of the COS transparent; the COM interface can be used directly;

Style Sheet Editor—the ability to edit the properties of a style sheet by invoking the style sheet editor on a selected style sheet object.

ii) New Object

A "New" menu command in the Project Editor 184 cascades to show a choice of objects that may be created in a selected container. Table 1 lists the items (in order) that appear on the New menu when an object is selected in the left-pane:

TABLE 1

| SELECTED OBJECT | NEW MENU CONTAINS |
|---|---|
| Project | Title, Content Folder |
| Title | Folder, Section, Window, Page, Search Object, Content, Style Sheet |
| Section | Section, Window, Page, Search Object, Content, Style Sheet |
| Content Folder | Folder, Content |
| Folder (in a Title) | Folder, Window, Page, Content, Style Sheet |
| Folder (in a Content Folder) | Folder, Content, |

4. Page Editor

When a page object is selected in the Project window and the Open command is selected (or the page is double-clicked), the page is opened into a Page Editor window for editing.

The Page Editor is the tool for creating and editing detailed page layouts. The client region of the window represents the page itself, and the rest of the editor window provides tools for laying out controls on that page.

The key elements of the Page Editor are:

i) A Menu Bar with commands for layout and editing ii) A Toolbar with shortcuts to common commands iii) A floating palette Toolbox which allows for selecting controls to be dropped on the page iv) A grid which assists with exact placement of items, and Snap-to behavior which automatically aligns controls with the nearest grid point v) Undo/Redo support vi) Nudging support Double-clicking (i.e. opening) a page object brings up the Page Editor window, showing the layout of that page. Selecting Close from the File menu will close the Page Editor. If any changes have been made that were not yet saved, the user will be asked whether s/he wishes to save those changes before exiting.

The client area of the Page Editor window shows the layout of the page. Each control on the page appears in its appropriate location.

Clicking on a control selects that control; the control then has a sizing border which can be used to resize the control. The control may also be dragged to another location by clicking in the center area of the control (i.e. anywhere within the sizing border). Right-clicking on the control brings up a context menu.

The File→New command cascades to show a list of the available controls. Selecting a control from the cascade menu places an instance of that control on the page in the upper-left quadrant, with height and width one-quarter the height and width of the page, and with the top-left corner at a position one-quarter width and height from the top-left corner of the page.

The Toolbox is a floating window which has a button for each of the controls available to the user to place on the page. This includes all of the standard controls, plus any additional controls that have been dropped into the title. The currently-selected control is depressed, and only one button is depressed at any given time. The toolbox also has an "Arrow" button, which is depressed when no control has been selected and indicates that the cursor can be used to select and reposition controls on the page.

The user adds a control to a page by pressing on the control's button, then dragging the rectangular region on the page where the control is to be placed. The control is created when the mouse-button is lifted at the end of the drag.

5. Style Sheet Editor

The use of style sheets in MPS controls provides a way for the designer to set text formatting properties on a per control basis by creating and assigning a different style sheet for each control or a set of controls. Style sheets are created using the Style Sheet Editor 187 (FIG. 2) provided with the Project Editor 184. The Style Sheet Editor 187 allows the designer to customize style property values to override the default definitions for styles provided with each title.

The designer uses the Project Editor 184 to insert/create a new style sheet in the Title. Initially, the style sheet is empty and simply uses the style definitions in the default style sheet. The designer can then invoke the is Style Sheet Editor 187 to define properties for the style sheet and change style property values. The set of styles supported by style sheets is predetermined. The designer cannot create new styles but can only modify the default property values for existing styles.

When invoked, the Style Sheet Editor 187 displays a dialog listing the (predefined) style names and fields for editing their property values. These are retrieved from the default style sheet created by the title. Initially, these fields contain the default values defined in the default style sheet. The designer selects the style name of the style to customize and sets the desired new property values. When the properties are set as desired, the designer causes the Style Sheet Editor 187 to create a new style object with the new property values and add it to the style sheet. The new style object now serves to override the default. The designer continues defining new styles in this manner, as desired. When complete, the designer dismisses the Style Sheet Editor 187 and can proceed to assigning the new style sheet to MPS text controls.

6. Search Object (Magnet) Editor

The Search Object Editor 189 (FIG. 2) is a modified version of the customer Find Dialog 510 (FIG. 9). Since the Search Object Editor 189 is to be used by designers for title construction, there are a few differences:

The Search Object Editor 189 is a modal dialog that behaves as the property sheet of a Search Object in the title designer. In the presently preferred embodiment, the Search Object Editor does not allow the designer to "Find Now" and test the query. After the criteria has been entered, the dialog is either committed with OK or dismissed with Cancel. In another embodiment of the system 100, the designer can select "Find Now" and test the query.

The In: checkboxes directly mirror the fields of the MPS Document Editor Summary Info dialog to give the designer more precise control than the customer when retrieving stories.

In comparison to the Look In: field that appears in the Find Dialog and denotes what finished title(s) to search, the Source: field specifies the repository of stories to search for stories to be flowed into a title. These sources are accessed via the More . . . option at the bottom of the dropdown that launches a tree view of all content sources on the MSN 122. These sources are only visible to title designers and do not appear to the general MSN public.

The search may be limited to retrieve no more than a certain number of stories to prevent a section from running too long. The designer simply specifies a maximum number in a provided spin control.

7. Controls

This section specifies only the preferred base controls included with the MP system 100. Other embodiments of the system include controls for animation, database access, electronic commerce, and so forth. The following is a list of MPS specific controls included in the base MP system 100: Caption, Caption button, Picture, Picture button, Outline, (Static) Story, Dynamic story, Shortcut, and Audio. Each of these controls is further described below.

a. Characteristics

A property sheet having pages is associated with each control. Most of the property sheet pages are used in more than one control. Note that no control has all of the property sheet pages; each control only has a small subset of the pages on its property sheet. Pages which are not applicable to a control do not appear as tabs on that control's property sheet. The property sheet pages utilized by the MP system 100 include:

- General—The General page lists general properties related to size and position.
- Border Page—The Border page allows for setting the style and color of the rectangular frame around the control.
- Action Page—(described below)
- Text Page—The Text page allows for setting the values associated with displaying a text value.
- Appearance Page—The Appearance page is used for setting text-display properties for richer displays than a simple caption (e.g., the story control).
- Story page—The Story page allows the designer to choose the story object that is displayed in a story control.
- Where to Look Page—The Where to Look page is used by information maps to decide which part of the title should be used to display information.
- Bevel Page—The Bevel page is used for setting the bevel attributes of "button" action controls.
- Picture Page—The Picture page is used for choosing a single picture object to display in a control.
- Pictures Page—The Pictures page allows the user to set more than one picture, for example a button control which needs both an up and down picture.

Both pictures must use the same placement, rendering, background and transparency settings.

- What to Show Page—The What to Show page is used by the Table of Contents control to choose specific attributes of content to display.
- Font Page—The Font page allows for choosing a font and style for those controls that have a single, consistent font throughout the control.

- Shortcut Page—The Shortcut page is used for defining a shortcut to a story or an MSN object.
- Color Page—The Color page allows for setting all of the color properties for each control.
- Audio Page—This page is used by the Audio control for setting audio playback functionality.

i) Action Property Page

The Action property page is now further described. Controls such as caption buttons or picture buttons enable customers to invoke actions. A list of actions, provided in Table 2, is extensible by adding new controls which export additional commands. The action property page enables designers to associated these actions with events that can occur on the control. For example, in response to a mouse down event, the designer can associate the action to go forward one page. The standard actions include:

TABLE 2

| Action | Description | Parameters |
|---|---|---|
| OpenTitleDlg | Brings up Open Title dialog | |
| SaveAsDlg | Brings up Save As dialog | |
| UpdateNow | Causes immediate update of title | |
| PageSetupDlg | Bring up Page Setup dialog | |
| PrintDlg | Brings up Print dialog | |
| Exit | Quits the title | |
| EditCopy | Copies selection to clipboard | |
| GoBack | Jumps back to last page accessed | |
| AddShortcut | Adds a new shortcut | |
| ShowShortcuts | Brings up the Shortcuts folder | |
| FindDlg | Brings up Find dialog | |
| PrevPage | Jumps to previous page in section | |
| NextPage | Jumps to next page in section | |
| FirstPage | Jumps to first page in title | |
| HistoryDlg | Brings up History dialog | |
| InterestsDlg | Brings up Interests dialog | |
| ScheduleDlg | Brings up Schedule dialog | |
| PreferencesDlg | Brings up Preferences dialog | |
| GoToPage | Jumps to specific page | page to jump to |
| PrevSection | Jumps to first page in previous section | |
| NextSection | Jumps to first page in next section | |
| GoToSection | Jumps to first page in specific section | section to jump to |
| Run | Runs a program or opens a file | file to run |
| CloseFrame | Closes the current frame | | b. Caption

The caption control is used to display simple textual information. The designer has control of the choice of text, colors, font, size and placement of the caption. The other major use of the caption control is to automatically display information about the title. For example, a caption control can be used to display the current section. This is useful if the page containing the caption is used in many different places.

c. Caption Button

The caption button control is closely related to the caption control. In addition to all the properties of the standard caption control, including the predefined automatic title information options, the caption button has an action page and bevel page.

At run-time, the caption button displays a text caption within a button frame. Clicking on the button will cause a Click event to occur, which will then fire the associated action.

At design time, the caption button displays itself as it would appear in its "up" position. When the control is selected, it has a sizing border.

d. (Static) Story

The (static) story control automatically composes a layout for a stream of textual and graphical information. The layout describes the positions of text and graphics that are presented within the area the story control covers on a form.

The story control is closely related to the dynamic story control. The two major differences are:
- The dynamic story control displays a sequence of stories found in a section of title, whereas the story control stores the information internally.
- The story control can not display information in page mode. Dynamic story controls can display information that spans multiple pages. Note however, that the story control is scrollable, in which case this restriction is less important.

i) Performance

The preferred story control takes no more than two seconds to place text and graphics on a typical screen oriented publication. This is to ensure that the story control can provide layouts at rates comparable with 9600-baud modem communications speeds. In other words, a typical short text story—the size that would fill the first page of a typical publication—can be delivered to the customer's workstation 182 in approximately two seconds. This would mean that a 30 page publication could be "paginated" in under a minute. Note that the process of creating a layout may occur in the background, so customers may not experience delays when navigating throughout a publication. Once the layout on a page is finished, the time required to repaint a page (excluding graphics) should be small, <250 milliseconds, in order to compare favorably with paper-based publications.

ii) Elements of a Layout

The story control operates on three kinds of elements:
- Tagged text. This is text with logical descriptors, such as headlines, that is styled and placed into a story control.
- Inlines. An inline is a graphic that is associated with a particular point within the text. For layout purposes an inline is essentially treated as a character for layout purposes.
- Wraps. A wrap is a graphic that may be placed somewhere within the control. While a wrap may be associated with a particular point in the text, it will not typically be placed at that point, but instead will "float" to an appropriate point within the presentation.

iii) Types of Graphics

The story control can support any OLE object or MPS custom control. For purposes of composition, the preferred story control treats all graphic as simple rectangles. In another embodiment, other shapes for the graphics are supported. In general, the story control does not know what is contained within a graphic. Consequently the story control considers objects that require interaction with the customer, such as shortcuts, to be simple graphics. The story control ensures graphics are drawn when appropriate and that customer generated events are delivered to graphic objects, such as links represented by a picture, that require the information.

iv) Presentation Options

The story control supports vertical, single-column scrolling. The story control does not support page mode, i.e., it does not display information that spans multiple pages.

v) Story Control Properties

Story controls have the following properties: number of columns, margins, a style sheet (the style sheet maps the logical tagged source text into rendering information), and a source specification (determines the source of tagged text for the story frame).

vi) Run-Time Mode

During run-time the story control provides distribution of customer events to embedded MPS OLE controls, support for scrolling, and rendering of text and graphics.

vii) Design Mode

During design time, the story control provides the designer with the ability to set properties and edit the content of the control. To edit the content of the control, the designer must edit the story object that the control points to. The designer can access the properties of the control by selecting "Properties . . ." from the context menu of the control.

e. Dynamic Story

A dynamic story control is a story control that has its content dynamically gathered, rather than statically placed at design-time. Each page in a dynamic section may contain one or more dynamic story controls. When the title is pressed, the content is gathered and flowed into the dynamic stories on the pages in that section, re-using the last page until all content has been pressed.

The run-time behavior of a dynamic story control is similar to that of a (static) story control except that when a dynamic story control does not scroll, the stream of data is flowed into the next dynamic story control on the page or to the next page.

During design mode, the designer can set properties of a dynamic story control and can specify the order that the dynamic story controls will display themselves on the page. Properties are accessed via the properties menu item on the context menu.

The dynamic story control is the control that is used to format, layout, and display the story text of the results of a search object on a given page. This control provides a fairly full set of text layout, formatting and display capabilities including text insertion, deletion, replacing; character and paragraph formatting; page setup; line layout; tabs; text wrapping around intrusions (tight and rectangular wrap); in-line graphics; backgrounds; and creation and hit detection of hot links.

The dynamic story control also provides the capability for read-only type user interactions such as mouse-clicking, mouse and keyboard selection, selecting and activating hot links, and copying to the clipboard during view mode.

The main distinguishing characteristic of this control vis-a-vis the (static) story control is that the contents of this control are gathered dynamically via search objects and inserted into the control programmatically rather than created statically at design time by the designer. When the designer creates one of these controls he/she will not author the contents of the text directly. That is, there is no editing capability for this control in design mode.

i) Interfaces

The dynamic story control interfaces with the Viewer, link manager and title manager.

The dynamic story control interacts with the Viewer 202 to accomplish page setup and composition. The dynamic story control gets a parse tree node from the Viewer 202 where composition should begin. After composing, it will notify the Viewer of the last character that was consumed during the composition. Also, when a link is clicked on it will pass the link to the link manager for link resolution (i.e. to traverse the link and move the user to the target of that link).

The dynamic story control registers links with the link manager as they are created. Also, the dynamic story control interacts with the link manager to have the link updated (visually on the screen) after it has been resolved at least once. This indicates to the user that the link has already been resolved at least once and therefore the target of that link already exists locally in the COS.

The dynamic story control interfaces with the title manager to convert style tags to style objects which can then be used to apply the appropriate formatting to the text.

f. Picture

The Picture control displays a bitmap or metafile. It can display the picture all at once, or it can progressively render the picture. The Picture control does not embed the picture within the instance of the control, but rather, it points to a separate Picture object within the title.

The run-time mode displays the picture as configured in the Property Sheet at design-time.

The design-mode of the control is identical to the run-time mode, except that when selected, the control has a sizing border, and the user may set the picture by selecting the control and (from the property sheet) browsing within the title to select a desired picture object.

g. Picture Button

The picture button control provides the designer with an up and down picture and animated button wrapper around the two pictures. This control supports the following events: click, right click, mouse down and mouse up.

The Run-time mode displays the "up" picture until the user clicks down on the control, at which point it then displays the "down" picture. The Design mode displays just the "up' picture, with a sizing border when the control is selected.

h. Outline

The outline control is used to display information about the title and the stories contained within the title. During run-time mode, this control displays sections (if chosen) and tags (those selected in the property sheet) and displays them according to the style sheet selected. Clicking on any item will navigate to that item in the title. During design mode, this control shows sample displays for each of the types of content chosen in the property sheet, using the selected style sheet.

i. Shortcut

The Shortcut control is used for defining a shortcut to a specific story or a Microsoft Network object (title, chat or BBS session, and so forth).

In run-time mode, the control is transparent, except for the standard shortcut icon in the bottom-left corner. When the mouse-cursor is over a shortcut control, the cursor changes to a hand; this is behavior is the same as for the button and outline controls.

The design-time behavior is very similar to the run-time behavior, except that when selected, the control has a sizing border that allows the control to be moved and resized. It also has a standard context menu and property sheet.

j. Audio

The audio control allows for playing an audio object when a page is active. In run-time mode, the control is transparent. The design-time behavior is very similar to the run-time behavior, except that when selected, the control has a sizing border that allows the control to be moved and resized, and the word "Audio" is repeated throughout the control region. It also has a standard context menu and property sheet.

The Audio control adds the following actions to the list available to button controls:

- Play—begins playing from the beginning of the clip
- Stop—stops playing, sets current position back to beginning of clip

- Pause—stops playing, maintains current position
- Resume—begins playing from current position None of these actions take any parameters.

k. Wraps (Intrusions)

The process of getting a wrap placed correctly in a dynamic story control, outline control, or story control has three steps:

1) The author places the picture in a content stream, and marks it as a wrap.
2) The title designer (not the author) decides where the wraps should be placed within the control.
3) When the customer runs the title, the control code sees the wrap and places it according to the designer's settings.

Of course, the difficulty in this is to identify the means by which authors mark a wrap as such without actually placing it, and by which designers set rules for placing wraps without prior knowledge of what the wraps are. This problem is solved by using styles. The user has eight wrap styles available within the MPS Document Editor authoring environment.

C. Architectural Structures

This section will describe the structures utilized during the title creation and title publishing processes.

1. COS

Figure 11A:
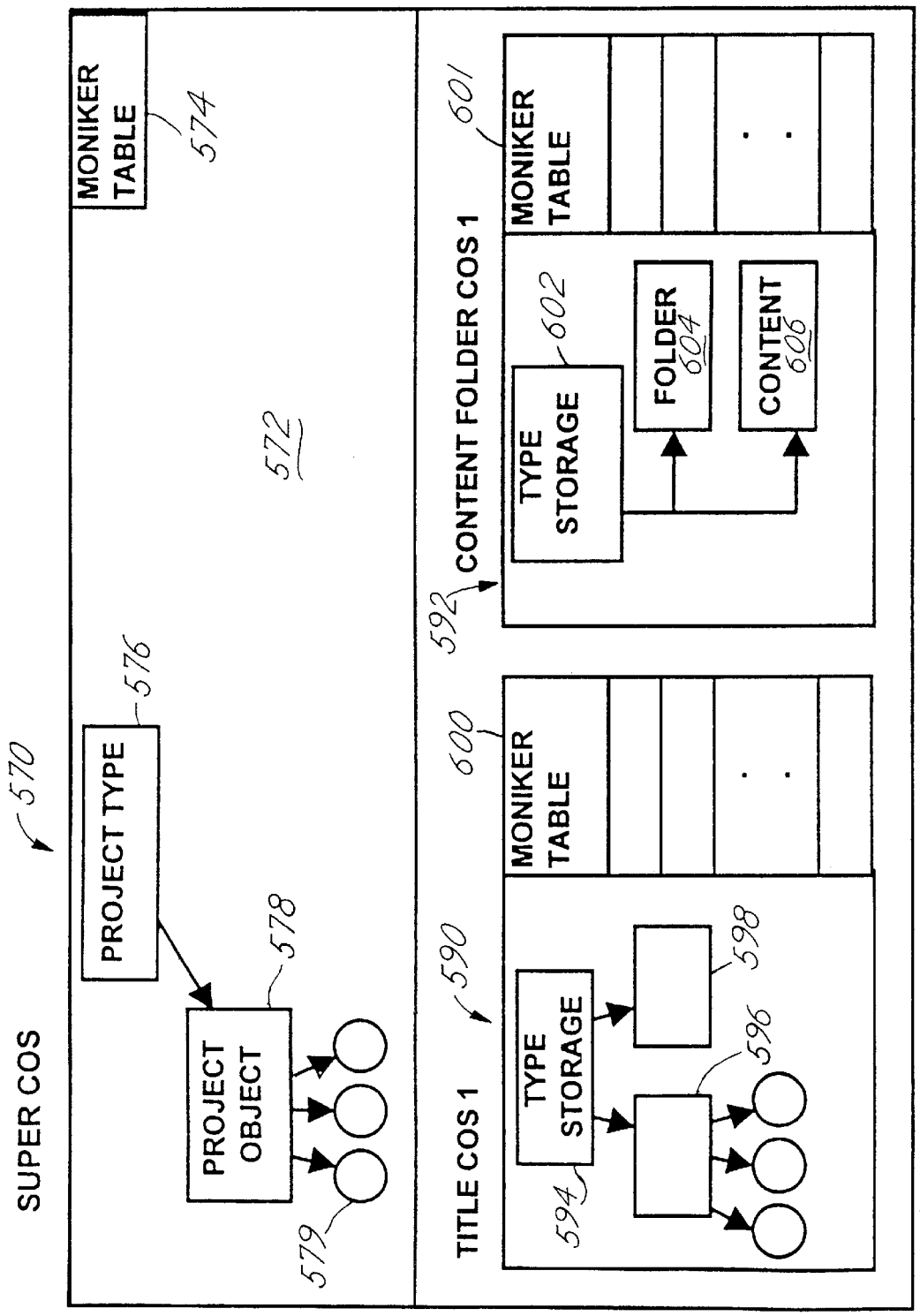
FIG. 11a is a diagram of a superCOS component of the system shown in FIGS. 1 and 2.

Referring now to FIGS. 11a, 11b and 11c, a structural diagram of the COS component of the MP system 100 will be described. As previously shown in FIG. 10, wherein a Publisher COS 544, a Server COS 540 and a Viewer COS 548 where described, the COS is an essential component of the presently preferred MP system 100.

The COS is used for persistent object storage by the MP system 100. Several different abstractions are exposed by the COS: a simple stream for arbitrary storage, a discreet and user-transparent object storage for MFC CObject-derived object classes, and object properties. A simple stream can be used to contain an array of bytes of data for whatever purpose. A CObject-derived object is managed persistently by the COS once created and added to the system. A property is a named typed value and can be associated with discreet objects and streams. The COS interface is thus divided among COS compound document file creation/opening/closing, simple COS stream access, COS object persistence, and stream or object property access.

The following references are useful for understanding the COS subsystem.

OLE 2 Programmer's Reference Volume One, Microsoft Corporation, 1994, Chapter 9—Persistent Storage Interfaces and Functions;

Class Library User's Guide For the MFC Class Library, Microsoft Corporation, 1993, Chapter 14—Files and Serialization;

OLE 2 Classes For the MFC Class Library, Microsoft Corporation, 1993, class COleStreamFile At the lowest level, the persistent object storage strategy is to leverage OLE 2.0 capabilities for compound document access, which includes an internal IStorage hierarchy and IStreams for data content. Objects and property information describing objects are stored into discrete IStreams, which are organized within a hierarchy of IStorages.

Referring to FIG. 11b, an object 580 is exemplary of an IStorage, while IStreams for a typical object include an object data stream 582, an object properties stream 584, and a handle table stream 586. The object data stream 582 is required for the object, while the object properties stream 584, and the handle table stream 586 are optional. The property stream 584 is not needed if properties are not supported by the object type. The handle table stream is not required if the object doesn't reference anything.

The COS is the basic component which mediates persistent storage of MPS objects into an OLE compound document file. It is the go-between for both MPS applications and tools and also mediates access to a COS compound document on behalf of the Object Broker 550 (FIG. 10).

The Object Broker 550 provides for peer-to-peer communication for distributed object needs of the MP system 100. An Object Broker 550 resides on any machine that connects into the MP system 100—either as publisher, server site, or customer (client).

The Object Broker 550 interacts with the COS for compound document access and fundamentally transacts with MPS client software applications via OLE COM RPC. In the case of operating in the context of Microsoft Network Online Service (MOS), the Object Broker 550 also makes use of MOS MPC (remote procedure call mechanism). MPC is used for Object Broker-to-Object Broker, peer-to-peer interactions. OLE COM RPC is used for both client-to-Object Broker server and the server-to-server scenario where network connections and protocols supporting COM RPC permit.

The COS component library is intended to be statically linked into any piece of software using its services. It will support process internal multi-threading concurrency. COS services are accessed through a C++ class interface. The Object Broker 550 is implemented as a process server using process internal multi-threading concurrency to service potentially multiple clients.

The central abstraction of the COS is that of a COS-locally scoped handle to an object moniker, which in turn associates a persistent object. The object moniker is key to the functionality of the system. An object moniker is a special object in itself (is an object used in the implementation of the COS). It dual encapsulates information on either the local cached location of an object, and/or contains the GUID identity of the object which can be used in its retrieval from a remote location. The object moniker is also used for reference count access tracking, object dirty status, COS object type information, and a few other items. The object moniker must be used by the COS when actually dereferencing a COS object so that proper reference count tracking, dirty status, and so forth, can be kept properly synchronized.

A GUID is assigned to an object to uniquely distinguish that object. A GUID is generated by an OLE 2.0 API, known as CoCreateGUID, using both a time identifier and a machine (computer) identifier. This guarantees that any two GUIDs produced on the same machine are unique because they are produced at different times, and that any two GUIDs produced at the same time are unique because they are produced on different machines. The presently preferred GUID is a 128 bit or 16 byte number.

Referring to FIG. 11c, an object moniker represented as a moniker table record 630 in a moniker table, such as moniker table 600 shown in FIG. 11a, will now be described. A moniker table is persistent, that is, it is a stream at the root level of a COS. Structurally, the moniker table is preferably implemented as a sparse array, wherein if the array doesn't need a slot in the table, the memory is released. The moniker table record 630 includes information that uniquely defines an object stored in the COS. The fields of the record 630 include a GUID field 632, a publish date field 634, a handle or path to the storage 636, a set of flags 638, and a persistence reference count 640. The path 636, also called an object handle or CDPOHandle, is a DWORD (32 bits) that provides a short path or name of the storage. The flags 638 indicate the existence of artifacts, that is, whether the data stream 582, the properties stream 584 and the handle table stream 586 exist in the COS for the current object. The persistence reference count 640 is only valid within a COS and is used for "garbage collection". When an object is no longer used, signified by the persistence reference count 640 equal to zero, garbage collection removes the object. When the object is removed, a tombstone is created in the moniker table to indicate that the object did exist in the COS at some time in the past. The tombstone is a moniker with a flag which indicates that the object of that GUID is extinct. The object storage is purged but the moniker remains.

The object moniker is also instrumental in the MPS scheme for local object caching. The GUID identity of an object encapsulated in an object moniker is used to seek and identify the appropriate object remotely from the machine it is requested for. A user may have downloaded a title COS from an on-line MSN server, such as MPS server 246 (FIG. 3). This title is stripped of all objects leaving only a moniker to the root title object. Attempting to view this title and thus attempting to access its objects forces absent objects to be remotely retrieved via the Object Broker. The objects become stored locally (in the Viewer COS 548) with the Object Broker 550 on the machine initiating the request. Viewing a title having locally cached objects then subsequently offers much higher performance. Yet, the objects comprising this title can be tracked and updated over time, such that the title remains fresh with the current edition mastered by a publisher. When a title is on a customer's machine, it is most appropriate to think of the title's objects as being remotely served and mastered, but locally cached for optimal user performance of perusal.

The Object Broker component resides upon all nodes in the MP system 100 comprising publishers, title servers, and client end users. The Object Broker primarily fields requests for objects specified by GUID. If one Object Broker server cannot fulfill an object request, it attempts to relay the request to server sites that it knows about. The object, when and if found, can later be propagated to its final destination in a store-and-forward manner, or the requested object can be transmitted between the point of its discovery to the point of its request without store-and-forward copies of it being retained at intermediate server sites. This is governed by system configuration settings for each Object Broker site and the administration policy of that site.

The nature of the ultimate repository of an object can be rather flexible under this scheme. The key item is the object moniker and the GUID it encapsulates. The object moniker could be extended so as to provide for arbitrary mechanisms by which to synthesize the actual object at object request occurrences. The object may reside in a COS IStream. The object could reside in a file system file external to the title COS file. Or the object could reside in some other foreign object data base and thus require some protocol interaction in conjunction to that data base to retrieve the object (and perhaps later commit modifications to the object). This scheme of local caching effectively shields MPS client applications, tools, custom OLE controls, and so forth from having to have specific knowledge as to how the Object Broker go-between process actual does its task of retrieving the desired object and locally caching it.

Figure 16:
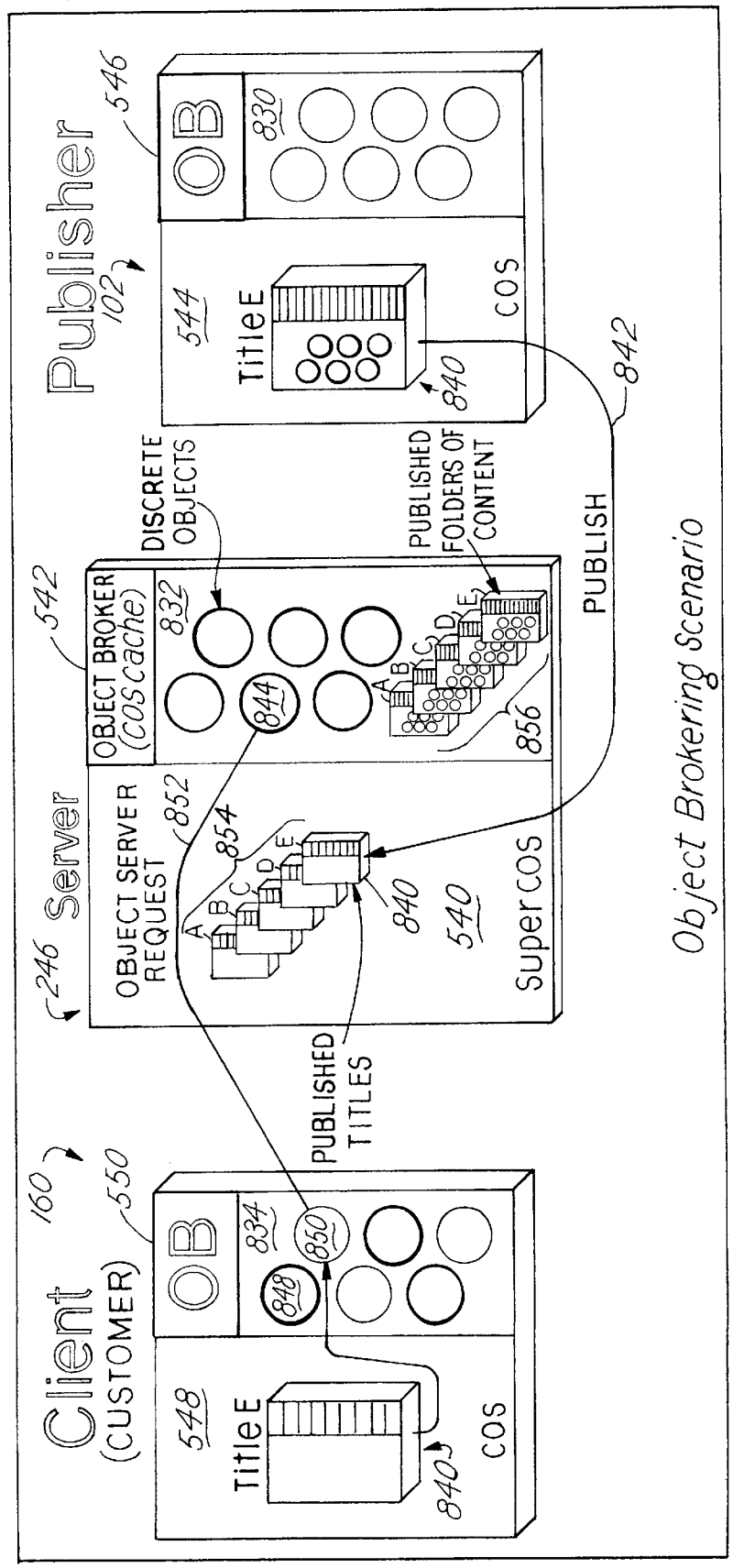
FIG. 16 is a diagram of an exemplary object brokering scenario of the process used on the network of the system shown in FIGS. 2 and 3.

It is important to note that when an object becomes locally cached, it resides in a COS IStream—within a special COS belonging to the machine local Object Broker (see FIG. 16). This COS belonging to the machine local Object Broker may be hidden to protect the customer from inadvertently deleting or moving retrieved object data that is pertinent to the user's downloaded title(s). The Object Broker is responsible for periodically expunging stale objects from this special COS so as to conserve user hard disk space.

2. SuperCOS

Referring again to FIG. 11*a*, a discussion of an exemplary superCOS 570 now follows. The preferred superCOS is a COS that references one or more COSes, which are known as subCOSes. In the exemplary superCOS 570, there is a root portion 572 and two subCOSes, a title COS 590 and a content folder COS 592. In the root portion 572 of the superCOS 570, there is a storage for types. As shown in FIG. 11*a*, there is a project type IStorage 576 off the root of the superCOS 570 which references one or more storages for each object of the type, which is project in this instance. The project object 578 has the three IStreams, such as the streams 582, 584, and 586, as previously described in conjunction with FIG. 11*b*. The project object 578 keeps track of the subCOSes 590 and 592. That is, the object data stream 579 of the project object 578 references each subCOS created by the publisher for the current project. The root portion 572 also includes a moniker table 574. Since the root portion 572 preferably only includes a project object 578, the moniker table 574 only has one record and is a persistent stream off the root of the superCOS 570.

The relationship between a title and a COS is one to one, that is, there is one COS per title. This relationship follows from the concept that a COS is a distinct set of objects that reference each other. In the present embodiment, a title does not reference another title within a superCOS, but this capability is provided in another embodiment.

The title COS 590 includes a moniker table 600 and one or more type storages 594. The type storage could be for a title, section, page, style sheet or other MPS objects. In this example, type storage 594 references an object 596 and an object 598. A moniker table record is created for each object in the COS 590. In general, a COS has "n" types, and within the type storage, there may be "m" objects.

The content folder COS 592 includes a moniker table 601 and a type storage 602, which in the preferred embodiment is of a folder type. The storage 602 references other containers, such as a folder (also called a subfolder) 604, and content 606. The use of subfolders is optional, but they serve to help organize objects. The content folder COS 592 provides a means of publishing fresh content. The publisher could create a title stored in the title COS 590 for which the layout changes very infrequently, if at all. Then, periodically (e.g., daily, weekly, monthly), the publisher can publish new content (e.g., stories, images, bitmaps, and so forth) in the content folder 592.

Referring again to FIG. 11*c*, a GUID map 620 will be described. When a COS is opened, the MPS reads out the moniker table and creates the GUID map 620. The GUID map 620 is created in the RAM of the computer where the COS exists in the form of a hash table structure. The map 620 is created by reading each moniker table record to extract the GUID, such as GUIDx 622, and storing the GUID and a pointer 624 to the corresponding moniker table record 630 in the GUID map 620. Each GUID stored in the GUID map 620 has a pointer to one moniker table record. Thus, given a GUID, the system can access the moniker which provides the path to get the corresponding object and its artifacts.

3. Title COS

Figure 12:
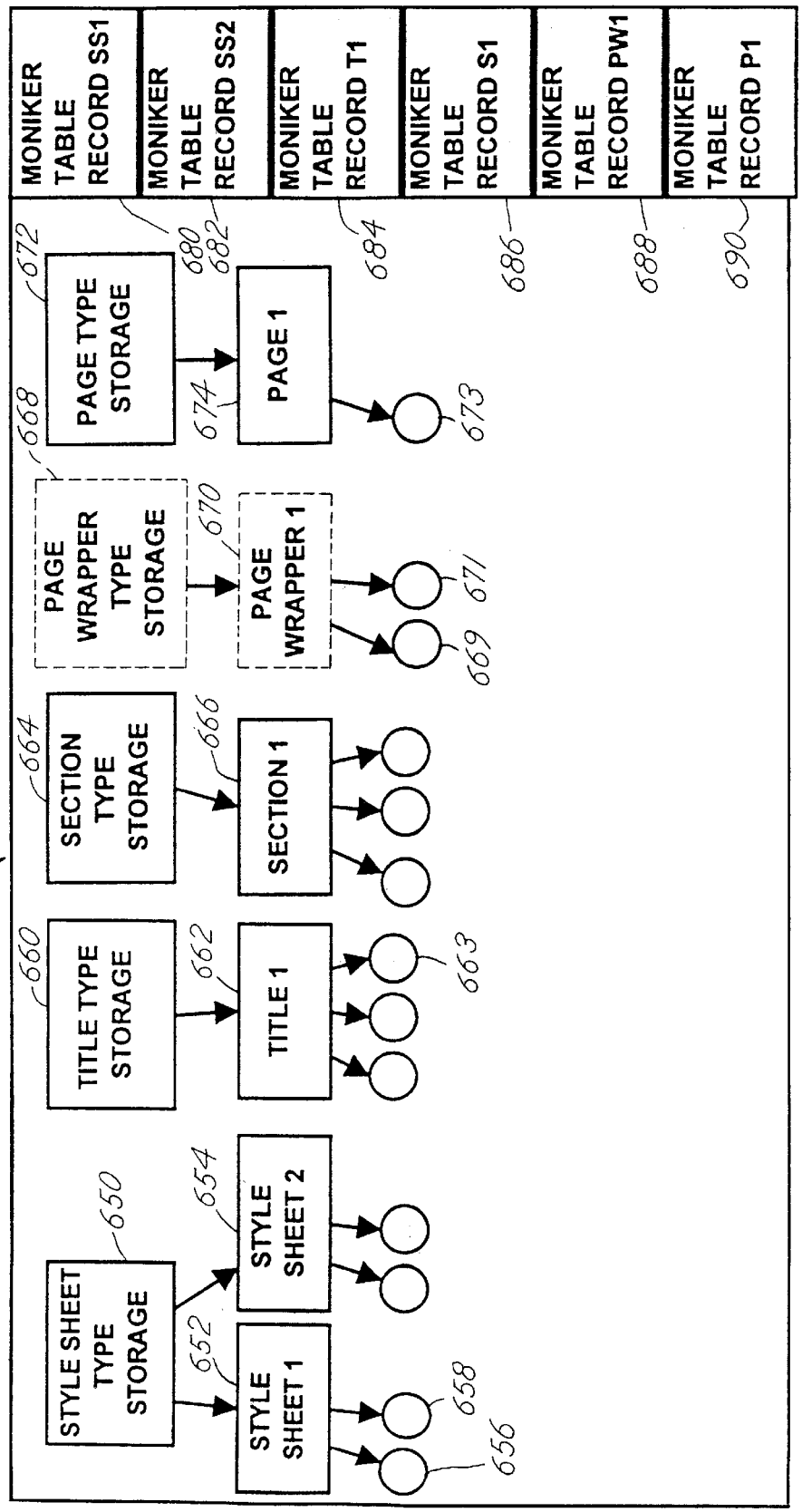

Referring to FIG. 12, an exemplary title COS 591 will be described. The title COS 591 is similar to the title COS 590 of FIG. 11a, but is enlarged to show a plurality of different type storages and referenced objects. The title COS 591 includes a moniker table 600 with a record 680–690 for each object in the COS 591. The type storages in COS 591 include a style sheet storage 650 having a default style sheet object 652 and a second style sheet object 654, a title storage 660 having a title object 662, a section storage 664 having a section object 666, a optional page wrapper storage 668 having a page wrapper object 670, and a page storage 672 having a page object 674. Each of the COS objects (title, section, folder, content folder, root content folder, proxy table) nominally has the three artifacts for data, properties, and handle table as previously described in conjunction with FIG. 11b. The exceptions are that window, page, content, search, and style sheet objects normally do not have a handle table artifact, e.g., default style sheet 652 has a data stream 656 and property stream 658. These objects are leaf objects that do not reference other objects. Another exception is that a certain type of page object, the virtual page object 674, normally only has a data artifact 673.

In the presently preferred embodiment, the optional page wrapper object 670, which has a data artifact 669 and a properties artifact 671, is included as a design convenience. In another embodiment of the system 100, the page wrapper storage 668 and page wrapper object 670 are not utilized.

When a new title is created, the title references a default window object, having standard window properties, and a default style sheet object. The title designer can choose to modify the default object, and thus create, a new window object to exhibit the behavior desired for the window. A similar process can be done for the style sheet object.

A handle table 663 for the title object 662 has information for all the sections in the title COS 591 (in this example, there is only one section shown). The title object 662, therefore, persistently has knowledge that the title object 662 references the section object 666. If a new section is saved in the COS 591, the handle object 663 is updated with information so as to reference the new section object.

OLE Controls are not objects in the MP system 100. OLE controls are stored as data for the page in the data stream. Each control has a Class ID and an OLE ID that is not a GUID. The properties of some controls have a GUID to a style sheet.

At the viewer COS 548 (FIG. 10), when a title is accessed for the first time, the title is preferably pulled over from the server COS 548. Alternatively, the title could be accessed from the CD-ROM 124. When the title is accessed for the first time, the Viewer 202 (FIG. 2) creates a moniker record 684 for the title object in the moniker table 600, gets the data stream and gets the handle stream. The Viewer 202 incrementally brings over objects into the viewer COS 548. Starting with the title object, the handle stream 663 has the GUIDs for the other objects the title references. The viewer 202 initially puts the GUID for each object, for example, section object 666, in a moniker table record for that object (e.g., record 686 for section object 666). Later, when the object is invoked or called, the Viewer 202 gets the rest of the moniker record information and stores it persistently in the moniker table 600 along with the object artifacts.

4. MSN Server COS

A server COS, such as COS 544 in FIG. 10, is similar to a superCOS 570, but does not utilize a project object 578 to reference and keep track of the subCOSes. At a network server, such as MPS server 246, the server COS does not know what objects will be published to it and which subCOS the objects are associated with.

The server COS 544 contains titles in entirety, since they are published there and the server acts as the master repository. In contrast, a customer superCOS, such as at customer workstation 182 (FIG. 2) is a cache for those objects which have been transmitted to the customer, and so may only contain a subset of the objects for a title.

D. Operation

An operational flow of publication and viewing will be described in this section.

1. Designer Process Flow

Figure 13:
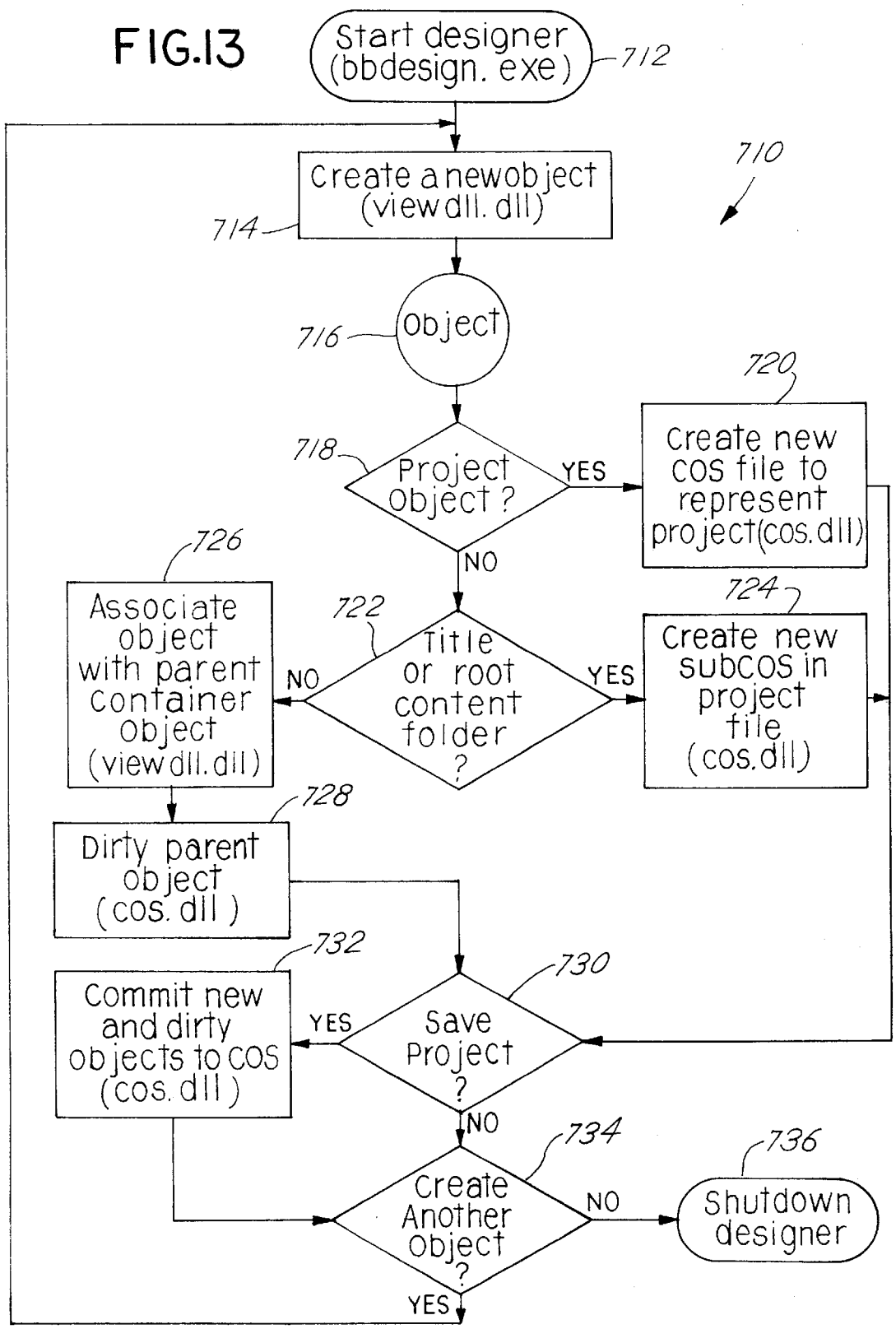
FIG. 13 is a flow diagram of a title creation process performed on the system shown in FIGS. 1 and 2.

Referring now to FIG. 13, a title creation process 710 will be described. This process 710 is preferably performed at the publisher workstation 180 (FIG. 2). This process corresponds with states 324–328 of the top level process 320 (FIG. 5).

Beginning at a start state 712, the designer environment is evoked by the publisher 102 (FIG. 1). In the presently preferred embodiment, the publisher clicks on a Designer icon on the Windows 95 desktop or selects Designer through the menu system of Windows 95. In either case, the bbdesign.exe program, previously described, is initiated. Moving to a state 714, the process 710 creates a new object 716, e.g., a project, a title a content folder and so forth. This state is part of the viewdll.dll.

Proceeding to a decision state 718, the process 710 determines if the object is a project object. If so, the process 710 continues at a state 720 and creates a new COS file to represent the project. This state is part of the cos.dll. If decision state 718 determines that the object is not a project object, the process 710 moves to a decision state 722 to determine if the object is a title or root content folder. If 80, the process 710 advances to a state 724 and creates a new subCOS, such as subCOS 590 or 592 (FIG. 11a) in the project file. This state is part of the cos.dll.

If decision state 722 determines that the object is not a title or root content folder, the process 710 moves to a state 726 and associates the object with the parent container object, e.g., a section is associated with the title object. The object handle (CDPOHandle) of the object, which is a 32-bit local path, is added to the handle table stream of the parent container object. This state is part of the viewdll.dll. Proceeding to a state 728 to mark the properties of the parent object as "dirty". "Dirty" signifies that the memory image of the parent object's properties has been modified. This state is part of the cos.dll.

At the completion of state 720, 724 or 728, the process 710 continues at a decision state 730 to determine if the user desires to save the project. If so, the process 710 proceeds to state 732 and commits (i.e., stores) the new and dirty objects to the appropriate COS. This state is part of the cos.dll. At the completion of the commit state 732, or if it was determined at decision state 730 that the project is not to be saved, the process continues at a decision state 734 and determines if the user desires to create another object. If so, the process 710 loops back to state 714 to continue the title creation process. If not, process 710 moves to end state 736, wherein the designer environment is shut down.

2. Release Process Flow a. Client

Figure 14:
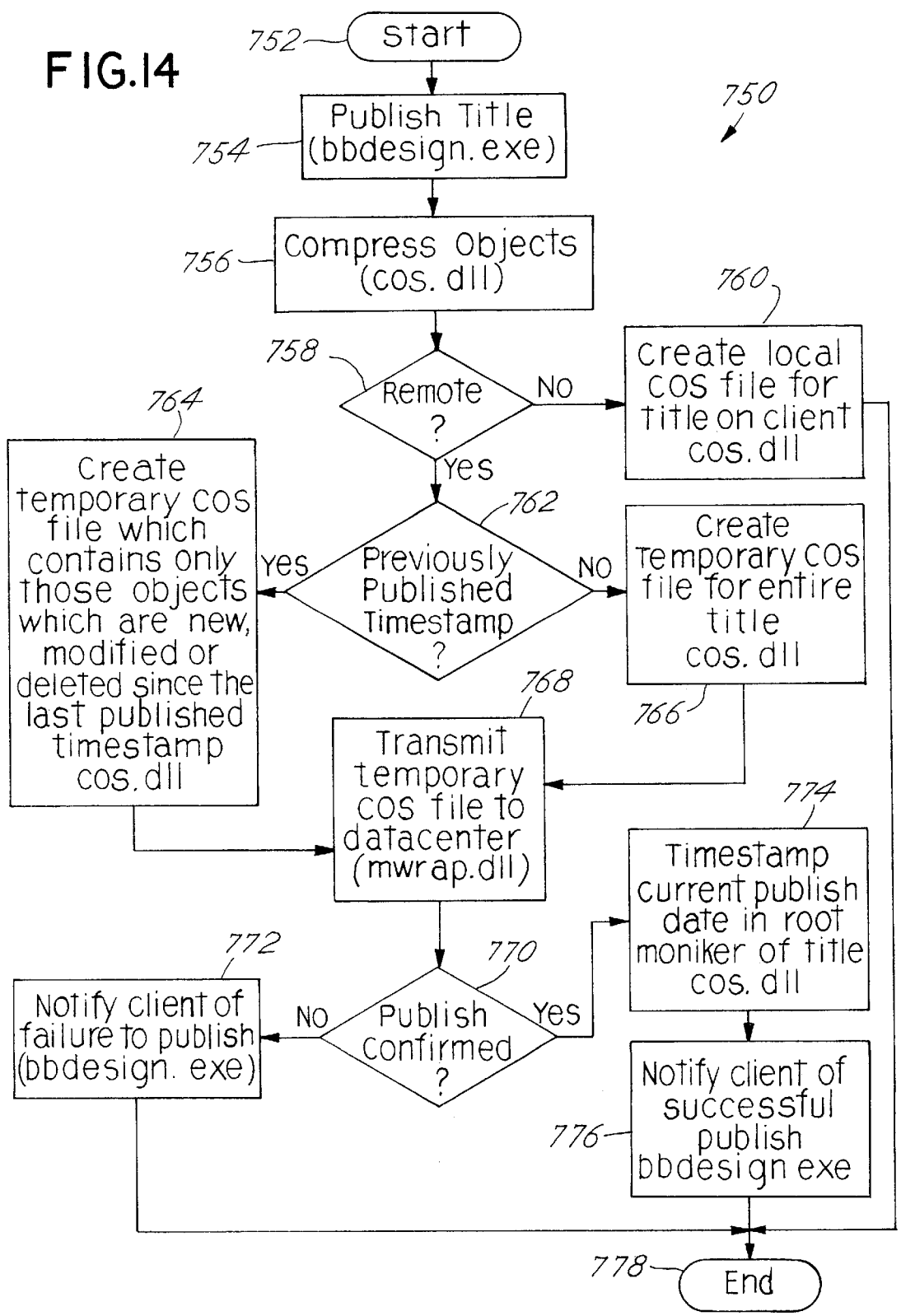
FIG. 14 is a flow diagram of a title publishing process performed at the publisher's workstation on the system shown in FIGS. 1 and 2.

Referring now to FIG. 14, a title publishing process 750 will be described. This process 750 is preferably performed at the publisher workstation 180 (FIG. 2) and corresponds with state 332 of the top level process 320 (FIG. 5).

Beginning at a start state 752, the process 750 moves to state 754 and initiates the publish title process. This state is part of the bbdesign.exe. Moving to a state 756, process 750 compress the COS objects. This state is part of the cos.dll. The process 750 continues to a decision state 758 to determine whether the publisher desires to publish to the remote server. The designer is given the option to either release the title to the remote server 246 at the MSN Data Center 242 (FIG. 3) or to create a local COS file which contains all the objects for that title. This is useful for local testing or for releasing a stand-alone title on a floppy or CD-ROM.

If the publisher desires to only release the title locally, the process 750 proceeds to a state 760 and create a local COS file for the current title on the publisher's workstation. This state is part of the cos.dll. At the completion of state 760, process 750 finishes the title publishing process at an end state 778.

If the publisher desires to release the title to the remote server 246, as determined at decision state 758, the process 750 proceeds to a decision state 762 and determines if there is a previously published timestamp for the COS. If so, the process 750 moves to a state 764 and creates a temporary COS file which contains only those objects which are new, modified or deleted since the last published timestamp. This state is part of the cos.dll. If there is no previously published timestamp, as determined at decision state 762, process 750 proceeds to a state 766 and creates a temporary COS file for the entire title. This state is part of the cos.dll.

At the completion of either state 764 or state 766, the process continues at a state 768 and transmits the temporary COS file to the data center 242 (FIG. 3). This state is part of the mwrap.dll, previously described. Proceeding to a decision state 770, the process 750 determines if the data center has confirmed the publish operation. If not, the process 750 moves to a state 772 and notifies the publisher of a failure to publish. This state is part of the bbdesign.exe. After the publisher is notified, process 750 finishes the title publishing process at the end state 778.

If the data center has confirmed the publish operation, as determined at the decision state 770, the process 750 advances to a state 774 and timestamps the current publish date in the root moniker of the title. This state is part of the cos.dll. Then, at a state 776, the process 750 notifies the publisher of a successful publish operation. This state is part of the bbdesign.exe. After the publisher is notified, process 750 finishes the title publishing process at the end state 778.

b. Server

Figure 15:
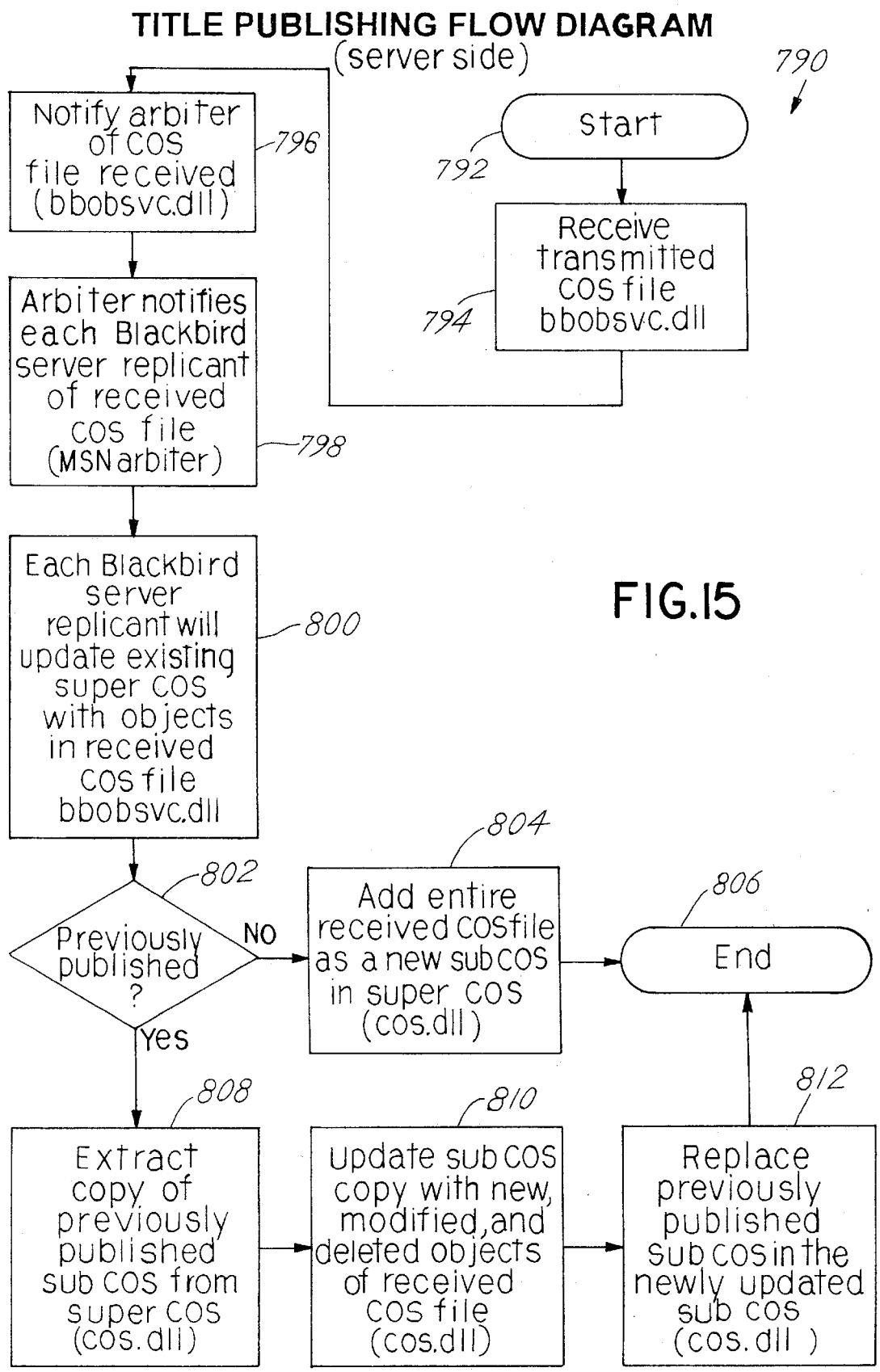
FIG. 15 is a flow diagram of a title publishing process performed at the network on the system shown in FIGS. 2 and 3.

Referring now to FIG. 15, a title publishing process 790 will be described. This process 750 is preferably performed at the MSN data center 242 (FIG. 3) and corresponds with state 332 of the top level process 320 (FIG. 5).

Beginning at a start state 792, the process 790 moves to state 794 and receives the COS file transmitted from the publisher workstation 180 (as described in conjunction with FIG. 14). This state is part of the bbobsvc.dll. Moving to a state 796, the process 790 notifies the Arbiter 252 (FIG. 3) at the data center 242 of the received COS file. This state is part of the bbobsvc.dll. Advancing to a state 798, the Arbiter 252 notifies each MPS server replicant (such as 246a, 246b, 246c, as shown in FIG. 3) of the received COS file. This state is part of the MSN arbiter service.

Proceeding to a state 800, each MPS server replicant 246 updates its existing superCOS with objects from the received COS file. This state is part of the bbobsvc.dll. To facilitate this update, process 790 moves to a decision state 802 to determine if the COS has been previously published to the data center 242. If not, process 790 proceeds to a state 804 and adds the entire received COS file as a new subCOS in the superCOS of each MPS server 246 at the data center 242. This state is part of the cos.dll. A GUID lookup map and subCOS directory in the root portion of the superCOS is updated to reference the new subCOS. Every superCOS has a GUID lookup map and a subCOS directory to identify each object within the superCOS and which subCOS a particular object resides within. When a new subCOS is added to a superCOS, the subCOS directory of the superCOS is updated with the new subCOS. In addition, every object within the new subCOS is entered into the GUID lookup map with a reference to the new subCOS. At the completion of state 804, the title publishing process 790 (at the data center) finishes at an end state 806.

Returning to the decision state 802, if the COS has been previously published to the data center 242, process 790 advances to a state 808 and extracts a copy of the previously published subCOS from the superCOS of each MPS server 246 at the data center 242. This state is part of the cos.dll. Continuing at a state 810, the process 790 updates each subCOS copy with the new, modified, and deleted objects of the received COS file. This state is part of the cos.dll. Moving to a state 812, the process 790 replaces the previously published subCOS in the superCOS of each MPS server 246 with the newly updated subCOS. This state is part of the cos.dll. At the completion of state 812, the title publishing process 790 (at the data center) finishes at the end state 806.

3. Object Broker Service

Referring now to FIG. 16, the Object Broker and its interaction with and fundamental use of the COS in the context of the MP system 100 will be described. The COS 544 (which may be a superCOS if more than one COS is present) and the Object Broker 546 are shown at the publisher location 102. The COS 548 (which may be a superCOS if more than one COS is present) and the Object Broker 550 are shown at the customer location 160. The superCOS 540 (a plurality of title COSes 854 and title COS 840 are shown in this example) and the Object Broker 542 are shown at the server 246. A title 840 at the publisher COS 544 contains all the objects (signified by the bold circles for truly present objects) while the Object Broker 546 does not contain any objects (signified by the lighter circles for objects not truly present) for that title. On the server 246, all the objects are deposited into the Object Broker 542, and only a skeleton title 840 remains (title with all the object removed having just a root moniker). At the customer site 160, the skeleton title 840 is used to start viewing a title, and the Object Broker 550 will contain those object necessary to view the title.

As previously described, the COS can be considered an OLE compound document file utilized for persistent object storage by the MP system 100. COS manager is the code associated with accessing a COS file and is an implementation of the IObjectStore interface, residing in the COS DLL. The COS manager is the intermediary between a client application and this object storage compound document. It manages the insertion and retrieval of persistent objects to the COS compound document, at the lowest level.

The COS manager can field object retrieval requests locally from its COS context. In the event the requested object is not physically present, the COS manager can in turn field the request to the host machine Object Broker (the local Object Broker at the customer workstation 182, for example). The local Object Broker may have the requested object cached on the local host machine, but if not, it will seek to obtain the requested object from a connected remote server 246 at the data center 242 (FIG. 3). But this chain of events may continue in the event that the remote server 246 does not have the requested object cached either, in which case it will in turn propagate the request to servers that it is connected to. If eventually found, the requested object may be either directly forwarded to the original requester machine's Object Broker, or it may be store-and-forward propagated through the chain of connected server sites. At each server point a MPS Object Broker is the mediator for the object request. This is the Object Broker's primary role. The COS Object Broker interface is implemented in the convention of an OLE COM custom class and is called IObjectBroker.

Secondarily, the Object Broker provides a special publishing operation 842 on behalf of MPS publishing sites, such as publisher 102. A fully produced publisher's COS document, known as a title 840, is propagated to server sites 242 via use of this publishing operation 842. During this process, the title COS 840 is stripped of its objects to where only object moniker tables remain in the title COS 840 at the server superCOS 540—and perhaps optionally a select group of exempt objects that continue to reside in the COS 840. Most of the actual objects of this title COS 840 are propagated to and update the server's Object Broker local object cache 832. The Object Broker local object cache 832 is a COS file made hidden via the file system. As previously described, an object moniker is a special object proxy that is retained in a COS. Every object that can be referenced via a given COS has an object moniker record in that COS. The moniker encapsulates a GUID identity of the object it represents. In the case of an external file object, the moniker provides path information to locate the file and is known as a file moniker.

When a customer 160 wishes to obtain a title from the server 246 (when connected to the preferred network), the system performs a file copy of the title COS 840 to the file system of the user's local workstation 182. The customer may then proceed to view the downloaded title in the MPS viewer application. This action forces object dereferencing. The local COS manager will be unable to locally satisfy these resulting object request from within the stripped-down title COS 840 at the customer's workstation 182 and will field them in the manner of the Object Broker scenario described previously. Once this title is downloaded to a customer's workstation 182, the title is thereafter kept up to date with the latest version of the publisher's title objects via on-going connection sessions to the server 246 over time and the MPS Object Broker mechanism operating upon on all point nodes in the distributed system.

a. Object Broker Operation

The MPS COS Object Broker supports two primary services or operations: object request retrieval and object cache updating and title publishing to a server, where the title is stripped bare of objects suitable for end user downloading. In addition, the Object Broker also automates object aging and expunging from its object cache, maintain an object update list on a per title basis, and maintain a list of other object broker servers that have been or can be connected to.

b. Implementation Description

The Object Broker executes as a process upon its host machine, such as the publisher workstation 180. It operates as a server for both local processes and remote client processes executing on external machines. Access to the Object Broker interface from external machines is made via the Remote Procedure Call (RPC) protocol. In the case of Microsoft Network client-to-server access, the protocol of interaction is MPC. MPC is used for object broker-to-object broker dialog and is encapsulated in the Object Broker; client code is shielded from MPC via the Object Broker public interface. Thus, local machine interprocess access of the Object Broker interface is via the OLE 2 COM convention where proper interprocess marshaling must take place on client/server interactions.

While executing as a process on a server site 242, the Object Broker is acting as a background task for fulfilling any in-coming object requests, title COS updates, and title COS publish operations. The Object Broker implementation is as a Win32 32-bit executable and as such, takes advantage of Win32 multi-threading so as to service multiple client requests. Access to the Object Broker's hidden file COS object cache also supports multiple process and multiple thread accesses. That is, the COS manager must too support concurrency.

C. Publisher-side Implementation

From a publisher site 102 perspective, the Object Broker offers a unique publish 842 service. Publishing a title COS 840 conveys the title COS to a server site 242. The Object Broker 546 of the publisher-site machine 180 interacts with the Object Broker 542 of the server-site machine 246. The COS compound document file, of which the title COS 840 primarily consist of, is transported to the server site 242 where it is stored again as a file in the file system of the server 246.

The title COS 840 is entered and stored in the superCOS 832 of the server site Object Broker 542. All objects receive a GUID identity at creation time in the designer environment 194 (FIG. 2). Objects which have a pre-existing GUID identity update older versions of themselves in the local cache 832 upon collision. Discreet objects are accessible or retrievable in confederation to the server site Object Broker 542 via their GUID identity. The GUID identity is used by the Object Broker 542 as a lookup key into its map of cached objects.

A given published title. COS, such as title COS 842, also possesses a unique identity (subsumed from the GUID of its root-most object). It remains so uniquely identified at the server site 242 to which it is published 842. Future attempts to republish the title result in updating the version of it that exist on the server site 242. The identifying GUID of the title COS is retained at the publishing site 102.

From the publisher site 102 it is also possible to publish folders of title content as a content folder subCOS 592 (FIG. 11a) in a manner similar to that of a title subCOS. Prior to publishing a folder of content, the individual content files must be linked into the respective title. Hence, a complete title may consist of a title COS of objects plus a folder of content objects, where content objects consist of a directory hierarchy of discreet files that have been linked into the title in various usage relationships. A plurality of published content folder subCOSes 856 are shown in the local COS cache 832 of the server site Object Broker 542.

A published content folder is known by the Object Broker GUID identity of the local machine from which the folder originates (the publisher's machine 180). It is further possible to use the name of the folder as a lookup key in conjunction to the Object Broker GUID. The server site Object Broker 542 retains archives of the content folder from previous publishings of the folder. It is possible to query the server Object Broker 542 and enumerate all retained archives of a particular published folder.

d. Customer-side Implementation

The primary Object Broker service from the customer site perspective is object retrieval, coupled with local caching of objects, and the periodic expunging of stale objects from the cache, so as to prevent inordinate usage of the end-user's precious hard disk space.

Customers will be able-to download published title COS files from server sites 242. Attempting to view a downloaded title COS 840 at the customer COS 548 via the MPS Viewer application effects the forcing of object requests. For example, the COS 840 in use by the Viewer application attempts to load a title object and discovers that it is missing. Consequently, the COS manager then invokes the local Object Broker API to retrieve the object by supplying the absent object's GUID identity to the Object Broker 550. In this context, local refers to the object broker 550 operating at the site of the customer's workstation 182. The object's GUID is encapsulated within the object moniker data structure. The root moniker, in turn, is contained in the moniker table (see table 600, FIG. 12) within the title COS.

The local Object Broker 550 then attempts to look-up the object, such as object 850, within its local object cache. Some objects, such as object 848, are present in the cache (indicated by a bold object circle). On a cache miss, such as for object 850 (shown as a lighter object circle), the local Object Broker dispatches an object request 852 to the Object Broker at a remote server site 242 via RPC or MPC. If discovered remotely, the requested object is propagated to the customers machine and is entered and stored into a local Object Broker cache 834. The COS manager, on behalf of the Viewer application, then completes the object load from the Object Broker cache 834 and henceforth retrieves the object from there, until a point in time when or if the object becomes expunged from the cache (in which case the remote retrieval sequence is reprised so as to satisfy any new request for the object).

The result of this process is that the title COS 840 can be mastered by a publisher 102, published to a server 246, and then periodic updates to the contents of the title (which would perhaps be objects comprising the title itself or a published content folder) could then be made by the publisher 102. By subscribing to a title, customers could acquire its current contents during log-on sessions while connected to a title server 246.

A title COS 840 downloaded to a customer's machine 182, by these mechanisms described, forces retrieval of the most current published content information. This would happen by interactively browsing a title or else by the home delivery of the title, which would be enabled while subscribing to the title.

As briefly mentioned above, home delivery is a special scheduled service where the customer's machine connects to a server site 242 at off-peak hours. The customer's machine automatically acquires the latest published title by retrieving all the objects necessary to view the title and storing the objects in superCOS caches.

e. Server Implementation

The server 246 is the public repository site of published titles and published content folders. A stripped-down published title COS, such as COS 840, is retained in the file system of the server 246. Hence the customer workstation 182 can retrieve a title by merely performing a file copy of the title file to their local machine's file system. Published content folders 856 result in the creation of subCOS entries that hierarchically reside under the root Object Broker COS 832. The objects contained by a content folder, which were discreet files on the publisher site, become COS IStream objects within their respective content folder subCOS. Client end-users cannot directly access the objects comprising content folders.

In either case of title COS objects or content objects, both are ultimately identified by a GUID. The server Object Broker 542 accepts their GUID as a key by which to look them up for object retrieval purposes. The MPS publisher's tool suite provides for assigning GUIDs to content objects by an OLE API at the point in time that they are linked into a title that is under preparation. Additionally, it is possible to key for a content folder.

A title COS can be keyed in confederation to the server Object Broker 542, by supplying its GUID identity. A title COS 840 is not in any way automatically archived by the server Object Broker 542. Once created, a title COS 840 and its contained objects tend to be very long lived and are not updated on as frequent a basis as are content objects. Consequently, a publisher site 102 is responsible in totality for title COS archiving. A publisher site 102 must also retain a stub of a published title COS 840. This stub title COS need only contain the object moniker of the root-most COS object—which encapsulates the GUID of the root-most object. This root-most object GUID identifies the title COS as when it was published to a server Object Broker 542.

f. COS External Files

Objects of a COS are referenced with a 32-bit locally-scoped object handles. Every object known by a COS has an object moniker entry in that COS. Objects which are actually contained in the COS are placed into IStreams that are hierarchically scoped from the root IStorage of the COS.

In the case of content files as found under a content folder, these are not made to be contained internally in a COS (this is only the case, however, for a publisher site workstation 102), but instead are linked to a COS by use of a special file link moniker mechanism. Such external files can also be made to have links to other files in a usage relationship manner. All of these links involving external content files cause an object moniker entry to be generated in their respective COS (the subCOS instantiated and contained within the local Object Broker COS) for the link collect ion of items from a specified content folder.

V. VIEWER DETAIL

A. Overview

1. Subsystem and Interfaces

This section describes the viewer component (also known as the Viewer 202, FIG. 2) for the MPS architecture. The Viewer 202 is responsible for synthesizing a title into its composed format. This component can be described as providing the run-time view of a title, while the project editor component provides a design-time view of a title.

a. Subsystem and Interface Overview

The viewer component synthesizes the set of objects, which define a title, into a rich multi-media document which is viewed and navigated on the client machine. The synthesis process consists of two basic functions: acquiring the content and composing the content. In the case of a static title (one which does not make use of search objects or links to external content), the content acquisition step is not necessary, as all of the content required to compose the title is already defined in the title. A dynamic title requires the acquisition step to resolve search objects or links, acquire content, and insert it into the title. This process of a acquiring content can be applied successively, appending or replacing previously acquired content in order to update the instance of the title being synthesized. Having acquired the content, the title can now be composed and rendered on the client machine for viewing. The viewer component provides additional interfaces for navigating and managing hyper-text links while a title is being viewed by the client. Several subsystems are used to perform this process of synthesizing a run-time view of a title.

At the top-level there is a general viewer subsystem and interface (IViewer) for initiating the synthesis of a given title. This interface includes methods for instigating the content acquisition process which creates or updates an instance of a title (pressed title or issue). There are also methods for initiating the composition and viewing of one of these instances. Finally, there are methods for storing or archiving one of these instances (back pressing or back issue).

The content acquisition subsystem is invoked by the general viewer subsystem to resolve search objects, retrieve content attracted to the search objects, and insert the retrieved content into the structure of the title instance being created or updated. The acquisition subsystem can be prompted to acquire content for the entire title or an individual section. This capability allows individual sections to be scheduled for update. The content acquisition subsystem traverses the given title or section looking for search objects to resolve. The IResolveMagnet interface is used to retrieve a list of content IDs (path based or GUID based) for each search object. These content IDs are references to the actual content objects (MPML, graphics, audio, video, and so forth) and are inserted into the title instance in the appropriate section, associating that content with that section.

Depending upon the viewer mode, home delivery or browse, the content acquisition subsystem may or may not actually retrieve the content objects referenced by the content IDs. In home delivery mode, the IBBobjectBroker interface is used to retrieve the actual content objects immediately and cache them in the local object store. In browse mode, the actual content is not retrieved until it is required for composition (is to be viewed by the user). When the user is browsing a title interactively, the mechanism for retrieving content may be through the IContentServer or IMediaServer interfaces. These interfaces support the transmission of specific content objects in an efficient manner. For instance, a MPML file may be pre-parsed on the server and only a partially resolved parse-tree transmitted to the client for composing common tags within Infomaps, such as abstracts or table of content entries. An Infomap is a special kind of control that provides automatic display and navigation capabilities. Graphics may be transmitted as progressive renderings, audio as short sound bites, video as first frame, and so forth.

When the viewer subsystem is prompted to compose a given instance of a title, the first step is to create a parse tree which represents the entire structure of the title. The actual parsing of the MPML content can take place on either the server or within the viewer component on the customer workstation. The result is a complete tree for the entire title, including the structure inferred by the title at the top of the tree, and the parse trees for each individual MPML object at the bottom of the tree. The parse tree may or may not be fully resolved with the content depending on the viewer mode. It is at the parse tree creation step that sorting algorithms can be applied to order the content that is placed into the tree. This parse tree exposes an IParseTree interface which is used by the Infomap and OLE dynamic story controls to retrieve the relevant tagged elements from the title structure.

In addition to the parse tree, a form block manager is initialized to manage and track which elements of the parse tree structure are composed onto which pages. This page block manager tracks the page breaks for the content, and provide an IPSF interface for the OLE dynamic story control to identify where in the parse tree to start composing on a given page.

A navigation subsystem provides the INavigate interface of which controls, menus, internal and external scripts, and so forth can be used to manipulate the view of the title. The navigation subsystem uses the page block manager and parse tree to manage the creation, composition, and viewing of pages.

The viewer component also contains a Link Manager subsystem which provides the ILinkManager interface. This interface is used by Infomap and OLE dynamic story controls to register and resolve hyper-text links within the title. These links may be either synthesized (Infomap control), or obtained by a tagged-link provided within some content (dynamic story control).

b. Subsystem and Interface Detail

The subsystems and interfaces provided by the viewer component as well as the interfaces which are required from other components will now be further described.

i) Provided Interfaces

The Viewer provides the following interfaces, all of which are contained in the VIEWDLL DLL:

IViewer—Provides methods for acquiring content, composing, viewing, and archiving titles.

BOOL Open (const CString& filename)

Open the given title file for synthesis by this viewer object. The viewer object assumes that it has the right to modify this file with regards to acquiring content. The creator of the viewer object should assume the responsibility for duplicating the original title file, if necessary.

BOOL ArchiveAs (const CString& filename)

Create an archive of the currently open title into the given filename. This method causes all of the locally cached objects within the client object store which are referenced by the title to be copied into the archive file. This operation produces a completely self-contained title which can be viewed in the distant future without regard to objects having been updated or removed from the local cache or server.

BOOL AcquireContent (BOOL cacheLocal =TRUE)

Acquire content for the currently open title. This method iterates through the entire title resolving active search objects with the server. The content IDs resolved by the search objects are inserted into the proper section, associating the content with the title. By default, the actual objects are downloaded from the server and cached in the local object store (home delivery mode). Providing a FALSE cacheLocal parameter will defer the download of the actual object until it is viewed by the user (browse mode).

BOOL AcquireContent (const CString& sectpath, BOOL cacheLocal =TRUE)

Acquire content for a given section of the currently open title. Identical to the previous method, but reduces the scope of the content acquisition to a given section (full path name). This allows sections to be scheduled for acquisition and update on an individual basis.

BOOL Compose ( )

Compose the currently open title for viewing. This method creates a parse tree for the entire title structure and initialize a view block table for managing the composition of pages. It then identifies the first page of the title, composes it, and displays it to the user. Subsequent navigation through the title causes other pages to be composed and displayed.

CElementNode* GetRootNode ( ) const

Returns the root node of the parse tree for the currently composed title. The IParseTree interface can then be used to locate specific elements within the title. Note that the root node is only available when a title has been composed, otherwise this method returns NULL.

IParseTree—Provides methods for walking the nodes of the parse tree and for extracting a list of specific element nodes from the parse tree.

IPSF—Provides methods for retrieving the next element node and character position for composing the dynamic story control on a page. This interface is used exclusively by the dynamic story controls for determining the starting point of composition for a given page. The dynamic story control uses the IParseTree interface to retrieve each subsequent node of the tree, until the entire dynamic story control region has been composed or there is no more content to compose. When composition is complete, the dynamic story control marks the ending node and character position with another method of this interface.

CElementNode* GetNextPSFNode (DWORD formID, CElementNode** startNode, DWORD& startPos)
    Called by a dynamic story control to retrieve the story node, starting element node, and character position to start composing the page identified by the given formID. The returned node is the story node within the overall title parse tree structure. The startNode is set to the specific element node at which composition should begin. The startPos is set to the character position within that specific element node.

void MarkLastPSFNode (DWORD formID, CElementNode* endNode, DWORD endPos =kNotDoneRendering)
    Called by a dynamic story control to mark the element node and position at which composition of the dynamic story flow for the given page has ended. This information is stored in the view block table along with the starting story node, element node, and position. If the end of a story is parsed through and the dynamic story control can continue composing text, it will mark the end of the story with an endpos of kNotDoneRendering and will call GetNextPSFNode to continue composing the next story, if one exists.

INavigate—Provides methods for navigating to various logical areas of the title being composed.

| BOOL | GoNextForm ( ) |
|---|---|
| BOOL | GoPrevForm ( ) |
| BOOL | GoNextStory ( ) |
| BOOL | GoPrevStory ( ) |
| BOOL | GoNextSection ( BOOL wrapAround =TRUE ) |
| BOOL | GoPrevSection ( BOOL wrapAround =TRUE ) |
| BOOL | GoToSection ( const CString& sectionPath ) |
| BOOL | GoToForm ( const CString& formName ) |

ILinkManager—Provides methods for registering and resolving links.

| BOOL | ResolveLink ( DWORD* linkHandle ) |
|---|---|
| DWORD | RegisterLink ( const CLink& link, BOOL* isResolved) |
| DWORD | RegisterLink ( const CString& sectionPath ) |
| DWORD | RegisterLink (DWORD contentHandle, BOOL* isResolved) |
| DWORD | RegisterLink ( GUID contentID, BOOL* isResolved ) | ii) Used Interfaces
The Viewer uses the following interfaces:
IResolveMagnet—Provides methods for resolving a search object (magnet) to a set of relevant content.
IBBObjectBroker—Provides methods for acquiring an object from the server.
IContentServer—Provides methods for acquiring content objects from the server in an efficient manner (this refers to tagged-text (MPML) objects).
IMediaServer—Provides methods for acquiring multimedia objects from the server in an efficient manner, which include graphics, video, and audio.
ITitle—Provides methods for accessing and manipulating the collections of objects which define a title.
ISection—Provides methods for accessing and manipulating the collections of objects which define a section.
IForm—Provides methods for accessing and manipulating the properties and control properties which define a page.

B. Viewer Structures
   1. Basic Title Parse Tree
   Referring to FIG. 17, an exemplary title tree 890 will now be described. A title tree is an in-memory representation of objects of a title in the MP system 100, wherein the objects are streams and storages in a COS. The title tree is utilized by the viewer component 202 to facilitate the viewing of a title by the customer. The title tree 890 comprises a root node and a series of nodes arranged below the root in a tree format to present a hierarchy of information. A tree is a well known software data structure. Each of the title, the sections, the subsections (if present), and the roots of the stories are the OLE storages, previously described. Each of these storages has a GUID assigned to it. Beneath a story root is a parsed tree representation of content that has been stored to a COS, known as a MPML parse tree. The MPML parse tree represents a parsed version of a structured story in a tree format, wherein any item that is tagged during the authoring phase has a node in the tree (including OLE objects). The MPML parse tree is further disclosed in a copending application also assigned to Microsoft Corporation, entitled "Structured Documents in a Publishing System," previously cited. At the base of the MPML parse tree are nodes, known as leaf nodes, that are the streams that store the data, such as text or embedded objects. Nodes above the leaf nodes are the storage nodes.

The title tree begins with a title root 892. Associated with the title root 892 is a GUIDa that uniquely identifies the title. Below the root, at the next level of the title tree, are a series of sections. Section 1 is represented by a node 894 and has a GUIDb associated with it that uniquely identifies the section. Section 2 is represented by a node 896 and has a GUIDc associated with it. Section 3 is represented by a node 898 has a GUIDd associated with it.

In this example title tree 890, Section 894 has a story 1 and a story 2. Story 1 is represented by a root 900 and has a GUIDe associated with it. Story 2 is represented by a root 902 and has a GUIDf associated with it. In this example, the root 900 has a MPML parse tree 908 below it, which is a parsed version of the content identified by GUIDe. Below root 902 is a MPML parse tree 910.

Section 896 has a story 3 represented by a root 904 having a GUIDg. Below root 904 is a MPML parse tree 912. Section 898 has a story 4 represented by a node 906 having a GUIDh. Below root 906 is a MPML parse tree 914.

The title tree 890 will be further referenced in conjunction with the viewer structures described in FIG. 18a and 18b.

Figure 17:
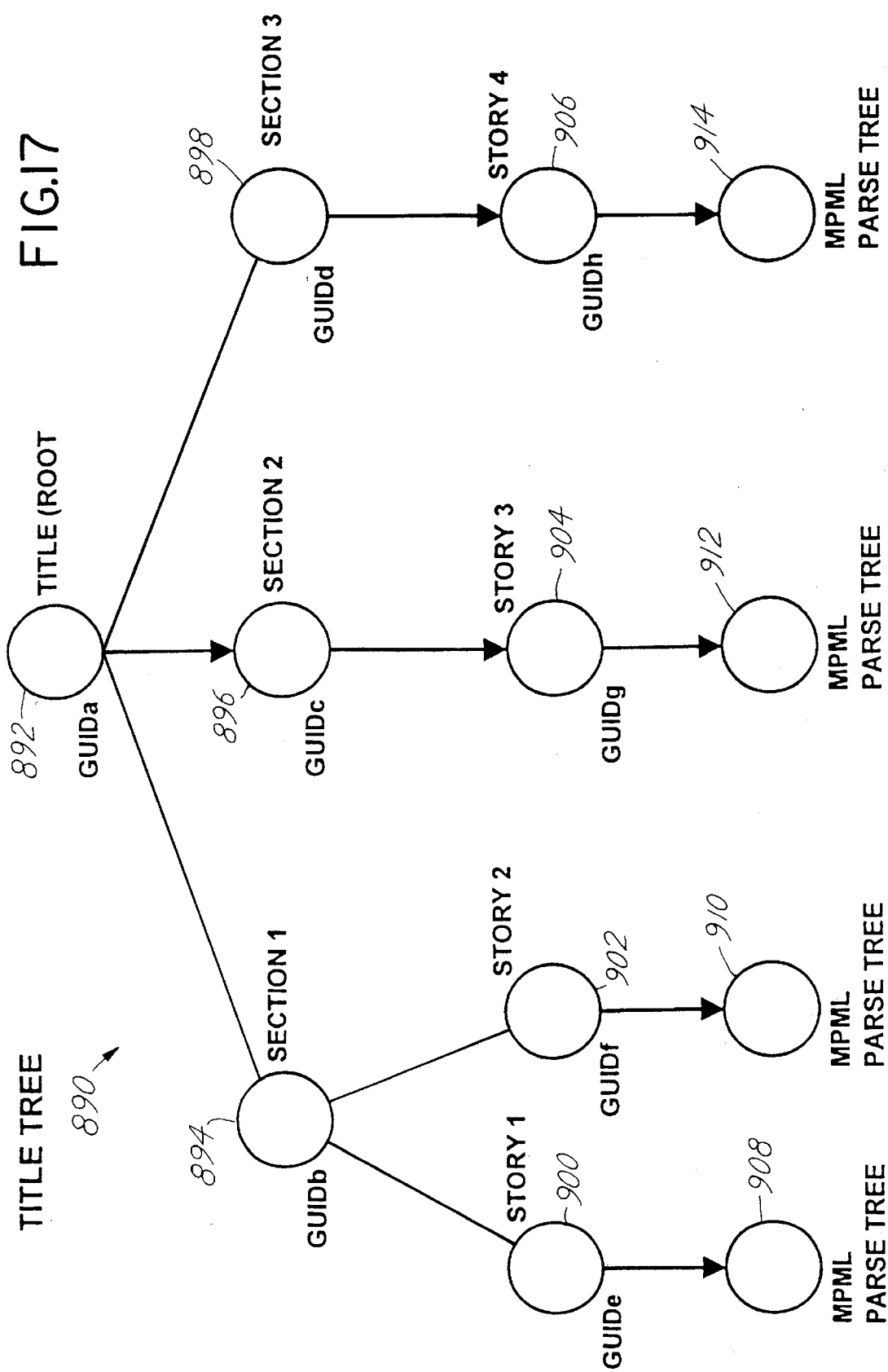
FIG. 17 is a diagram of an exemplary title tree generated at the viewer component shown in FIG. 2.

2. View Block Table
Referring now to FIGS. 18a and 18b, structures used by the Viewer 202 (FIG. 2) in the viewing of a title will be described. When the Viewer 202 is initiated, either a title COS having a root is given to the Viewer, or the Viewer creates a new COS with a moniker. In either case, the Viewer 202 opens the COS and accesses the title. The Viewer 202 then creates a view block table, such as exemplary table 920, and synthesizes a title tree, such as title tree 890 (FIG. 17). These data structures are non-persistent.

A view block table is an array of view block lists (described below), wherein there is one list per section of the title. The exemplary view block table 920 is created by the Viewer 202 by traversing the container portion (the top) of the title tree, beginning at the title root and proceeding down each branch to the subsection level (if present), or the section level if there is no subsection for the section. Each container object is placed in the view block table 920. Using the title tree 890 as an example, the table 920 has a title entry 922, corresponding to the root 892 of the title tree, a section 1 entry 924, corresponding to the node 894, a section 2 entry 926, corresponding to the node 896, and a section 3 entry 928, corresponding to the node 898.

The Viewer 202 traverses the view block table starting at the title and proceeds to each section (and subsection, as applicable) as the view blocks are filled in. At each section, the Viewer 202 determines whether the section has a page object. If not, the Viewer cannot display anything, and proceeds to the next section. If there is at least one page in the section, the Viewer determines which page to view. At the same time, in another thread, the Viewer initiates content acquisition. The stories for the current section in the title tree are brought over from the server COS and are instantiated at the Viewer 202. For a dynamic control within a section, search objects must be resolved to get the stories. The stories are received in the form of a MPML parse tree, and are appended to the title tree below the corresponding section (or subsection, if applicable). A page composition and rendering process can begin as soon as a section having a page and a corresponding story are present at the Viewer 202. Thus, a story is composed as the Viewer 202 walks the tree.

There are two stories in the first section of the exemplary title tree 890 (FIG. 17). A view block list is created for each section in the table 920 having a page. The view block list is an object that contains a list of view blocks (one view block per page in the section), and an array of handles to parse trees for the stories in the current section. In the example of FIG. 18, a view block list 930 is created for the section entry 924. The list 930 has a story 1 pointer 936 and a story 2 pointer 938 to the respective stories in the title tree 890. A view block object is created by the Viewer 202 for each page that contains a dynamic story control. The view block basically tracks which story and how far into the story the composition and rendering process has progressed at the end of a page. There can be one or more view block per story.

Each section in the view block table contains page references. The page references are built up in the view block table (from the COS) as page requests are made.

An exemplary view block 940, with initial field values, is shown in FIG. 18b. A beginning story index 956 is initialized to zero since it is the first story in the section. An ending story index 958 is also initially set to zero (start where end). An end story node 960 (to which node the viewer progressed) is initially set to story 1. An end position index 962 (how far through a node) is initially set to zero. A page type 964 is set to the type of page object currently being processed. A new view block is created using the ending information from the previous view block as beginning information. In the example view block list 930, additional view blocks, view block 942 and view block 944, were created to complete the rendering of story 936 and story 938.

As the customer navigates through the title, e.g., by activating a link to another story, a "resolve link" function locates the section for the desired story in the view block table. The resolve link function then calls a "display story" function and passes an index of the story to be displayed. The display story function looks through the view block list of the located section to see if the requested story has already been composed onto a page. If so, the page is displayed to the customer. If not, a compose operation is called to compose the requested story onto a page, followed by showing the composed story to the customer.

3. Title Parse Tree

Figure 19:
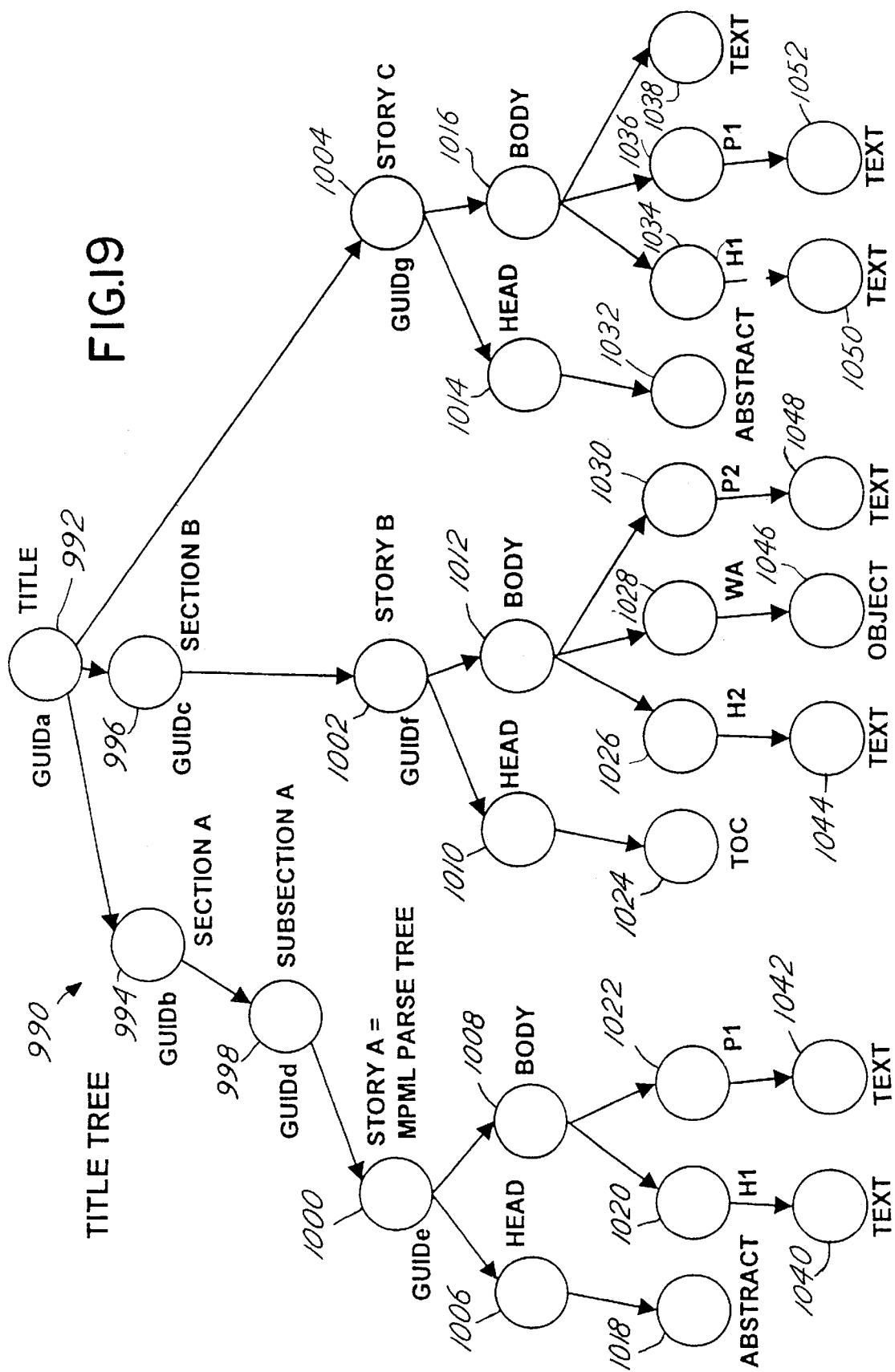
FIG. 19 is a diagram of another exemplary title tree, which includes exemplary parse trees, that is generated at the viewer component shown in FIG. 2.

Referring to FIG. 19 a second exemplary title tree 990, that is different than the title tree described in conjunction with FIG. 17, will now be described. This title tree 990 is expanded to include exemplary MPML parse trees and also shows how the tree need not be symmetrical. However, page nodes and control nodes, such as shown in FIG. 17, are not illustrated in FIG. 19.

The title tree starts with a title root 992 having a GUIDa. Below the title root 992 are a section A represented by a node 994 having a GUIDb and a section B represented by a node 996 having a GUIDc. Typically, a title is arranged with sections, and some of the sections may have subsections. Stories are inserted into either of the sections or subsections. However, stories may also be placed directly below the title root in the title tree, as exemplified by story C represented by a node 1004 having GUIDg. Section 994 has a subsection represented by a node 998 having a GUIDd.

Below subsection 998 is a story A represented by a root 1000 having a GUIDe. As shown in FIG. 19, the root 1000 of story A is the root of a MPML parse tree. Below the root 1000 of story A are a head node 1006 and a body node 1008. The head node 1006 has a leaf node 1018 that, in this example, is the abstract section of the story A at root 1000. The body node 1008 has a Heading1 (H1) type of style represented by a node 1020. Below the heading style is a leaf node 1040 having text content for the story. The text content is in the form of a data stream. When instantiated by the Viewer 202 (FIG. 2), the style above it in the tree, style Heading1, will be applied to the content. Also below body 1008 is a Paragraph1 (P1) style represented by a node 1020. The Paragraph1 style has a leaf node 1042 below it that is also a data stream of text.

Below the section B node 996 is a story B represented by a root 1002 having a GUIDf. Below the story root 1002 is another MPML parse tree having a head node 1010 and a body node 1012. The head node 1010 has a table of contents (TOC) leaf node 1024. The body node 1012 has a Heading2 (H2) style node 1026, a Wrap Advertising (WA) style node 1028 and a Paragraph2 (P2) style node 1030. The Heading2 style node 1026 has a leaf node 1044 representing a text content stream. Below the Wrap Advertising style node 1028 is a leaf node 1046 representing an embedded object stream. The Paragraph2 style node 1030 has a leaf node 1048 for a text stream.

As previously mentioned, story C, which is represented by root 1004, is immediately beneath the title root 992. Below the story root 1004 is a MPML parse tree having a head node 1014. Beneath the head node 1014 is an abstract leaf node 1032 containing a stream of an abstract for story C. Also beneath the root 1004 is a body node 1016 having a Heading1 (H1) style node 1034, a Paragraph1 (P1) style node 1036 and a text stream leaf node 1038. Further, beneath the Heading1 style node 1034 is a text stream leaf node 1050. The Paragraph1 style node 1036 further has a text leaf node 1052 below it. As previously mentioned, all leaf nodes are streams. All nodes above the leaf node level of the title tree are storages.

C. Operation

1. Title Viewing Flow

Referring now to FIGS. 20a and 20b, a title viewing process 1080 will be described. This process 1080 is performed by the Viewer 202 at the customer workstation 182 (FIG. 2) and corresponds with state 334 of the top level process 320 (FIG. 5).

Beginning at a start state 1082, the process 1080 proceeds to a state 1084 wherein the Viewer 202 (bbview.exe) is evoked by the customer 160 (FIG. 1) to view a title. In the presently preferred embodiment, the customer can either select a shortcut icon for a title on the Windows 95 desktop that is desired to be viewed, or after selecting the Microsoft Network icon on the Windows 95 desktop, the customer selects a title through the menu system of Windows 95. Of course, titles may also be selected from the CD-ROM 124 (FIG. 1) or other storage 126. In any case, the bbview.exe program, previously described, is initiated.

Moving to a state 1086, the process 1080 creates two data structures: a top of a title tree and a View Block Table. The data structures used by the Viewer 202 are non-persistent. This state is the InitTreeAndTable function of the CBViewer class and is part of viewdll.dll. The top of a title tree is the portion from the title root down to the sections (or subsections) included in the title tree, i.e., the containers in the title tree. As an example, for the exemplary title tree 890 (FIG. 17), the top of the title tree is from the title root 892 down through the section nodes 894, 896 and 898. An exemplary View Block Table 920 was described in conjunction with FIG. 18a. The View Block Table is initialized to the containers in the top of the title tree, beginning at the title root and proceeding down each branch of the tree to a subsection (if it exists) or a section.

Continuing at a decision state 1088, the process 1080 determines whether any search objects need to be resolved for the customer selected title. If no search objects are to be resolved, the process 1080 moves to a state 1090 and determines the first section with a valid page to view. Valid pages are those that are either static, or are dynamic and have actual content (stories) to flow into them. That is, a valid page is one that is capable of being rendered and displayed, because the process 1080 knows and understands all of its contents. This task involves walking through the title tree (such as tree 890, FIG. 17) to find the first page that fits one of the above criteria. The process 1080 begins with the top node in the title tree 890 and does a depth-first search through all of the sections and subsections. For each section (and subsection), the pages are checked in order to see if each one is valid. As soon as a valid one is found, the section containing that page is returned as "the first section with a valid page to view". This state is the Compose function of the CBViewer class and is part of viewdll.dll.

Proceeding to a state 1092, the process 1080 navigates to the first valid section. The Viewer 202 keeps track of which section is currently being viewed at any given time. This step sets the initial value for that setting. This is done by taking the section returned by the above state 1090 and writing that value into the "Current section" setting. This state is the GoToSection function of the CBViewer class and is part of viewdll.dll.

Continuing at a state 1094, the process 1080 determines which page to view. The process 1080 also keeps track of which page is currently being displayed at any given time. This state 1094 sets the initial value for that setting. Within the current section, the process 1080 finds the first valid page, i.e., the first page that is actually capable of being rendered and displayed. This procedure is performed using the same algorithm used in state 1090 above—the process 1080 walks through the pages in sequence, looking for either a static page, or a dynamic page that has content to be placed. This is a somewhat redundant with the code in the state 1090 above, but that is because this is separate code used whenever the customer interactively navigates to a section. This state is the ResolveForm function of the CBviewBlockList class and is part of viewdll.dll.

The process 1080 proceeds through an off-page connector A 1096 to state 1120 on FIG. 20b. Returning to the decision state 1088, if the title contains search objects that must be resolved, the process moves to a state 1098 wherein a search object resolution thread is spawned. A thread is single path of execution within a process, and a process can initiate multiple threads. Using the preferred Windows 95 multithreading capability this thread resolves the search objects concurrently with the states 1090–1094. This state is part of the viewdll.dll.

In the thread started at state 1098, the process 1080 proceeds to a decision state 1100 to determine if there is a section (or subsection) in the title tree to process. If not, the thread ends at an end state 1110. If there is a section, as determined at state 1100, the process 1080 moves to a decision state 1102 and determines if there are any search objects in the current section. If so, the process 1080 proceeds to state 1104 to resolve all the search objects in the current section. This state is part of the ircl.dll. Progressing to state 1106, the process 1080 adds all the content hits (the content objects found by the search objects) to the container of the current section. This state is part of the viewdll.dll. At the completion of state 1106, or if decision state 1102 determined that no search objects were in the current section, the process 1080 advances to a state 1108 and attempts to access a next section in the title tree. The process 1080 then loops back to the decision state 1100 to determine if there is a next section in the tree. If all the sections have been processed, the thread completes at the end state 1110. This state is part of the viewdll.dll.

Continuing now at state 1120 on FIG. 20b, the process 1080 composes and displays the page (determined at state 1094, FIG. 20a) to view. This state is the DisplayView function of the CBViewBlockList class and is part of viewdll.dll. State 1120 invokes state 1122 to spawn a content acquisition thread to acquire content objects needed by the state 1120 to compose and display the current page. State 1122 is part of the viewdll.dll.

Moving to a decision state 1124 in the content acquisition thread, the process 1080 determines if there is a section (or subsection) in the title tree to process. If not, the thread ends at an end state 1134. If there is a section, as determined at state 1124, the process 1080 moves to a decision state 1126 and determines if there is content in the current section, including the content retrieved by the search objects at state 1106 above. If so, the process 1080 proceeds to state 1128 to acquire the parse tree for each content object in the section. This state is part of the viewdll.dll. Moving to state 1130, the process 1080 appends the acquired content parse trees to the title tree. This state is part of the viewdll.dll. At the completion of state 1130, or if decision state 1126 determined that there is no content in the current section, the process 1080 advances to a state 1132 and attempts to access a next section in the title tree. The process 1080 then loops back to the decision state 1124 to determine if there is a next section in the tree. If all the sections have been processed, the thread completes at the end state 1134. This state is part of the viewdll.dll.

To facilitate incremental delivery of a content object, the MP system 100 uses a remote proxy object (not shown). The proxy object allows the system to break a single object abstraction into multiple objects within the distributed object system. For instance, in the case of text, a title or section references a text proxy object, which in effect represents a single story. The proxy object is used to separate the single story into multiple objects to allow the incremental delivery of the story. If the story was treated only as a single object, then a very large story would require complete transmission before displaying a single part of it. By use of a proxy, the story can be separated into multiple pieces and can then be retrieved incrementally. The title or section still interacts with the story object as a single entity. Proxy objects can also be utilized with other types of content, such as images and audio.

Returning to the state 1120, the Viewer 202 utilizes the one or more content parse trees that are appended to the title tree from state 1130 and the view block table and view blocks (described in conjunction with FIGS. 18*a* and 18*b*) to compose and render the page. For each control on the page, process 1080 calls the compose method (previously described).

At the completion of state 1120, the process 1080 proceeds to a state 1136 and waits for a user action, such as clicking on a caption button control or a picture button control on the displayed page. Proceeding to a state 1138, the process 1080 interprets and processes the user action. This state is part of the viewdll.dll. Moving to state 1140, the process 1080 causes the Viewer 202 to navigate to a part of the title indicated by the user action, such as a different section. This state is part of the viewdll.dll. Advancing to state 1142, the process 1080 determines which page to view. State 1142 is identical to state 1094 previously described. This state is the ResolveForm function of the CBViewBlockList class and is part of viewdll.dll. Moving to state 1144, the process 1080 composes and displays the page to view in an identical manner to that of state 1120. This state is the DisplayView function of the CBViewBlockList class and is part of viewdll.dll. At the completion of state 1144, the process 1080 loops back to state 1136 to wait for the next user action. Process 1080 continues until a user action of "exit title" is selected.

2. Object Retrieval Flow

Referring now to FIG. 21, an object retrieval process 1170 will be described. This process 1170 is performed by the Viewer 202 at the customer workstation 182 (FIG. 2) and corresponds with state 334 of the top level process 320 (FIG. 5).

When a title is viewed, the Viewer opens a title file (having a file extension of .ttl) which represents the title. This title file is a COS file. Typically in the online scenario, this would be a skeleton title (i.e., a COS file which contains only a root moniker and no actual objects). A local superCOS is a COS file which contains subCOSes and is used to cache objects on the customer workstation 182 which have been remotely retrieved from the MSN data center 242. As long as these cached objects are not out of date or flushed, the local Object Broker is able to quickly provide that object the next time it is requested rather than retrieving it from the MSN data center 242 again.

The object retrieval process 1170 is utilized anytime the Viewer 202 attempts to instantiate an object which is persistently stored in the COS as a single object. The Viewer 202 first looks in the local COS being viewed. If the object is not present, it asks the Object Broker to look in the local SuperCOS (at the customer workstation 182) of cached objects. If the object is not there, the Object Broker preferably attempts to acquire the object from the server 246 at the data center 242 (FIG. 3).

Beginning at a state 1172, the object retrieval process 1170 works in conjunction with the title viewing process 1080 (FIG. 20*a* and 20*b*) when the Viewer 202 (bbview.exe) is evoked by the customer 160 (FIG. 1) to view a title. Moving to a state 1174, process 1170 attempts to access an object given an object handle from the Viewer 202. This state is the GetObject function of the IObjectStore class and is part of cos.dll. Proceeding to a decision state 1176, process 1170 checks to see if the object is in a local COS 1182 for the current title. If so, process 1170 advances to a state 1178 to instantiate object 1184 from an object stream 1180 in the local COS 1182. This state is part of the cos.dll. The object instance 1184 is then utilized by the title viewing process 1080.

Returning to the decision state 1176, if the object is not in the local COS 1182, process 1170 moves to a state 1190 and requests the object from the customer workstation Object Broker given an object GUID. This state is part of the objbrk.dll. Continuing at a decision state 1192, process 1170 checks to see if the object is in a local superCOS 1196 on the customer workstation 182. If 80, process 1170 moves to a state 1194 to instantiate the object 1184 from the object stream 1180 in the superCOS 1196. This state is part of the cos.dll. The object instance 1184 is then utilized by the title viewing process 1080.

Returning to the decision state 1192, if the object is not in the local superCOS 1196, process 1170 moves to a state 1200 and preferably makes a remote request to the data center 242 (FIG. 3) for the object. This state is part of the objbrk.dll. Continuing at a decision state 1202, process 1170 checks to see if the object requested from the data center 242 is retrieved. If so, process 1170 advances to a state 1204 to cache retrieved remote object 1206 in the superCOS 1196 as an object stream 1180. This state is part of the cos.dll. The retrieved remote object 1206 is then utilized by the title viewing process 1080.

Returning to the decision state 1202, if the requested object is not retrieved from the data center 242, process 1170 moves to a state 1212 to report an "object not found" exception to the Viewer 202 and terminate the object retrieval process 1170. This state is part of the objbrk.dll.

VI. CONCLUSION

This section summarizes benefits provided by the present invention. In the MP system, a content provider has a lot of flexibility to choose how a customer will view a story. In addition, the MP system is device independent in that the tagged content can be displayed with high quality on many different devices. For example, a content provider can create a title just once, but the title can be viewed on a VGA screen with one column, a printer with many columns, a small screen personal digital assistant (PDA), an interactive television (ITV) system, a fax machine, or a notebook computer. Different styles can be applied to each of these devices so that the displayed content is formatted appropriately.

Moreover, separating the content and design in the MP system enables sending or distributing stylized high-quality publications over low-speed communications links. This results from the fact that the design and style sheets of many titles remains fairly static while only the content changes regularly. The MP system does not need to send large design. descriptions and style sheets to customers' computers unless the designs or styles change. Content can typically be transmitted quickly since it consists of tagged components, not the actual pages and controls themselves. Thus the separation of design and content eliminates much of the communication overhead in an electronic publishing environment.

Further, the MP system supports standards such as Microsoft Word and Standard Generalized Markup Language (SGML) to ensure that the content provider's investment in existing tools can be fully leveraged. The MP system also reads standard HyperText Markup Language (HTML) documents so that existing HTML documents can be easily converted to more sophisticated applications. Additionally, through support of the OLE standard, tools that supports OLE server capabilities can be used to create content embedded in an MPS title. By supporting additional standard file formats, the MPS can also accommodate other tools (for example high-end graphic applications).

In addition to the advantages listed above, the MP system also has other advantages that differentiate this system from other on-line publishing systems. For example, graphic designers can work on the title and page layouts, while authors create content objects. There is a clean separation of responsibilities, with separate tools used by each professional.

Also, new content does not need to be laid out by a designer before it can be published. It can be uploaded to the distribution point and downloaded to customers' machines as soon as the object is completed, since the rendering is automatically done on the consumers' machines based upon the designs in the title's page layouts. Also, since no rendering has been done prior to downloading the title and objects to the consumer's machine, the appearance of a new piece of content does not force the system to re-download any other items.

As stated above, the styles contained in every style sheet are predefined by the MP system authoring program. This program, termed the MPS Document Editor, has the special capability of producing documents formatted in Multimedia Publishing Markup Language (MPML). The MPML is a form of an SGML, but has formatting commands unique to the MP system. Markup languages which are well known in on-line networks identify portions of documents by embedded tags. In an MPML document, there is one MPML tag per document portion and each tag is mapped to a style that is found in a style sheet.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

We claim:

1. An electronic publication system, comprising:
   a network server having a publication storage area;
   at least one publisher computer coupled to the network server having a designer comprising a project editor configured to manage tiles, containers and objects; a page editor configured to generate title layout pages; a style sheet editor configured to edit style sheets; an object editor capable of creating search objects; and a word processor capable of creating content comprising tagged, hypertext documents;
   the designer on the at least one publisher computer configured to create a title comprising at least one of the title layout pages and where the title layout pages are linked and separated from the content; and
   a viewer on a viewer computer coupled to the network server configured to retrieve the title from the network server's publication storage area, where the viewer downloads the title layout pages and the content as a displayable title, and the title layout pages and the content are stored in a memory area on the viewer computer.

2. The system of claim 1, where the content comprises compound documents.

3. The system of claim 1, where the content includes text.

4. The system of claim 1, where the title layout pages comprises a plurality of page and control objects.

5. The system of claim 1, where the title comprises an application.

6. The system of claim 1, where the title comprises a service.

7. The system of claim 1, where the viewer retrieves a portion of the title layout pages and a portion of the content for rendering.

8. The system of claim 1, where the content are modified independently of the title layout pages.

9. The system of claim 1, where the title layout pages are modified independently of the content.

10. The system of claim 1, where the content is progressively rendered.

11. The system of claim 1, where the generation of the title layout pages are performed on a first workstation and the rendering of the title layout pages are performed on a second workstation.

12. The system of claim 1, where the viewer includes a query component for retrieving content matching a selected query criteria.

13. The system of claim 1, where the publisher computer includes a structured storage for storing the title.

14. The system of claim 1, where the viewer computer includes a structured storage for storing the received title.

15. The system of claim 14, where the title layout pages in the viewer structured storage is replaced when new title layout pages for the are received from the publication storage area on the network server.

16. The system of claim 1, where the title layout pages comprises a plurality of layout objects.

17. A multimedia publication system, comprising:
    a publisher computer coupled to the network server comprising a designer environment having a project editor configured to manage tiles, containers and objects; a page editor configured to generate title layout pages; a style sheet editor configured to edit style sheets; an object editor configured to create search objects; and a content editor configured to edit content comprising tagged, hypertext documents;
    a project created by the publisher computer's project editor;
    a plurality of titles and content folders created by the publisher computer;
    layout objects created by the page editor the style sheet editor and the project editor;
    content objects created by the content editor;
    a server connected to the publisher computer having a storage area for storing the project received from the publisher computer;
    a customer computer connected to the server having a viewer for displaying the project received from the server storage area, where the content objects and the layout objects of the title are together rendered as displayable portions of the project; and
    an automatic tracking system configured to track changes in the content objects and the layout objects.

18. The system of claim 17, where the designer environment additionally includes an identification process for assigning a unique identifier to each one of the content objects.

19. The system of claim 17, where the viewer additionally includes an object retrieving component for retrieving the stored objects.

20. The system of claim 19, wherein the layout objects and the content objects are retrieved only once from the server storage area regardless of the number of times either the layout or the content is repeated in the title.

21. The system of claim 17, where the server storage area stores a plurality of titles.

22. The system of claim 17, where at least one of the content objects is a story.

23. The system of claim 17, where at least one of the content objects is a picture.

24. The system of claim 17, where only a portion of the content objects are received and displayed by the viewer.

25. The system of claim 17, where the viewer includes a query process for retrieving the content objects matching a selected query criteria.

26. The system of claim 17, where the identification of the content objects is unique in the system.

27. The system of claim 17, where the content objects are shared between the titles.

28. The system of claim 17, where each content object has a unique identifier.

29. The system of claim 17, where the content objects are progressively rendered.

* * * * *